United States Patent
Loiselle et al.

(10) Patent No.: US 12,448,600 B2
(45) Date of Patent: Oct. 21, 2025

(54) EXTRACTION OF ANTIMETHANOGENIC COMPOUNDS

(71) Applicant: Synergraze Inc., Calgary (CA)

(72) Inventors: Tamara Lee Loiselle, Calgary (CA); Jianwei Chen, Calgary (CA)

(73) Assignee: Synergraze Inc., Calgary (CA)

( * ) Notice: Subject to any disclaimer, the term of this patent is extended or adjusted under 35 U.S.C. 154(b) by 0 days.

(21) Appl. No.: 19/048,091

(22) Filed: Feb. 7, 2025

(65) Prior Publication Data

US 2025/0179419 A1    Jun. 5, 2025

Related U.S. Application Data

(63) Continuation-in-part of application No. 18/891,931, filed on Sep. 20, 2024, now Pat. No. 12,281,342, which is a continuation of application No. PCT/CA2024/051095, filed on Aug. 23, 2024.

(60) Provisional application No. 63/725,827, filed on Nov. 27, 2024, provisional application No. 63/578,538, filed on Aug. 24, 2023.

(51) Int. Cl.
    *C07C 19/00*      (2006.01)
    *C12N 1/06*      (2006.01)
    *C12N 1/12*      (2006.01)

(52) U.S. Cl.
    CPC    *C12N 1/06* (2013.01); *C12N 1/12* (2013.01)

(58) Field of Classification Search
    CPC .................................................... C07C 19/00
    See application file for complete search history.

(56) References Cited

U.S. PATENT DOCUMENTS

| | | |
|---|---|---|
| 12,116,608 B2 | 10/2024 | Chen |
| 2005/0142169 A1 | 6/2005 | Imafidon et al. |
| 2009/0258030 A1 | 10/2009 | Chi et al. |
| 2016/0165928 A1 | 6/2016 | Hoffmann Pegoraro et al. |
| 2017/0273895 A1 | 9/2017 | Pompejus |
| 2018/0289816 A1 | 10/2018 | Pimentel et al. |

(Continued)

FOREIGN PATENT DOCUMENTS

| | | |
|---|---|---|
| WO | WO-2021163148 A1 | 8/2021 |
| WO | WO-2022266723 A1 | 12/2022 |

(Continued)

OTHER PUBLICATIONS

Thorsteinsson et al., "Enteric methane emission of dairy cows supplemented with iodoform in a dose-response study," Nature, Nature Portfolio, Scientific Reports, 13:12797, 20 pp., published Aug. 7, 2023.*

(Continued)

*Primary Examiner* — Rosanne Kosson
(74) *Attorney, Agent, or Firm* — COOLEY LLP

(57) ABSTRACT

The present disclosure relates to liquid (e.g., water-soluble) compositions comprising antimethanogenic compounds, and methods of administering the same to reduce enteric methane emissions from ruminant animals, and/or improve feed-efficiency. Certain disclosed compositions exhibit improved rapid effect over prior art compositions. The disclosure further relates to methods of concentrating antimethanogenic compounds, extracting antimethanogenic compounds, and methods of increasing the bioavailability of antimethanogenic compounds.

18 Claims, 9 Drawing Sheets

(56) References Cited

U.S. PATENT DOCUMENTS

| | | |
|---|---|---|
| 2021/0315952 A1 | 10/2021 | Farmer et al. |
| 2022/0175670 A1 | 6/2022 | Lay et al. |
| 2024/0060092 A1 | 2/2024 | Chen et al. |

FOREIGN PATENT DOCUMENTS

| | | |
|---|---|---|
| WO | WO-2023150832 A1 | 8/2023 |
| WO | WO-2024013721 A1 | 1/2024 |
| WO | WO-2024218767 A1 | 10/2024 |

OTHER PUBLICATIONS

Lanigan, "Metabolism of pyrrolizidine alkaloids in the ovine rumen," Aust J Agric Res 23:1085-1091, 1972.*

* cited by examiner

EXTRACTION OF ANTIMETHANOGENIC COMPOUNDS

CROSS-REFERENCE TO RELATED APPLICATIONS

This application claims the benefit of U.S. Provisional Application No. 63/725,827, filed Nov. 27, 2024, and this application is a continuation-in-part of U.S. application Ser. No. 18/891,931, filed on Sep. 20, 2024, which is a continuation of International Application No. PCT/CA2024/051095, filed on Aug. 23, 2024, which claims the benefit of priority to U.S. Provisional Application No. 63/578,538, filed on Aug. 24, 2023, the entire contents of which are incorporated herein by reference.

FIELD

The present disclosure relates to long-acting compositions, such as antimethanogenic compositions having durable efficacy, and methods for administering the same to ruminant animals.

BACKGROUND

Ruminant animals digest plant carbohydrates with the help of specific gut microbes, such as archaea. Methanogenic archaea in the gut environment of ruminant animals use hydrogen ($H_2$) to reduce one and two-carbon substrates, generating methane ($CH_4$). Consequently, ruminant animals produce and expel methane, a greenhouse gas that contributes to global warming, as part of their digestive process, specifically during the fermentation of undigested food in the rumen. In terms of its potency, methane is 34-times more powerful than carbon dioxide on a 100-year timescale and 86-times more powerful over a 20-year timescale for altering earth's climate. By some estimates, methane emissions from agricultural production need to be reduced by 24-47% by 2050 relative to 2010 to meet the 1.5° C. target of the Paris Agreement (Rogelj J., et al., Global Warming of 1.5° C. Intergovernmental Panel on Climate Change; Geneva, Switzerland: 2018. Mitigation pathways compatible with 1.5° C. in the context of sustainable development; pp. 93-174).

Current strategies to mitigate methane emissions in ruminant animals involve manipulating rumen microbial populations. For example, feed additives, seaweed supplementation, and chemical inhibitors of methanogenesis have been explored for their efficacy in safely, practically, and cost-effectively reducing ruminant methane emissions. However, current methods and compositions suffer from challenging drawbacks, including, e.g., unpredictable dosing and efficacy, loss of animal productivity or toxicity, and frequent dosing of ingredients which themselves may contribute to environmental degradation. Each of these factors may serve to undermine widespread adoption and implementation. Accordingly, there exists a need to provide improved compositions and methods of administering the same to effectively and sustainably reduce ruminant animal methane emissions.

SUMMARY OF THE DISCLOSURE

In one aspect, the disclosure teaches an infused drug delivery device comprising a) a grain or seed, said grain or seed comprising an outer fibrous component, and an inner component; and b) a drug; wherein the infused drug is contained within the inner component.

In one aspect, the disclosure teaches a method for producing an infused animal feed, said method comprising the steps of a) providing: i) a seed or grain comprising a seed coat or hull, an embryo and/or endosperm, and a vascular opening; and ii) an antimethanogenic compound; and b) soaking the seed or grain in the antimethanogenic compound, thereby transferring the antimethanogenic compound into the seed's embryo and/or endosperm, and creating an infused animal feed.

In one aspect, the disclosure teaches a method for producing an infused animal feed, said method comprising the steps of a) providing: i) a seed or grain comprising a seed coat or hull, an embryo and/or endosperm, and a vascular opening; and ii) an antimethanogenic compound; b) vaporizing the antimethanogenic compound, to create a antimethanogenic compound vapor; c) contacting the seed or grain with the antimethanogenic compound vapor, thereby infusing the antimethanogenic compound into the seed or grain.

In one aspect, the disclosure teaches an infused edible substrate for the delivery of an antimethanogenic agent, the substrate comprising a food product comprising a concentration of the antimethanogenic agent in an interior portion of the food product, wherein the interior portion of the food product comprises an amount of the antimethanogenic agent that is at least five times higher than any naturally occurring amount of the antimethanogenic agent in an unmodified version of the food product.

In one aspect, the disclosure teaches an encapsulated antimethanogenic composition comprising a) an antimethanogenic dispersion comprising an antimethanogenic compound and a solid carrier; and b) a container, wherein the antimethanogenic dispersion is completely enveloped by the container.

In one aspect, the disclosure teaches a method of manufacturing an encapsulated antimethanogenic composition, the method comprising blending an antimethanogenic compound into a carrier, thereby producing an antimethanogenic dispersion; and encapsulating the antimethanogenic dispersion into a container, thereby manufacturing the encapsulated antimethanogenic composition.

In one aspect, the disclosure teaches a unit dosage form comprising an antimethanogenic agent in a total amount of about 50 to 100 mg, 50 to 150 mg, or 50 to 200 mg, wherein the unit dosage form is configured for an intermittent dosing schedule to a ruminant animal, wherein the animal is between 700 and 1500 pounds (kg).

In one aspect, the disclosure teaches a method for reducing methane emissions in a ruminant animal, the method comprising orally administering to the ruminant animal the device, the substrate, the encapsulated antimethanogenic composition, or the unit dosage form of the present disclosure.

In one aspect, the disclosure teaches an agricultural feed composition, comprising the encapsulated antimethanogenic composition, the unit dosage form, or the device of the present disclosure, wherein the agricultural feed composition is suitable for administration to a ruminant animal.

In one aspect, the disclosure teaches an antimethanogenic composition, the antimethanogenic composition configured to deliver an antimethanogenic agent to a ruminant animal, wherein a single administration of the antimethanogenic composition to the ruminant animal reduces the ruminant animal's methane emissions by about 50%, 55%, 60%, 65%, 70%, 75%, 80%, 85%, 90%, or 95% after the single administration.

The foregoing was intended as a summary only and of only some of the aspects of the disclosure. It was not intended to define the limits or requirements of the disclosure. Other aspects of the disclosure will be appreciated by reference to the detailed description of the embodiments.

DEFINITIONS

Figure 1:
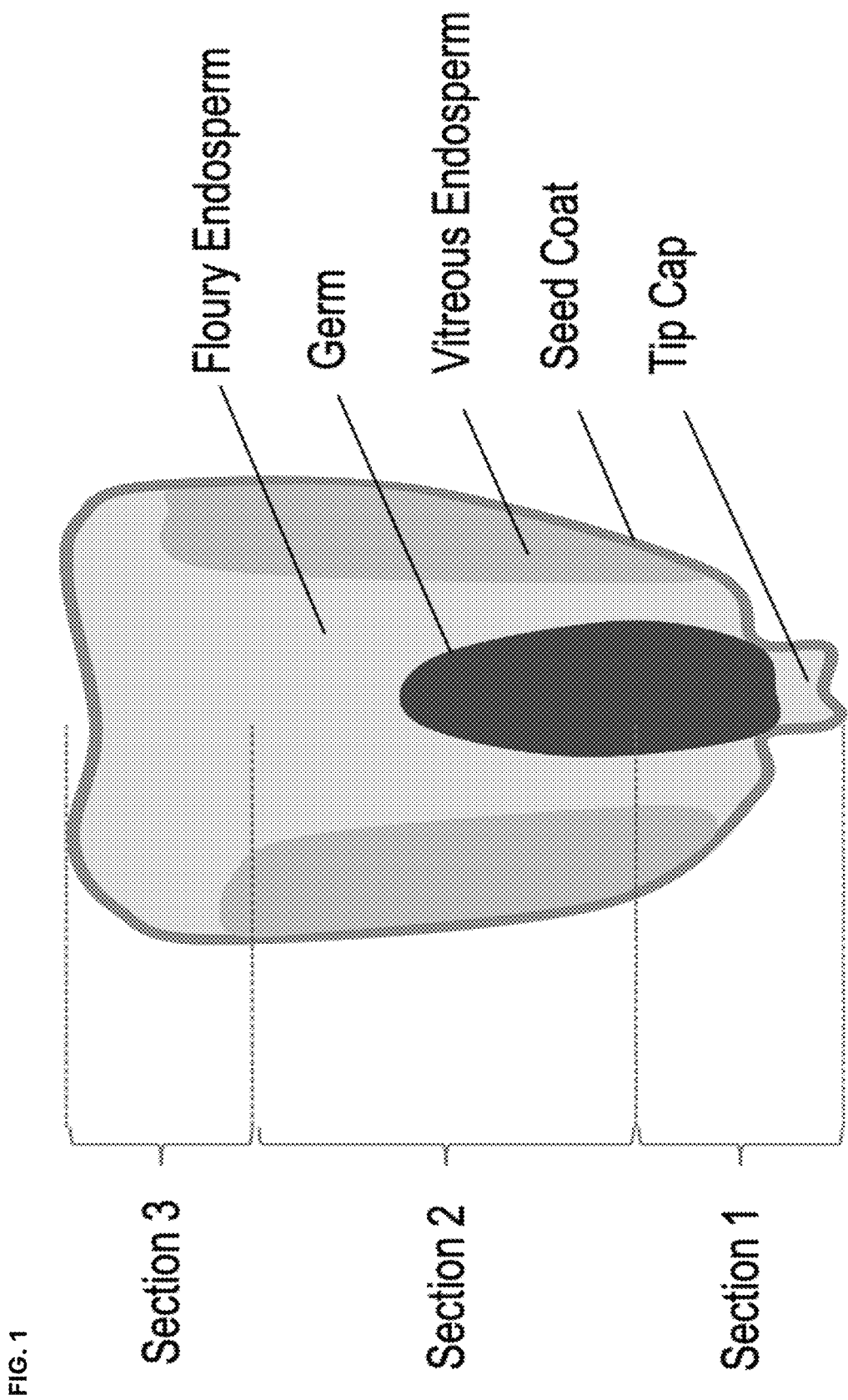
FIG. 1 is a schematic of a corn kernel; the exemplary drug delivery device is separated into Section 1, Section 2, and Section 3, each of which correspond to representative structural components.

In the description and tables which follow, a number of terms are used. In order to provide a clear and consistent understanding of the specification and claims, including the scope to be given such terms, the following definitions are provided.

The term "a" or "an" refers to one or more of that entity; for example, "a primer" refers to one or more primers or at least one primer. As such, the terms "a" (or "an"), "one or more" and "at least one" are used interchangeably herein. In addition, reference to "an element" by the indefinite article "a" or "an" does not exclude the possibility that more than one of the elements is present, unless the context clearly requires that there is one and only one of the elements.

The term "about" when immediately preceding a numerical value means a range (e.g., plus or minus 10% of that value). For example, "about 50" can mean 45 to 55, "about 25,000" can mean 22,500 to 27,500, etc., unless such an interpretation would result in a value above or below range of possible values, such as below 0% or above 100% of a possible value. Furthermore, the phrases "less than about" a value or "greater than about" a value should be understood in view of the definition of the term "about" provided herein, as applied to any recited endpoint. Similarly, the term "about" when preceding a series of numerical values or a range of values (e.g., "about 10, 20, 30" or "about 10-30") refers, respectively to all values in the series, or the endpoints of the range. Unless otherwise indicated, it is to be understood that all numbers expressing quantities, ratios, and numerical properties of ingredients, reaction conditions, and so forth, used in the specification and claims are contemplated to be able to be modified in all instances by the term "about".

The term "approximately" when immediately preceding a numerical value means a range (e.g., plus or minus 5% of that value). For example, "approximately 50" can mean 47.5 to 52.5, "approximately 25,000" can mean 23,750 to 26,250, etc., unless such an interpretation would result in a value above or below range of possible values, such as below 0% or above 100% of a possible value.

The term "including all ranges and subranges there between" or equivalents, are used herein to denote the intention that disclosure of any range or series of possible values, inherently also discloses all ranges and subranges encompassed by the highest and lowest values disclosed. This term includes the entire range from highest to lowest disclosed values, as well as subranges from any two or more disclosed points. This term is also intended to disclose any subranges encompassed anywhere within the highest and lowest disclosed values, including between two points that are explicitly recited in the document, up to one decimal point. Thus, disclosure of values 0, 5, 10, 15, 20, including all ranges and subranges therebetween, should be interpreted as also encompassing a range from 0-20, a range from 0-5 or 5-15, as well as a range from 2-16, or 3.1 to 19.8, etc.

Unless otherwise indicated, it is to be understood that all numbers expressing quantities, ratios, and numerical properties of ingredients, reaction conditions, and so forth, used in the specification are contemplated to be able to be modified in all instances by the term "including all ranges and subranges therebetween."

As used herein, the term "encapsulated" refers to a compound, substance, or composition that is substantially surrounded, enclosed, or contained within a secondary structure. The encapsulated state, or encapsulation, results in isolation, protection, stabilization, or controlled release of said substance, composition. The encapsulated state may be achieved by a variety of methods including but not limited to physical entrapment, or formation of barrier layers, such as a coating. The encapsulated form may further be characterized by modified release, enhanced stability, controlled delivery, or improved efficacy, such as more durable efficacy, compared to the non-encapsulated form of the substance, compound, or composition.

As used herein, the term "dispersion" refers to a system in which an active agent, such as an antimethanogenic compound, is distributed throughout an inert carrier or matrix. The term encompasses distribution in solid, semi-solid, or liquid states, which may be achieved by various methods involving physical/mechanical mixing, solvent-based techniques, and melting processes, among others.

As used herein, the term "biodegradable" refers to a material or substance that is capable of being degraded or broken down into simpler molecular components through natural biological processes within a living organism or physiological environment. Such degradation may occur through various mechanisms, including, but not limited to, any of hydrolysis, enzymatic action, mechanical degradation, and thermal degradation, among others.

As used herein, the term "unit dosage form" refers to a single, discrete composition containing a specific quantity of an active ingredient, such as an antimethanogenic substance, which serves as a complete individual dose. Typically, unit dosage forms are designed to be used without further manipulation or division prior to administration. The term "unit dose form" may be used interchangeably with "unit dosage form." Illustrative examples of unit dosage forms include tablets, capsules, and pills.

As used herein, the term "intermittent dosing schedule," or simply "intermittent dosing" refers to a dosing regimen characterized by alternating periods of drug delivery, such as administration of an exemplary composition as described herein, and periods wherein no drug is administered. In some examples, intermittent dosing involves dosing intervals of greater than once daily, such as such as biweekly, weekly, monthly, or at variable intervals therein.

As used herein, the term "long-acting" or "long acting" refers to a composition that, upon a single administration, provides relatively prolonged or sustained therapeutic efficacy compared to a conventional formulation of the same active ingredient. Such durable efficacy is characterized by long-lasting drug action, such as inhibition of methanogenesis in a ruminant animal by an antimethanogenic agent. In one example, such extended drug action is evidenced by a sustained reduction in detected methane emissions. In embodiments, the provided long-acting compositions contains a slow-release composition.

As used herein, the term "slow-release" refers to a drug delivery mechanism designed to release an active agent, such as an antimethanogenic drug, at a rate that is reduced relative to an immediate release formulation. Such "slow-release" delivery can extend the duration of drug release relative to an immediate release formulation, maintain a desired therapeutic range of drug concentration over an extended period of time, and even facilitate drug delivery to a predetermined location, for example, the rumen of a ruminant animal. within the body. Herein, "slow release" may be used interchangeably with the terms "controlled release," "sustained release," "extended release," or "delayed release."

As used herein, the terms "infuse" and "infused" refer to a process or state involving introduction of a substance, such as a liquid containing an antimethanogenic agent, into a separate, distinct medium, such as by gradual or controlled permeation of the substance into the medium.

As used herein, the term "infused edible substrate" refers to a substance that is edible by a ruminant animal, and that possesses physical and chemical properties allowing for penetration by a liquid or a gas, such as a liquid or gas containing a therapeutic agent. In some embodiments, the therapeutic agent is an antimethanogenic agent. For example, the substrate can be porous, containing small spaces or voids that allow for penetration of liquid and/or gas. Non-limiting examples of infused edible substrate include raw or processed agricultural products, grains, cereals, legumes, nuts, seeds, fruits, vegetables, meats, dairy products, eggs, processed foods, animal feed, and any combinations thereof. The term encompasses such substances in various forms, including but not limited to whole, cut, sliced, ground, powdered, or otherwise processed forms. Furthermore, the term "infused edible substrate" includes both fresh and preserved foodstuffs, as well as ingredients or components used in food preparation or manufacturing. Reference to an infused edible substrate is understood to include reference to mixtures of distinct substrates, such as a "mixture of infused edible substrates." Herein, the "infused edible substrate" may be referred to as a "substrate." In some embodiments, the infused edible substrate is an infused drug delivery device.

As used herein, the term "infused drug delivery device" refers to a plant-based entity, such as a seed, grain, or other plant-derived structure, that has been modified, such as by infusion, to contain and/or deliver a pharmacologically active compound, e.g., an antimethanogenic agent. This system leverages the natural structure and components of the plant-based entity to capture, retain, and release the active agent(s) upon consumption, or other means of administration. The infused drug delivery device may include, but is not limited to, seeds, grains, and nuts. Herein, the term "device" can be used interchangeably with "infused drug delivery device."

As used herein, the term "seed" refers to a reproductive unit of a cultivated plant species. The seed is typically derived from a fertilized ovule, which contains the genetic material (embryo) and stored nutrients necessary for the development of a new plant. The term "seed" may be used interchangeably with "plant seed," "grain seed," "vegetable seed," and "fruit seed."

As used herein, the term "antimethanogenic" or "anti-methanogenic," for example, an antimethanogenic compound,"or an "anti-methanogenic dispersion," refers to any substance that inhibits the activity of methanogenic archaea, reduces enteric production of methane (methanogenesis) in a ruminant animal, or mitigates methane emissions from a ruminant animal.

As used herein, the terms "bioactive(s)" and "metabolite(s)" may be used interchangeably to refer to compounds formed through the metabolic activity of algae.

As used herein, "bioproduct" as used herein refers to any product produced from or derived from a renewable biological resource.

As used herein, "enzymatic inhibitors" refer to compounds that inhibit the enzymatic activities needed in methanogenesis.

As used herein, "feed efficiency" refers to the feed to gain ratio (F:G), or feed conversion ratio (FCR), and is a measure of an animal's efficiency in converting feed nutrients into increased body mass. Feed is measured by pounds of dry matter. Thus, a F:G of 5:1 (or "5") would mean that for every five pounds of feed, the animal gained one pound of weight.

As used herein, "hydrogen receptors" are compounds that compete with methanogens in the rumen for the utilization of metabolic hydrogen.

The terms "microorganism" and "microbe" mean any microscopic unicellular organism and can include bacteria, microalgae, yeast, or fungi.

As used herein, "microflora modifying inhibitors" (MMIs) are compounds that inhibit gram-positive bacteria and protozoa, thereby decreasing the substrates for methanogenesis.

"W/W" or "w/w", in reference to proportions by weight, refers to the ratio of the weight of one substance in a composition to the weight of the composition.

As used herein, "and/or" refers to and encompasses any and all possible combinations of one or more of the associated listed items.

DETAILED DESCRIPTION

Overview

The present disclosure relates to compositions and drug delivery devices, such as long-acting compositions and devices comprising antimethanogenic compounds, and methods of administering the same to ruminant animals in order to reduce their enteric methane emissions. In certain aspects, the long-acting compositions are capable of effectively reducing a ruminant animal's methane emissions with a relatively low dose of an antimethanogenic agent for an extended or sustained period of time. The disclosure further relates to methods of manufacturing the disclosed long-acting compositions and devices antimethanogenic compounds.

I. Long-Acting Compositions

In some aspects, provided herein are long-acting compositions, such as long-acting compositions including an antimethanogenic agent. In embodiments, the provided long-acting compositions are suitable for administration to a ruminant animal. In certain embodiments, the provided long-acting compositions are configured to provide durable, sustained efficacy while containing relatively lower absolute doses of an antimethanogenic agent. In embodiments, the effects of the provided long-acting compositions are immediately evident and persist over time. For example, a reduction in methane emissions from a ruminant animal can be observed relatively quickly after administration of a provided long-acting composition to the ruminant animal, and the reduction can be observed for at least 24 hours after a single administration.

Various antimethanogenic compositions are available, some of which are characterized as long-acting compositions. However, such compositions may include a relatively high dose of an antimethanogenic agent. High doses of antimethanogenic agents have been associated with toxicity and reduced animal productivity, such as resulting in lower feed intake and decreased milk production. Additionally, including high doses of antimethanogenic agents into compositions increases economic costs, and certain antimethanogenic agents may themselves contribute to environmental degradation.

Antimethanogenic Agents

Antimethanogenic compounds, such as inhibitors of methanogenesis, can be classified into three different types based on their mode of action. Those that act on the microflora itself are called microflora modifying inhibitors (MMIs). Those that serve as an alternative hydrogen sink in the rumen, and thus compete with the methanogens for hydrogen, are called hydrogen receptors (HRs). Those that interfere with or inhibit the enzymatic activities needed for methanogenesis are called enzymatic inhibitors (EIs). Persons having skill in the art will be familiar with inhibitors within each of these categories, which are described in more detail, below.

Microflora Modifying Inhibitors (MMIs)

Methanogens make up about 5% of the rumen microbiome, the rest being comprised of bacteria. *Methanobrevibacter* spp., *Candidatus methanomethylophilus*, *Methanosphaera* spp., and *Methanomicrobium* spp. are among the most abundant methanogens, but other species have been identified. For example, *Methanobacterium formicicum*, *Methanobacterium bryantii*, *Methanobrevibacter ruminantium*, *Methanobrevibacter millerae*, *Methanobrevibacter olleyae*, *Methanomicrobium mobile*, *Methanoculleus olentangyi*, and *Methanosarcina barkeri* (Janssen P. H. & Kirs M. Structure of the archaeal community of the rumen. *Appl. Environ. Microbiol.* 2008; 74:3619-3625; Wang Z. et al., Investigation and manipulation of metabolically active methanogen community composition during rumen development in black goats. *Sci. Rep.* 2017; 7:422). A group distantly related to the *Thermoplasmatales* has also been identified (Poulsen M. et al., Methylotrophic methanogenic *Thermoplasmata* implicated in reduced methane emissions from bovine rumen. *Nat. Commun.* 2013; 4:1428). Example MMIs include, but are not limited to, monensin, nitroimidazoles, saponins, tannins, and combinations thereof.

Additional examples of MMIs include, for example nitroimidazoles such as metronidazole, metronidazole esters and/or isomers or hydrophobic imidazole derivatives or rifaximin or neomycin sufficient to eradicate, substantially reduce, or reduce the enteric methanogen colonization. Additional examples of antibiotics include but are not limited to aminoglycosides (e.g., amikacin, gentamicin, kanamycin, neomycin, netilmicin, streptomycin, tobramycin, paromomycin), ansamycins (e.g., geldanamycin, herbimycin), carbacephems (e.g., loracarbef), carbapenems (e.g., ertapenem, doripenem, imipenem, cilastatin, meropenem), cephalosporins (e.g., first generation: cefadroxil, cefazolin, cefalotin or cefalothin, cefalexin; second generation: cefaclor, cefamandole, cefoxitin, cefprozil, cefuroxime; third generation: cefixime, cefdinir, cefditoren, cefoperazone, cefotaxime, cefpodoxime, ceftazidime, ceftibuten, ceftizoxime, ceftriaxone; fourth generation: cefepime; fifth generation: ceftobiprole), glycopeptides (e.g., teicoplanin, vancomycin), macrolides (e.g., azithromycin, clarithromycin, dirithromycin, erythromycin, roxithromycin, troleandomycin, telithromycin, spectinomycin), monobactams (e.g., aztreonam), penicillins (e.g., amoxicillin, ampicillin, azlocillin, carbenicillin, cloxacillin, dicloxacillin, flucloxacillin, mezlocillin, meticillin, nafcillin, oxacillin, penicillin, piperacillin, ticarcillin), antibiotic polypeptides (e.g., bacitracin, colistin, polymyxin b), quinolones (e.g., ciprofloxacin, enoxacin, gatifloxacin, levofloxacin, lomefloxacin, moxifloxacin, norfloxacin, ofloxacin, trovafloxacin), rifamycins (e.g., rifampicin or rifampin, rifabutin, rifapentine, rifaximin), sulfonamides (e.g., mafenide, prontosil, sulfacetamide, sulfamethizole, sulfanilamide, sulfasalazine, sulfisoxazole, trimethoprim, trimethoprim-sulfamethoxazole (co-trimoxazole, "tmp-smx"), and tetracyclines (e.g., demeclocycline, doxycycline, minocycline, oxytetracycline, tetracycline) as well as arsphenamine, chloramphenicol, clindamycin, lincomycin, ethambutol, fosfomycin, fusidic acid, furazolidone, isoniazid, linezolid, metronidazole, mupirocin, nitrofurantoin, platensimycin, pyrazinamide, quinupristin/dalfopristin combination, tinidazole, and combinations thereof.

Hydrogen Receptors (HRs)

A byproduct of the high starch diets broken down by rumen microbes is hydrogen production. If left unchecked, accumulated hydrogen has detrimental effects on the rumen, such as decreased pH, the deactivation of biomass-degrading enzymes, and a reduction in feed conversion. Methanogens in the rumen take hydrogen and combine it with $CO_2$ to produce $CH_4$, thus removing hydrogen from the rumen system. However, as discussed herein, methane is a greenhouse gas. Thus, one of the mechanisms to reduce enteric methane emissions is to provide an alternative hydrogen sink.

Examples of HRs include, but are not limited to, phenol, catechol, resorcinol, hydroquinone, pyrogallol, phloroglucinol, gallic acid, formic acid, sulfur (including for example sulfate, sodium sulfate), nitrate (including for example potassium nitrate, calcium ammonium nitrate, sodium nitrate, calcium nitrate), fumarate (including for example fumaric acid, sodium fumarate, sodium acrylate), and combinations thereof.

Enzymatic Inhibitors (EIs)

There are at least three anaerobic pathways archaea use to generate methane. The hydrogenotrophic pathway, where $CO_2$ and hydrogen are used and utilizes at least ten methanogen specific enzymes (Shima S, et al., 2002. Structure and function of enzymes involved in the methanogenic pathway utilizing carbon dioxide and molecular hydrogen. *J. Biosci. Bioeng.* 93:519-530). The methylotrophic pathway, where methanol and methylamines are used as substrates, and the aceticlastic pathway, where acetate is used to make methane. Antimethanogenic compounds classified as enzymatic inhibitors inhibit or interfere with one or more of the enzymes required for any one of these pathways.

Examples of EIs include, but are not limited to, 3-nitroxy propanol (3-NOP), which is an analog of methyl-coenzyme M and it inhibits methyl-coenzyme M reductase (Duin E, C. et al., Mode of action uncovered for the specific reduction of methane emissions from ruminants by the small molecule 3-nitrooxypropanol. *Proc. Natl. Acad. Sci.* USA. 2016; 113:6172-6177), Agolin, Biochar, cinnamon, garlic (Ding H, Ao C, Zhang X. Potential use of garlic products in ruminant feeding: A review. *Anim Nutr.* 2023 Jul. 13; 14:343-355), allicin, Enterix™, oregano extract, and volatile halogenated organic compounds (VHOCs).

VHOCs are another type of EI that can be used as antimethanogenic compounds to inhibit microbial methanogenesis (R. D. Kinley et al. Mitigating the carbon footprint and improving productivity of ruminant livestock agriculture using a red seaweed *J. Clean. Prod.,* 259 (2020)). Antimethanogenic compounds can also reduce acetate levels and or the acetate: propionate ratio, thereby reducing methanogenesis (R. Kinley et al. In vitro evaluation of the antimethanogenic potency and effects on fermentation of individual and combinations of marine macroalgae *Am. J. Plant Sci.,* 07 (2016), pp. 2038-2054 and E. D. Johnson et al. Some effects of methane inhibition in ruminants (steers) *Can. J. Animal. Sci.,* 52 (1972), pp. 703-712).

Macroalgae, such as seaweed, and microalgae produce a wide range of secondary metabolites that can be used for any number of purposes. Among these are VHOCs.

These algae produce various peroxidases, which react with hydrogen peroxide and organic matter to form VHOCs. As an example, in species of *Asparagopsis*, a peroxidase catalyzes the conversion of halide anions (i.e. Br—) to hypohalous acid (i.e. HOBr) with hydrogen peroxide acting as the oxidizing agent.

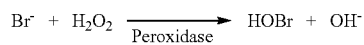

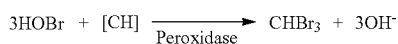

The resulting hypohalous acid (e.g. HOBr) is not stable and will react with selective substrates to form, for example, bromoform and other brominated compounds, such as dibromochloromethane (shown below). As discussed in more detail in later sections of this document, corresponding structures also form when other halides are used in the reaction.

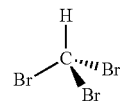

Bromoform
$\Delta H_{C-Br}$ 278 kJ/mol

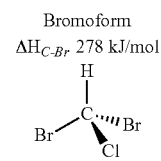

Dibromochloromethane (DBCM)

Examples of VHOCs include, but are not limited to, methyl halides—$CH_3Br$, $CH_3Cl$, $CH_3I$, $CH_3F$, bromodichloromethane ($CHBrCl_2$), trichlorethylene ($C_2HCl_3$), bromoform ($CHBr_3$), chloroform ($CHCl_3$), iodoform ($CHI_3$), fluoroform ($CHF_3$), and dibromomethane ($CH_2Br_2$).

Bromoform ($CHBr_3$) is colorless to pale yellow, with a sweet odor. It is denser than water, and soluble in water though not at high concentrations. Bromoform is the most abundant VHOC produced by seaweeds of the genus *Asparagopsis*, but it is also produced by, for example, other red seaweeds (e.g. *Chondrus crispus, Gigartina stellata*), brown seaweeds (e.g. *Ascophyllum nodosum, Fucus vesiculosis Macrocystis pyrifera*) green seaweeds (e.g. *Enteromorpha linza, Ulva lacta*), blue green algae, microalgae, and phytoplankton.

Chloroform ($CHCl_3$) is a clear, colourless, volatile, non-flammable liquid with a pleasant, sweet odour. Chloroform can be produced during the atmospheric photodegradation of trichloroethylenes. It is produced by the tropical red algae (*Asparagopsis armata*) and by the red seaweed (*A. taxiformis*). Chloroform has been reported to be produced by micro algae in the North Sea and open ocean of the northeast Atlantic. Chloroform does not contain chromophores that absorb at wavelengths >290 nm and, therefore, is not expected to be susceptible to direct photolysis by sunlight. If released to soil, chloroform is expected to have very high to moderate mobility based upon Koc values of 34-196. Under normal environmental conditions, chloroform is not expected to undergo biodegradation in soil. However, chloroform may be anaerobically degraded by methanogenic bacteria in the presence of a primary substrate such as acetic acid.

Iodoform is a pale yellow, crystalline, volatile substance, with a penetrating and distinctive odor and sweetish taste. Iodoform may be synthesized in the haloform reaction by the reaction of iodine and sodium hydroxide with one of organic compounds selected from a methyl ketone ($CH_3COR$, where R is an organic side chain), acetaldehyde, ethanol, and secondary alcohols ($CH_3CHROH$, where R is an alkyl or aryl group).

Antimethanogenic Compounds Obtained from Algae

Antimethanogenic compounds may be obtained from any number of sources, such as algae, fungi, yeast, and microorganisms. They may also be manufactured (synthetic).

Many algal species are capable of producing commercially valuable bioactives, metabolites including antimethanogenic compounds, and can be induced to do so at commercially relevant levels (see for example U.S. patent application Ser. No. 18/496,409 (US 2024-0060092), which is hereby incorporated by reference in its entirety for all purposes).

In some embodiments of the disclosure, the antimethanogenic compound(s) is obtained from an algae of the genus *Asparagopsis*, for example, *A. armata, A. taxiformis, A. svedelli, A. delilei, A. hamifera, A. sanfordiana*. However, it is understood that other species of macroalgae and microalgae also produce antimethanogenic compounds. For example, other types of red algae, including, but not limited to, those of the Order Rhodophyta, Class Florideophyceae, including *Gracilaria* and *Plocamium*. In still a further embodiment, the red algae is of the genus *Gracilariales* or *Palmeria*. In another embodiment, the red algae is of the order Gigartinales or Chondrus.

In addition, the antimethanogenic compound(s) may be produced by brown algae. For example, those of class Phaeophyceae, such as the order Laminariales, including *Laminaria* spp., *Macrocystis pyrifera, Nereocystis* spp. and other kelps, as well as Dictyota.

Furthermore, the antimethanogenic compound(s) may be obtained from single or multiple species of algae and may comprise microalgae, macroalgae, or a combination of both.

Additional sources of antimethanogenic compounds include, for example, species of *Bonnemaisonia, Delisea, Ptilonia, Leptophyllis*, and/or *Pleuroblepharidella*.

In some embodiments, the antimethanogenic compound(s) is obtained from *Laminaria saccharina, Laminaria digitata, Fucus vesiculosis, Fuscus distichus, Alaria esculenta, Chorda filum, Ceramium rubrum, Corallina pilulifera, Pelvetia canaliculate, Ascophyllum nodusum, Chondrus crispus, Plocamium hamatum, Gigartina stellata, Enteromorpha linza, Ulva lacta, Bonnemaisonia hamifera, Asparagopsis taxiformis, Asparagopsis Armata, Gracilaria* spp., *Antithamnionella sarniensis, Antithamnion plumula*, or *Macrocystis pyrifera*.

In some embodiments, the antimethanogenic compound(s) is obtained from phytoplankton, such as a diatom species from *Nitzschia* and/or *Porosira*. In some embodiments, the antimethanogenic compound(s) is obtained from a species of green algae. In some embodiments, the antimethanogenic compound(s) is obtained from a species of blue green algae (also known as cyanobacteria), such as *Arthrospira platensis* or a species of *Chlorella*, including but not limited to, *Chlorella protothecoides*, and *Chlorella vulgaris*.

Antimethanogenic Compounds Obtained From Fungi

In some embodiments, the antimethanogenic compound(s) is obtained from a fungus. In some embodiments, the fungus is a *Pleurotus* spp. fungi, e.g., *P. ostreatus* (oyster mushrooms), a *Lentinula* spp. fungi, e.g., *L. edodes* (shiitake mushrooms), and/or a *Trichoderma* spp. fungi, e.g., *T. harzianum* and/or *T. viride*. More description of non-limiting examples of fungi can be found, for example, in US 2021/0315952 and WO 2021/163148, the content of each of which is incorporated by reference in its entirety for all purposes.

Antimethanogenic Compounds Obtained From Yeast

In some embodiments, the antimethanogenic compound(s) is obtained from a yeast. In some embodiments, the yeast is *Wickerhamomyces anomalus, Saccharomyces* spp. (e.g., *S. cerevisiae* and/or *S. boulardii*), *Starmerella bombicola, Meyerozyma guilliermondii, Pichia occidentalis, Monascus purpureus*, and/or *Acremonium chrysogenum*. More description of non-limiting examples of yeast can be found, for example, in US 2021/0315952 and WO 2021/163148, the content of each of which is incorporated by reference in its entirety for all purposes.

Antimethanogenic Compounds Obtained From Bacteria

In some embodiments, the antimethanogenic compound(s) is obtained from a bacterium. In some embodiments, the bacterium is one or more *Bacillus* spp. bacteria. In some embodiments, the *Bacillus* spp. are *B. amyloliquefaciens, B. subtilis* and/or *B. licheniformis*. More description of non-limiting examples of bacteria can be found, for example, in US 2021/0315952 and WO 2021/163148, the content of each of which is incorporated by reference in its entirety for all purposes.

In some embodiments the antimethanogenic compounds(s) is obtained from cyanobacteria. In some embodiments the antimethanogenic compounds(s) is obtained from a cyanobacteria of the genus *Arthrospira*. In some embodiments the antimethanogenic compounds(s) is obtained from *Arthrospira platensis* or *Arthrospira maxima*. In some embodiments the antimethanogenic compounds(s) is obtained from spirulina.

Spirulina is high in gamma-linolenic acid, and can, in some embodiments, decrease methane production while increasing propionate synthesis (see Liang Y et al. Effects of spirulina supplementation on lipid metabolism disorder, oxidative stress caused by high-energy dietary in Hu sheep. *Meat Sci*. (2020) and Li et al. Effects of dietary linseed oil and propionate precursors on ruminal microbial community, composition, and diversity in yanbian yellow cattle. *PLoS ONE*. (2015)).

Antimethanogenic Compounds Obtained From Engineered Organisms

In some embodiments, the antimethanogenic compound is obtained from a genetically engineered microorganism. Methods of cloning and expressing genes are well known in the art. For example, vanadium bromoperoxidase from the marine red alga *Corallina officinalis* has been cloned and heterologously expressed in *Esherichia coli*. The recombinant vanadium bromoperoxidase behaved similarly to native vanadium bromoperoxidase from the alga (Carter J N, et al. Reactivity of recombinant and mutant vanadium bromoperoxidase from the red alga *Corallina officinalis*. *J Inorg Biochem*. 2002 Jul. 25; 91(1):59-69).

In another example, a bromoperoxidase from macro-alga *Corallina pilulifera* was cloned and expressed in *E. coli* (Shimonishi M, et al., Cloning and expression of the gene for a vanadium-dependent bromoperoxidase from a marine macro-alga, *Corallina pilulifera*. FEBS Lett. 1998 May 22; 428(1-2):105-10).

Synthetic Antimethanogenic Compounds

In some embodiments, the antimethanogenic compound(s) is a synthetic. In some embodiments, the antimethanogenic compound is a statin. The term "statin" refers to a class of compounds that is known in the art as inhibitors of HMG-COA reductase used as lipid lowering agents. In some embodiments, the antimethanogenic statin is selected from atorvastatin, cerivastatin, dalvastatin, eptastatin, fluindostatin, fluvastatin, lovastatin, mevastatin, pitavastatin, pravastatin, rosuvastatin, simvastatin, velostatin, and pharmaceutically acceptable salts, stereoisomers, or prodrug derivatives thereof. In some embodiments, the antimethanogenic statin is lovastatin, or its pharmaceutically acceptable salts, stereoisomers, or prodrug derivatives thereof. Further descriptions of antimethanogenic statin can be found, for example, in US 2018/0289816, the content of which is incorporated by reference in its entirety for all purposes.

In some embodiments, the antimethanogenic compound comprises nitrate ion. In some embodiments, the antimethanogenic compound is calcium nitrate tetrahydrate anhydrous [$Ca(NO_3)_2$], magnesium nitrate [$Ca(NO_3)_2 \cdot 4H_2O$], calcium nitrate [$Mg(NO_3)_2 \cdot 6H_2O$], sodium nitrate ($NaNO_3$), potassium nitrate ($KNO_3$) and ammonium nitrate ($NH_4NO_3$), cal-urea nitrate [Ca(NO$_3$)$_2$·4CO(NH$_2$)$_2$], the double salt of ammonium sulfate and nitrate, or a combination thereof. Further descriptions of nitrate ion containing antimethanogenic compounds can be found, for example, in US 2016/0165928, the content of which is incorporated by reference in its entirety for all purposes.

A. Infused Edible Substrates

In some aspects, provided herein are infused edible substrates, such as edible substances capable of accumulating, containing, or releasing an infused therapeutic agent, such as an antimethanogenic agent. The therapeutic agent can be infused by a variety of mechanisms. In one example, the therapeutic agent can be solubilized in a liquid, and a substrate can be soaked in the liquid containing the therapeutic agent, thereby producing an infused edible substrate. In another example, a substrate can be contacted with vapor containing the antimethanogenic agent, thereby also producing an infused edible substrate. Regardless of the mode of infusion, the substrate has a physical and chemical composition that is amenable to infusion of a therapeutic agent, such as an antimethanogenic agent.

In embodiments, substrates for delivery of a therapeutic agent, such as an antimethanogenic agent are naturally porous or have a cellular structure that facilitates infusion of a liquid or a gas, such as a vapor. The substrate can have a relatively high surface area to volume ratio, e.g., as represented by grains, cereals, and seeds, which facilitates thorough contact between the infused substance and the substrate. The organic content of edible substrates may also bind to the infused therapeutic agent, thereby facilitating accumulation and retainment of the agent. Although edible, the substrate may also be regurgitated by a ruminant animal administered the substrate. Non-limiting examples of infused edible substrates include raw or processed agricultural products, grains, cereals, legumes, nuts, seeds, fruits, vegetables, meats, dairy products, eggs, processed foods, animal feed, and any combinations thereof.

In some embodiments, infused edible substrates are manufactured and therefore exclude algae or other biological substances that internally produce the therapeutic agent (e.g., antimethanogenic agent).

In some embodiments, the therapeutic agent is not synthesized within the infused edible substrate. In some embodiments, the therapeutic agent, such as the drug, is exogenous to or not produced by or within the infused edible substrate. In some embodiments, the infused edible substrate is not genetically modified. In some embodiments, the infused edible substrate does not contain a recombinant protein. In some embodiments, the infused edible substrate does not contain a recombinant protein that is involved in the biosynthesis of an antimethanogenic agent.

In some embodiments, the infused edible substrate is an infused drug delivery device, such as those comprising a grain, seed, or nut.

Therapeutic Agent

In some embodiments, disclosed infused edible substrates contain an infused therapeutic agent. Herein, the term "therapeutic agent" may be used interchangeably with "active agent," "drug," and the like. Therapeutic agents can be referred to as "infused" once they have been infused/introduced into the edible substrate or drug delivery device.

In some embodiments, the therapeutic agent contains any of an antimethanogenic agent, an antimicrobial agent, an antibiotic, an anthelmintic, an antiprotozoal, an anti-inflammatory agent, a hormone, a rumen modifier, a vitamin or mineral, a diuretic, an analgesic, an anticholinergic, an anesthetic, a sedative, including combinations thereof.

In some embodiments, the therapeutic agent contains an antimethanogenic agent. In some embodiments, the antimethanogenic agent includes a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.

In some embodiments, the antimethanogenic agent includes a microflora modifying inhibitor (MMI), a hydrogen receptor (HR), an enzymatic inhibitor (EI), or a combination thereof.

In some embodiments, the antimethanogenic agent includes any of 3-nitrooxypropanol (3-NOP), bromochloromethane, 2-bromoethanesulfonate, chloromethane (CH$_3$Cl), iodomethane (CH$_3$I), fluoromethane (CH$_3$F), bromodichlormethane (CHBrCl$_2$), trichlorethylene (C$_2$HCl$_3$), bromoform (CHBr$_3$), chloroform (CHCl$_3$), iodoform (CHI$_3$), fluoroform (CHF$_3$), dibromomethane (CH$_2$Br$_2$), including combinations thereof.

In some embodiments, the therapeutic agent is solubilized in a liquid carrier for infusion into the substrate's interior (e.g., infusible into the infusible edible substrate or infused drug delivery device).

In some embodiments, the infused edible substrate contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of therapeutic agent per gram of substrate. In some embodiments, the substrate is an infused drug delivery device, such as those comprising a grain or seed.

In some embodiments, the infused edible substrate contains at least about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of therapeutic agent per gram of substrate, including all ranges and subranges therebetween.

In some embodiments, the therapeutic agent, such as the drug, is exogenous to or not produced by or within the substrate. In some embodiments, the substrate is not genetically modified. In some embodiments, the substrate does not contain a recombinant protein. In some embodiments, the substrate does not contain a recombinant protein that is involved in the biosynthesis of an antimethanogenic agent.

Carriers

In some embodiments, the therapeutic agent that is infused into the edible substrate or drug delivery device is solubilized in a liquid carrier. In some embodiments, the liquid carrier contains a hydrophilic solvent, a hydrophobic solvent, or a combination thereof. In some embodiments, the liquid carrier is water-soluble.

In some embodiments, the liquid carrier contains any of the following water-soluble compounds: acetic acid, acetic acid anhydride, acetone, allyl alcohol allyl chloride amyl acetate amyl alcohol (1-pentanol) aniline, beer, benzene, benzyl alcohol, bromine, butanediol (1,4-butanediol), butanetriol (1,2,4-butanetriol), butyl acetate, butyl alcohol, 1-butanol, butyl butyrate, butyl propionate, 2-butanol, butyric acid, carbon disulphide, carbon tetrachloride, cyclohexanol, cyclohexanone, diethylene glycol, dimethyl sulfoxide, dipropylene glycol, ethyl acetate, ethyl alcohol (ethanol), ethyl butyrate, ethyl glycol, ethyl propionate, ethyl pyruvate, ethylene carbonate, ethylene glycol, formic acid, furfurol, 2-furaldehyde, glycerin, gelatin, heptane, hexane, hexanol, isopropyl alcohol (rubbing alcohol), isopropyl acetate, isopropyl butyrate, isopropyl propionate, isobutanol, kerosene, methyl acetate, methyl butyrate, methyl propionate, methyl pyruvate, methyl alcohol, methanol, 2-methylbutanoic acid, methylene chloride, dichloromethane, milk, nitrobenzene, nonane, octane, pentane, pentanediol (1,5-pentanediol), pentanetriol (1,2,5-pentanetriol), phenol, propyl acetate, propyl butyrate, propyl propionate, propylene glycol, propanol, propionic acid, propylene, carbonate, sea water, styrene, tert-butanol, tetrachloroethane, tetrachloroethylene, tetrahydrofuran, toluene, triacetin, trichloroethylene, triethylene glycol, and water, including combinations thereof.

In some embodiments, the liquid carrier contains a water-soluble alcohol. In some embodiments, the liquid carrier is a glycol. Non-limiting examples of glycols include propylene glycol, diethylene glycol, dipropylene glycol, triethylene glycol, and combinations thereof.

In some embodiments, the liquid carrier contains a lipid, an oil, a vegetable oil, a hydrogenated vegetable oil, a fatty acid, or a combination thereof. In some embodiments, the liquid carrier contains DMSO, propylene glycol, PEG, cyclodextrin, triacetin, N-methyl-2-pyrrolidone (NMP), glycerin, benzyl alcohol, or a combination thereof. In some embodiments, the liquid carrier is a non-toxic carrier, such as a carrier that is suitable as an additive for animal feed. In some embodiments, the non-toxic carrier is beneficial for the ruminant animal.

Infusable Vapor/Antimethanogenic Compound Vapor

In some embodiments, the infused therapeutic agent is vaporized, thereby forming an infusable vapor, for infusion into a substrate or drug delivery device. In some embodiments, the vapor is a antimethanogenic vapor.

In some embodiments, the therapeutic agent has a sufficiently high vapor pressure that it vaporizes at room temperature and standard atmospheric conditions. In some embodiments, the thereapeutic agent is vaporized through one or more technique. Persons having skill in the art will be familiar with ways of vaporizing compounds. For example, in some embodiments, therapeutic agents (e.g., antimethanogenic compounds) of the present disclosure are vaporized by applying heat, sonication, and/or reducing atmospheric pressure. In some embodiments, vaporization is enhanced by dissolving the therapeutic agent in a solvent with higher vapor pressure.

Factors to consider during infusion of a substrate by a vaporized therapeutic agent include the penetration of the vapor, absorption of the vapor to the substrate's interior, vapor specific gravity, circulation of the vapor and leakage of vapor from an enclosure, such as an infusion chamber. See, e.g., International Plant Protection Convention. (2018). Draft ISPM: Requirements for the use of fumigation as a phytosanitary measure (2014-004). Retrieved from https://www.ippc.int/static/media/files/publication/en/2019/01/MT538Rev1_DraftISPAM_Fumigation_2014-004_en.pdf.

In some embodiments, vapors of the present disclosure can be infused into edible substrates and/or drug delivery devices.

Drug Delivery Devices

In some embodiments, the provided edible substrate is a drug delivery device. In some embodiments, the drug delivery device of the present disclosure include a) a grain or seed, and (b) a drug or therapeutic agent infused within the inner portion of the grain or seed.

After observing corn kernels in cattle manure, Applicant hypothesized that grain or seed could serve as a drug delivery vehicle. Specifically, the inventors hypothesized that seed or grain could be infused with therapeutic agent, and that the grain or seed's hull/seed coat would protect the therapeutic agent from dissipation into the atmosphere before administration, and would similarly extend effects when administered to an animal. The inventors surprisingly discovered that feeding cattle with grain or seed infused with an antimethanogenic compound, such as bromoform, resulted in substantial and sustained reductions of the cattle's enteric methane emissions, as further described in the Examples section herein.

Different attributes of seeds and grain may contribute to this unexpected discovery. For example, the protective pericarp of corn kernels and other seeds, e.g., the thick and tough protective skin of the kernel, is high in cellulose content, which may contribute to its resistance in the rumen environment. Additionally, the behavior of cattle may contribute to slow release of the active agent contained therein, for example, non-uniform and incomplete chewing. Whereas some seeds may be chewed thoroughly, others may remain whole and pass through the digestive system without being fully broken down, facilitating release of an active agent to the animal rumen.

In some embodiments, disclosed drug delivery devices include an infused composition. In some embodiments, the infused composition contains an drug. In some embodiments, the drug is solubilized in a liquid carrier.

In some embodiments, the device contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of therapeutic agent per gram of device.

In some embodiments, the device contains at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of therapeutic agent per gram of device, including all ranges and subranges therebetween.

In some embodiments, the device contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of an antimethanogenic agent per gram of device.

In some embodiments, the device contains at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of an antimethanogenic agent per gram of device, including all ranges and subranges therebetween.

In some embodiments, the therapeutic agent is not synthesized within the device. That is, some embodiments, the therapeutic agent is not synthesized/expressed within the grain or seed. In some embodiments, the therapeutic agent, such as the drug, is exogenous to or not produced by or within the device. In some embodiments, the device is not genetically modified e.g., via transformation or any genetic editing tools, such as CRISPR and the like. In some embodiments, the device does not contain a recombinant protein. In some embodiments, the device does not contain a recombinant protein that is involved in the biosynthesis of an antimethanogenic agent.

In one example, the production of the antimethanogenic agent bromoform involves coordination between fatty acid synthases (FAS), ROS-producing NAD(P)H oxidases, and haloperoxidases. FAS enzymes synthesize fatty acids through a series of reactions involving elongation and modification of carbon chains. Intermediates in the fatty acid biosynthesis pathway, particularly β-keto acids and β,δ-polyones, can serve as substrates for haloperoxidases. Compounds like pentane-2,4-dione and heptane-2,4,6-trione, which resemble fatty acid biosynthetic intermediates, have been shown to be viable substrates for bromoform production. See, e.g., Thapa et al., *ACS Chem Biol.* 2020 Jun. 8; 15(6):1662-1670.

Additionally, ROS-producing NAD(P)H oxidases, found to be clustered with genes encoding bromoform-producing haloperoxidases in *A. taxiformis*, generate hydrogen peroxide. Haloperoxidases use the hydrogen peroxide along with bromide ions to halogenate the FAS-derived substrates, leading to the formation of bromoform and other brominated compounds.

In some embodiments, the substrate does not contain a recombinant protein, such as an enzyme, that is involved in the biosynthesis of a haloform, e.g., bromoform.

In some embodiments, the substrate does not contain a fatty acid synthase (FAS) enzyme. Non-limiting examples of FAS enzymes include beta-ketoacyl-[acyl-carrier-protein] synthase III (FabH), phosphopantetheinyl transferase (sfp), acetyl-CoA carboxylase (ACCase), and malonyl CoA synthetase (MatB).

In some embodiments, the substrate does not contain an ROS-producing NAD(P)H oxidase (NOX enzyme). A representative NOX enzyme is Mbb2, which was identified in *A. taxiformis*. Corresponding genes were also identified in the algae species *Chondrus crispus* and include the VHPO genes CcVHPO1-5 and the NOX gene CcMbb2. See, e.g., Thapa et al., 2020, ACS Chem Biol. 15(6): 1662-1670). Additional NOX enzymes, which catalyze the transfer of electrons from NADPH to molecular oxygen, producing reactive oxygen species (ROS), are described, e.g., by Vermot et al., *Antioxidants* (Basel). 2021 Jun. 1; 10(6):890.

In some embodiments, the substrate does not comprise a recombinant haloperoxidase. The haloperoxidase can be a vanadium-dependent haloperoxidase (VHPO), such as, but not limited to Mbb1, Mbb3, and Mbb4. Additional recombinant enzymes involved in the biosynthesis of antimethanogenic agents, which are explicitly excluded from substrates of the disclosure are described in WO 2024/218767 A1.

Exemplary Biologic Drug Delivery Devices

In accordance with disclosed infused edible substrates, the provided biologic drug delivery devices have chemical and physical properties that allow for penetration of a therapeutic agent, e.g., either in liquid form or as vapor, to the interior of the device.

In some embodiments, disclosed drug delivery devices contain any of an outer fibrous component, an inner starchy component or embryo, and a vascular opening. One representative example of a disclosed drug delivery device is a seed.

Certain embodiments of a disclosed drug delivery device include an outer fibrous component, such as bran, a husk, a hull, a pericarp or a seed coat. For example, the outer fibrous component of a seed or grain is typically part of the seed coat, which is the protective outer layer of the seed. The seed coat, also known as the testa, forms from the integuments of the ovule and is derived from maternal tissue. See, e.g., Boundless. (2023 October 31). 32.8: Pollination and Fertilization—Development of the Seed. In Boundless Biology. LibreTexts. The outer fibrous layer may have varying degrees of permeability to allow for gas exchange and controlled water uptake during germination. In some embodiments the outer fibrous component completely envelops the grain or seed. In some embodiments, the outer fibrous component substantially envelops the grain or seed. In some embodiments there are breaks/openings within the outer fibrous component. Inventors have tested multiple grains/seeds and discovered that even larger openings (e.g., due to natural drying/maturation of the grain or seed), leave the device operable.

In embodiments, a disclosed biologic drug delivery device has an inner starchy component, such as endosperm, cotyledons, or starch granules. The endosperm and other internal structures of seeds and grains have a porous nature, which allows for the penetration and accumulation of gases and small molecules. The density of the starchy components can vary, improving the ability of exogenous compounds to penetrate and accumulate. The chemical components of seed starches are described, e.g., by Tayade et al., *Front Plant Sci.* 2019 Oct. 31:10:1213. Additionally, the amount of water present in the seed or grain can influence its ability to absorb exogenous compounds. In embodiments, the device has been dehydrated, dried, or otherwise modified to reduce water content prior to infusion with a therapeutic agent.

A drug delivery device can be selected based on the composition of the starch component, such as the ratio of amylose to amylopectin. The lipid content of the interior components of seed and grain may also improve the absorption and retention of certain compounds.

In embodiments, a disclosed drug delivery device has avascular opening, such as an outlet or an inlet for water and/or nutrients, e.g., the tip cap portion of a corn kernel. Other seeds and grains have similar structures or openings that facilitate the entry of liquids and gases. For example, a micropyle is a small opening in the seed coat through which the pollen tube enters during fertilization, which also allows water and gases to enter. A hilum, a scar left on the seed coat by the funiculus (the stalk attaching the ovule to the placenta), can also serve as an entry point for water and gases in some species. Additionally, the chalaza, the base of the ovule where integuments and nucellus join, can be an area of reduced resistance to gas and liquid penetration.

Although permeability varies, such vascular openings provide a direct pathway to the interior of the seed or grain, bypassing the less permeable seed coat. The connection of such openings to the seed's vascular system can promote distribution of exogenously applied, such as infused, compounds throughout the seed.

In some embodiments, disclosed drug delivery devices include seed or grain In some embodiments, the seed or grain is a cereal grain, a pseudocereal, a legume, or an oilseed. In embodiments, the device can include a dried seed or grain. Representative genera of seeds and grains suitable for use as a device in accordance with the present disclosure include but are not limited to vena, Amaranthus, Brassica, Cannabis, Carthamus, Chenopodium, Cicer, Cucurbita, Dolichos, Eleusine, Eragrostis, Fagopyrum, Glycine, Guizotia, Helianthus, Lablab, Lens, Lupinus, Macrotyloma, Oryza, Panicum, Papaver, Phaseolus, Pisum, Perilla, Pigeon pea (Cajanus), Rye (Secale), Salvia, Sesamum, Setaria, Sorhum, Triticum, and Zea.

Representative seeds and grains, which can be utilized as biologic drug delivery devices in accordance with the present disclosure include but are not limited to pea, oat, quinoa, chia seed, bulgur, millet, couscous, rice, spelt, teff, buckwheat, rye, sorghum, amaranth, corn kernel, einkorn, farro, fonio, soybean wheat (soybean), barley, lentil, flaxseed, rapeseed, sesame seed, kamut, freekeh, wild rice, triticale, emmer, kaniwa (canihua), Job's tears (adlay), pearl millet, finger millet, proso millet, foxtail millet, hemp seed, pumpkin seed, sunflower seed, poppy seed, safflower seed, niger seed, perilla seed, lupin, bambara groundnut, winged bean, pigeon pea (cowpea or black-eyed pea), grass pea, moth bean, adzuki bean, mung bean, urad bean, horse gram, rice bean, tepary bean, tarwi, yam bean, velvet bean, jack bean, sword bean, hyacinth bean, lima bean (broad bean), chickpea (garbanzo bean), green pea, yellow pea, field pea, navy bean, pinto bean, kidney bean, black bean, white bean, cranberry bean, fava bean (broad bean), cannellini bean, great northern bean, red bean (azuki), borlotti bean, flageolet bean, anasazi bean, appaloosa bean, European soldier bean, Jacob's cattle bean, marrow bean, scarlet runner bean, yellow eye bean, black turtle bean, mayocoba bean, pink bean, small red bean, tongues of fire bean, trout bean, wax bean, orca bean, and tiger's eye bean. Hybrids of any of the foregoing are also contemplated for use as a biologic drug delivery device.

In some embodiments, disclosed biologic drug delivery devices include a forage, such as a grass. Non-limiting representative genera of forage suitable for use as a device in accordance with the present disclosure include Bromus, Brachia (classified under Urochloa), Cynodon, Dactylis, Festuca, Lolium, Medicago, Panicum, Phalaris, Phleum, Poaceae, and Trifolium. Exemplary, non-limiting forage include alfalfa, Bermuda grass, barrel medic, black medick, burr medick, bromegrass, cocksfoot, Canary Islands cocksfoot, Spanish cocksfoot, clover, crimson clover, red clover, subterranean clover, white clover, Congo grass, fescue, Italian ryegrass, Kentucky bluegrass, koronivia grass, orchard grass, palisade grass, para grass, meadow fescue, red fescue, tall fescue, ryegrass, perennial ryegrass, Italian ryegrass, smooth bromegrass, switchgrass, tall fescue, timothy grass, and Urochloa (signal grass).

In some embodiments, the drug delivery device contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of drug per gram of device.

In some embodiments, the drug delivery device contains at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of drug per gram of device, including all ranges and subranges therebetween.

In some embodiments, the drug delivery device contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of an antimethanogenic agent per gram of device.

In some embodiments, the drug delivery device contains at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of an antimethanogenic agent per gram of device, including all ranges and subranges therebetween.

In some embodiments, the drug delivery device contains at least about 0.5 mg, 1 mg, 2 mg, 3 mg, 4 mg, 5 mg, 6 mg, 7 mg, 8 mg, 9 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg of a haloform per gram of device.

In some embodiments, the drug delivery device contains at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg of a haloform, including all ranges and subranges therebetween, per mg device.

In some embodiments, the drug delivery device contains a total amount of at least or about 1 mg, 25 mg, 50 mg, 75 mg, 100 mg, 125 mg, 150 mg, 175 mg, 200 mg, 225 mg, 250 mg, 275 mg, 300 mg, 325 mg, 350 mg, 375 mg, 400 mg, 425 mg, 450 mg, 475 mg, or 500 mg in total per mg device of any one of bromoform, chloroform, iodoform, or fluoroform, including all ranges and subranges therebetween.

Exemplary Infusable Compositions

The present disclosure provides edible substrates and devices that are infused with a therapeutic agent. In some embodiments the therapeutic agents are infused via an infusible composition (either as a liquid or a vapor). In some embodiments, an infusable composition in accordance with the disclosure contains a therapeutic agent, such as an antimethanogenic agent, in a total amount of about 0.1 wt %, 1 wt %, 5 wt %, 10 wt %, 15 wt %, 20 wt %, 25 wt %, 30 wt %, 35 wt %, 40 wt %, 45 wt %, or 50 wt %, including all ranges and subranges therebetween. In some embodiments, an infusable composition in accordance with the disclosure contains an active agent, such as an antimethanogenic agent, in a total amount of about 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, or 1 wt %, including all ranges and subranges therebetween.

Exemplary infused compositions containing an infusable antimethanogenic agent and a water-soluble liquid carrier are provided in Table 1.

TABLE 3

Example Infused Compositions

| Antimethanogenic compound(s) | Carrier | Concentration range (per 100 g of carrier) |
| --- | --- | --- |
| Bromoform | Acetic acid + water | ≥0.1 mg |
| Chloroform | Acetic acid + water | ≥0.1 mg |
| Iodoform | Acetic acid + water | ≥0.1 mg |
| Methyl bromide | Acetic acid + water | ≥0.1 mg |
| Methyl chloride | Acetic acid + water | ≥0.1 mg |
| Methyl fluoride | Acetic acid + water | ≥0.1 mg |
| Methyl iodide | Acetic acid + water | ≥0.1 mg |
| Bromodichloromethane | Acetic acid + water | ≥0.1 mg |
| Trichlorethylene | Acetic acid + water | ≥0.1 mg |
| Fluoroform | Acetic acid + water | ≥0.1 mg |
| Dibromomethane | Acetic acid + water | ≥0.1 mg |
| Bromoform | Diethylene glycol | ≥0.1 mg |
| Chloroform | Diethylene glycol | ≥0.1 mg |
| Iodoform | Diethylene glycol | ≥0.1 mg |
| Methyl bromide | Diethylene glycol | ≥0.1 mg |
| Methyl chloride | Diethylene glycol | ≥0.1 mg |
| Methyl fluoride | Diethylene glycol | ≥0.1 mg |
| Methyl iodide | Diethylene glycol | ≥0.1 mg |
| Bromodichloromethane | Diethylene glycol | ≥0.1 mg |
| Trichlorethylene | Diethylene glycol | ≥0.1 mg |
| Fluoroform | Diethylene glycol | ≥0.1 mg |
| Dibromomethane | Diethylene glycol | ≥0.1 mg |
| Bromoform | Dipropylene glycol | ≥0.1 mg |
| Chloroform | Dipropylene glycol | ≥0.1 mg |
| Iodoform | Dipropylene glycol | ≥0.1 mg |
| Methyl bromide | Dipropylene glycol | ≥0.1 mg |
| Methyl chloride | Dipropylene glycol | ≥0.1 mg |
| Methyl fluoride | Dipropylene glycol | ≥0.1 mg |
| Methyl iodide | Dipropylene glycol | ≥0.1 mg |
| Bromodichloromethane | Dipropylene glycol | ≥0.1 mg |
| Trichlorethylene | Dipropylene glycol | ≥0.1 mg |
| Fluoroform | Dipropylene glycol | ≥0.1 mg |
| Dibromomethane | Dipropylene glycol | ≥0.1 mg |
| Bromoform | Propylene glycol | ≥0.1 mg |
| Chloroform | Propylene glycol | ≥0.1 mg |
| Iodoform | Propylene glycol | ≥0.1 mg |
| Methyl bromide | Propylene glycol | ≥0.1 mg |
| Methyl chloride | Propylene glycol | ≥0.1 mg |
| Methyl fluoride | Propylene glycol | ≥0.1 mg |
| Methyl iodide | Propylene glycol | ≥0.1 mg |

TABLE 3-continued

Example Infused Compositions

| Antimethanogenic compound(s) | Carrier | Concentration range (per 100 g of carrier) |
|---|---|---|
| Bromodichloromethane | Propylene glycol | ≥0.1 mg |
| Trichlorethylene | Propylene glycol | ≥0.1 mg |
| Fluoroform | Propylene glycol | ≥0.1 mg |
| Dibromomethane | Propylene glycol | ≥0.1 mg |
| Bromoform | Triethylene glycol | ≥0.1 mg |
| Chloroform | Triethylene glycol | ≥0.1 mg |
| Iodoform | Triethylene glycol | ≥0.1 mg |
| Methyl bromide | Triethylene glycol | ≥0.1 mg |
| Methyl chloride | Triethylene glycol | ≥0.1 mg |
| Methyl fluoride | Triethylene glycol | ≥0.1 mg |
| Methyl iodide | Triethylene glycol | ≥0.1 mg |
| Bromodichloromethane | Triethylene glycol | ≥0.1 mg |
| Trichlorethylene | Triethylene glycol | ≥0.1 mg |
| Fluoroform | Triethylene glycol | ≥0.1 mg |
| Dibromomethane | Triethylene glycol | ≥0.1 mg |

B. Encapsulated Antimethanogenic Compositions

In some embodiments, the present disclosure teaches artificial encapsulated long-lasting compositions for delivery of antimethanogenic agents. In some embodiments, the encapsulated antimethanogenic composition includes: a) an antimethanogenic dispersion comprising an antimethanogenic compound and a solid carrier; and b) a container, wherein the antimethanogenic dispersion is completely enveloped by the container.

In some embodiments, disclosed long-acting compositions are encapsulated, such as completely surrounded, enveloped, enclosed, or contained within a housing, such as a container. Non-limiting, representative examples of containers suitable for disclosed long-acting compositions include capsules and coatings.

In some embodiments, the container has a total holding capacity of about 50 mg, 100 mg, 150 mg, 200 mg, 250 mg, 300 mg, 350 mg, 400 mg, 450 mg, 500 mg, 550 mg, 600 mg, 650 mg, 700 mg, 750 mg, 800 mg, 850 mg, 900 mg, 950 mg, 1000 mg, 1050 mg, 1100 mg, 1150 mg, 1200 mg, 1250 mg, 1300 mg, 1350 mg, 1400 mg, 1450 mg, 1500 mg, 1550 mg, 1600 mg, 1650 mg, 1700 mg, 1750 mg, 1800 mg, 1850 mg, 1900 mg, 1950 mg, 2000 mg, 2050 mg, 2100 mg, 2150 mg, 2200 mg, 2250 mg, 2300 mg, 2350 mg, 2400 mg, 2450 mg, 2500 mg, 2550 mg, 2600 mg, 2650 mg, 2700 mg, 2750 mg, 2800 mg, 2850 mg, 2900 mg, 2950 mg, or 3000 mg, including all ranges and subranges therebetween.

In some embodiments, disclosed long-acting compositions are encapsulated by a capsule. The capsule can be a standard pharmaceutical capsule, such as a capsule ranging in size from 000 to 4, including 000, 00, 0, 1, 2, 3, and 4. In some embodiments, disclosed long-acting compositions, such as encapsulated slow release compositions comprise a capsule size of 000, 00E, 00, 0E, 0, 1, 2, 3, 4, or 5.

In some embodiments, the capsule has a capacity ranging from 100-1000 mg, 140-1000 mg, 50-2000 mg, 100-1600 mg, 100-1100 mg, 400-1600 mg, 100-200 mg, 150-300 mg, 200-400 mg, 300-600 mg, 400-800 mg, 600-1100 mg, or 800-1600 mg, including all ranges and subranges therebetween.

In some embodiments, the capsule is composed of gelatin, hydroxypropyl methylcellulose (HPMC), or a combination thereof. Capsules suitable for encapsulation of disclosed compositions may further include any of a gelling salt, a plasticizer, an emulsifier, a thickener, a preservative, a flavoring, e.g., a sweetener, a colorant, such as a dye or a pigment, an opacifying agent, e.g., titanium dioxide, a preservative, e.g., an antioxidant, water, or combinations thereof.

In certain embodiments, the capsule, such as the capsule shell, includes a gelling agent. In some embodiments, the gelling agent is selected from gelatin, modified starch, carrageenan, gellan, mannan gum, amylose, xanthan, alginates, agar, guar, gum arabic, pectin, cyclodextrin, and combinations thereof.

In some embodiments, disclosed long-acting compositions, such as encapsulated compositions measure approximately 26 to 28 mm in length and about 9.7 to 10.4 mm in diameter, approximately 23 to 25 mm in length and about 8 to 9 mm in diameter, approximately 21 to 23 mm in length and about 7 to 8 mm in diameter, approximately 19 to 21 mm in length and about 6 to 7 mm in diameter, approximately 18 to 19 mm in length and about 5 to 6 mm in diameter, about 15.5 mm in length and approximately 5.5 mm in diameter, or approximately 14 mm in length and about 5 mm in diameter.

In some embodiments, disclosed long-acting compositions are encapsulated by a coating. Suitable coatings effectively encapsulate the active agent, such as an antimethanogenic compound, thereby preventing premature release of the compound during storage and in a physiological environment, such as in transit to the animal rumen. In embodiments, the coatings are composed of polymers which are selected for their degradation rate and response to specific physiological conditions, such as pH, temperature, or enzymatic activity, to ensure that the antimethanogenic agent of disclosed long-acting compositions is released at a desired rate and location within the animal rumen.

In some embodiments, the coating includes any of an acrylic acid polymer, a cellulose derivative, a natural polysaccharide, a methacrylate polymer, a hydrophilic polymer, and a, including combinations thereof.

Acrylic acid polymers include polymers derived from acrylic acid and its derivatives, such as acrylic acid copolymers, polyacrylic acid, and acrylate-based hydrogels. Exemplary cellulose derivatives which may be included in the coating are hydroxypropyl methylcellulose (HPMC), methylcellulose, and carboxymethyl cellulose (CMC). Illustrative examples of natural polysaccharides include sodium alginate, chitosan, and pectin. Methacrylate polymers include polymers synthesized from methacrylate monomers, for example methacrylate copolymers, poly(methyl methacrylate) (PMMA), and methacrylic acid copolymers.

In some examples, the coating includes a biodegradable polymer. Illustrative examples of suitable biodegradable polymers include acrylic acid copolymers, biodegradable polyesters, cellulose, chitosan, gum arabic, starch, polyvinyl alcohol (PVA), gelatin, lignin, and alginate-based materials, including derivatives of any of the foregoing.

In some embodiments, the coating includes any of an acrylic acid copolymer, hydroxypropyl methylcellulose (HPMC), sodium alginate, a methacrylate-based polymer, and derivatives thereof, including combinations thereof.

In some embodiments, the coating includes a plasticizer. A suitable plasticizer can improve the flexibility and spreadability of the coating, thereby promoting its adherence and also allowing for tuning of its rate of degradation.

In some embodiments, disclosed long-acting compositions, such as encapsulated antimethanogenic compositions, include an antimethanogenic dispersion. In some embodiments, the antimethanogenic dispersion includes an antimethanogenic agent, such as at least one antimethanogenic compound, dispersed or distributed in a carrier. In some embodiments, the carrier is solid.

In some examples, disclosed long-acting compositions have a suitable density for avoiding regurgitation and an appropriate buoyancy for reaching the animal rumen. In some embodiments, disclosed long-acting compositions have a density of at least 1.0 g/cm$^3$, 1.3 g/cm$^3$, or 1.5 g/cm$^3$. In some embodiments, disclosed long-acting compositions have a density ranging from 1.3 g/cm$^3$ and 2.0 g/cm$^3$, 1.3 g/cm$^3$ to 1.5 g/cm$^3$, 1.5 g/cm$^3$ to 1.7 g/cm$^3$, 1.7 g/cm$^3$ to 1.9 g/cm$^3$, or 1.9 g/cm$^3$ to 2.0 g/cm$^3$. In some embodiments, disclosed long-acting compositions have a density of approximately 1.3 g/cm$^3$, 1.4 g/cm$^3$, 1.5 g/cm$^3$, 1.6 g/cm$^3$, 1.7 g/cm$^3$, 1.8 g/cm$^3$, 1.9 g/cm$^3$, or 2 g/cm$^3$, including all ranges and subranges therebetween.

Carriers for Long-Lasting Encapsulated Compositions

In some embodiments, disclosed long-acting encapsulated compositions include an antimethanogenic agent dispersed, such as distributed, within a carrier. Such dispersion is referred to herein as an antimethanogenic dispersion. The carriers described herein facilitate slow release of an antimethanogenic agent from disclosed compositions. With the guidance of the present disclosure, one having skill in the art will understand how various carriers, such as oils, hydrogenated oils, waxes, solids, polymers, and combinations thereof contribute to controlled or slow release of the active agent.

In some embodiments, the carrier includes a lipid, an oil, a vegetable oil, a hydrogenated vegetable oil, a fatty acid, a fatty alcohol, or a combination thereof. In some embodiments, disclosed long-acting encapsulated compositions include a carrier with a melting point above rumen temperature of a ruminant animal.

In some embodiments, disclosed long-acting encapsulated compositions include a carrier having a melting point of at least about 42° C., 43° C., 44° C., 45° C., 46° C., 47° C., 48° C., 49° C., 50° C., 51° C., 52° C., 53° C., 54° C., 55° C. In some embodiments, disclosed long-acting encapsulated compositions include a carrier having a melting point within the range of 51-74° C., 54-68° C., 59-72° C., 50-61° C., 63-75° C., 56-70° C., 51-64° C., 67-74° C., 52-66° C., 60-73° C., 55-69° C., 58-71° C., 53-65° C., 62-74° C., 57-70° C., or 50-59° C. In some embodiments, disclosed encapsulated long-acting compositions include a carrier having a melting point of about 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., including all ranges and subranges therebetween.

i. Oils

In some embodiments, the carrier comprises an oil. An oil is a nonpolar substance primarily composed of hydrocarbons, which can be characterized by its hydrophobic and lipophilic properties. Oils are typically liquid at room temperature and can be derived from various sources, including animals, plants, and petrochemical processes. The oil included in the carrier may be any suitable oil, such as a vegetable oil.

In some embodiments, the carrier includes at least about 0.1 wt %, 1 wt %, 5 wt %, 10 wt %, 15 wt %, 20 wt %, 25 wt %, 30 wt %, 35 wt %, 40 wt %, or 45 wt % of an oil. In some embodiments, the carrier includes about 0.3-3 wt %, 2-9 wt %, 0.1-1.5 wt %, 5-17 wt %, 13-30 wt %, 0.8-4 wt %, 4-12 wt %, 18-34 wt %, 0.5-3 wt %, 7-20 wt %, 22-37 wt %, 2-10 wt %, 14-27 wt %, 0.2-18 wt %, 31-40 wt %, 2-11 wt %, 17-28 wt %, 10-21 wt %, or 35-40 wt % of an oil. In some embodiments, the carrier includes about 0.1 wt %, 1 wt %, 5 wt %, 10 wt %, 15 wt %, 20 wt %, 25 wt %, 30 wt %, 35 wt %, 40 wt %, or 45 wt % of an oil.

In some embodiments, the oil contains a vegetable oil. In some embodiments, the oil includes any of canola oil, olive oil, corn oil, mineral oil, soybean oil (soy oil), corn oil, palm kernel oil, rapeseed oil, sunflower oil, safflower oil, coconut oil, rice bran oil, sesame oil, flaxseed oil, hemp oil, cottonseed oil, peanut oil, almond oil, beech nut oil, Brazil nut oil, cashew oil, hazelnut oil, macadamia oil, mongongo nut oil, pecan oil, pine nut oil, pistachio oil, walnut oil, pumpkin seed oil, grapefruit seed oil, lemon oil, apricot oil, apple seed oil, argan oil, avocado oil, and orange oil, including combinations, such as mixtures, thereof.

ii. Hydrogenated vegetable oils

In some embodiments, the carrier includes a hydrogenated oil, such as a hydrogenated vegetable oil. Hydrogenated oils are made by heating vegetable oils with hydrogen and a metal catalyst, such as nickel, copper, or chromium. During the process of hydrogenation, double bonds in the oil's carbon chain are broken, causing each carbon atom to bond with a hydrogen atom. This process converts unsaturated fats into saturated fats, which are solid at room temperature.

Accordingly, whereas oils, such as vegetable oils are liquid at room temperature, hydrogenated vegetable oils are semi-solid or solid at room temperature. The solidity of such carriers imparts resistance to degradation in the animal rumen environment. Such resistance contributes in part to the slow release of antimethanogenic agents dispersed within solid carriers of disclosed encapsulated compositions.

In some embodiments, the carrier includes about 1 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %, including all ranges and subranges therebetween, of a hydrogenated oil.

In some embodiments, the carrier includes at least about 45 wt %, 50 wt %, 55 wt %, 60 wt %, 65 wt %, 70 wt %, 75 wt %, 80 wt %, 85 wt %, 90 wt %, or 95 wt % of a hydrogenated oil. In some embodiments, the carrier includes 47-62 wt %, 53-71 wt %, 68-84 wt %, 45-59 wt %, 76-92 wt %, 50-67 wt %, 72-88 wt %, 58-75 wt %, 81-95 wt %, 45-55 wt %, 63-79 wt %, 86-95 wt %, 51-69 wt %, 74-90 wt %, 56-73 wt %, 79-93 wt %, 48-64 wt %, 70-85 wt %, 60-77 wt %, or 83-95 wt %. In some embodiments, the carrier includes about 45 wt %, 50 wt %, 55 wt %, 60 wt %, 65 wt %, 70 wt %, 75 wt %, 80 wt %, 85 wt %, 90 wt %, 95 wt %. 45 wt %, 50 wt %, 55 wt %, 60 wt %, 65 wt %, 70 wt %, 75 wt %, 80 wt %, 85 wt %, 90 wt %, 95 wt % of a hydrogenated oil, including all ranges and subranges therebetween.

In theory, any of the vegetable oils specified in the preceding section may be hydrogenated. Hydrogenated variants of such oils may serve as illustrative examples for hydrogenated oils suitable for inclusion in disclosed long-acting compositions as a carrier. In some embodiments, the hydrogenated oil includes any of hydrogenated soybean oil, hydrogenated castor oil, hydrogenated palm oil, hydrogenated cottonseed oil, hydrogenated coconut oil, hydrogenated rapeseed oil (canola oil), hydrogenated sunflower oil, hydrogenated corn oil, hydrogenated peanut oil, and hydrogenated olive oil, including combinations thereof.

In some embodiments, the carrier includes at least or about 10% vegetable oil and/or at least or about 10% hydrogenated vegetable oil by volume. In some embodiments, the carrier includes at least or about 15% vegetable oil and/or at least or about 15% hydrogenated vegetable oil by volume. In some embodiments, the carrier includes at least or about 20% vegetable oil and/or at least or about 20% hydrogenated vegetable oil by volume. In some embodiments, the carrier includes at least or about 25% vegetable oil and/or at least or about 25% hydrogenated vegetable oil by volume.

iii. Waxes

In some embodiments, the carrier includes a wax. In contrast to an oil, a wax is solid or semi-solid at room temperature. Waxes are esters of fatty acids with long chain monohydric alcohols having one hydroxyl group. Given their physical characteristics, certain waxes are not easily degradable, can withstand the environment of the animal rumen, and may accumulate in the rumen, facilitating slow release of antimethanogenic agents. However, in other embodiments, the carrier does not include a wax.

In some embodiments, the carrier includes at least 40 wt %, 50 wt %, 60 wt %, 70 wt %, 80 wt %, 90 wt %, or 95 wt % of a wax. In some embodiments, the carrier includes 40-50 wt %, 45-75 wt %, 60-90 wt %, 45-55 wt %, 70-90 wt %, 45-65 wt %, 50-80 wt %, 45-95 wt %, 70-85 wt %, 40-75 wt %, 55-85 wt %, 70-90 wt %, 75-90 wt %, or 80-90% wt %, or 80-95 wt % of a wax. In some embodiments, the carrier includes about 40 wt %, 50 wt %, 60 wt %, 70 wt %, 80 wt %, 90 wt %, or 95 wt % of a wax.

The preceding ranges can be applied to the level of wax included in a disclosed encapsulated composition such that it results in slow release of the antimethanogenic agent dispersed therein. In embodiments, the wax includes a vegetable wax. In some embodiments, the wax includes any of soy wax, candelilla wax, castor wax, paraffin wax, beeswax, carnauba wax, jojoba wax, lanolin wax, Montan wax, microcrystalline wax, cetyl alcohol, rice bran wax, shellac wax, and ozokerite wax, including combinations, such as mixtures, thereof.

It will be understood that wax can be included as a carrier in combination with other ingredients, for example, oil, vegetable oil, hydrogenated vegetable oil, clay, polymer, and cyclodextrin, among others, such that the carrier facilitates slow release of the antimethanogenic agent dispersed therein. In some embodiments, the carrier is selected from any of mineral oil, soy oil, palm oil, cocoa butter, vegetable oil, hydrogenated vegetable oil, wax, clay, beeswax, canola oil, and paraffin wax, including combinations thereof.

iv. Solids

In some embodiments, the carrier includes a solid ingredient, such as a powder, a clay, a clay mineral, a metal, or a metal oxide. Such solid ingredients are suitable to withstand the variable pH and high shear environment of the animal rumen, facilitating slow release of antimethanogenic compounds from disclosed compositions.

In some embodiments, the carrier includes a metal. Non-limiting examples of metals suitable for inclusion in disclosed compositions include aluminum (Al), iron (Fe), zinc (Zn), copper (Cu), manganese (Mn), chromium (Cr), molybdenum (Mo), and selenium (Se).

In some embodiments, the carrier includes a metal oxide. Zinc oxide (ZnO), copper oxide (CuO), magnesium oxide (MgO), iron oxide ($Fe_2O_3$ or $Fe_3O_4$), cobaltic oxide ($Co_3O_4$) serves as a non-limiting example of metal oxides suitable for inclusion in disclosed compositions.

In some embodiments, the carrier includes a clay. Illustrative examples of clay suitable for inclusion in disclosed compositions include bentonite, kaolinite, montmorillonite, halloysite, hectorite, laponite, palygorskite, sepiolite, and allophane. In some embodiments, the carrier includes a clay mineral, such as an aluminosilicate. Non-limiting examples of clay minerals suitable as carriers include zeolites and kaolin.

v. Polymers

In some embodiments, the carrier includes a polymer. Polymers can be used encapsulate a wide range of active agents, such as antimethanogenic substances, and tune the degradation rate of the overall composition, such as a disclosed composition. For example, polymers can control or slow the release rate of an antimethanogenic agent disperse therein by forming a matrix around the antimethanogenic agent or otherwise coating the antimethanogenic agent.

In some embodiments, the carrier includes any of a biodegradable polymer, such as a biodegradable polyester, a hydrophilic polymer, a natural polymer, a synthetic polymer, or a cross-linked water-insoluble polymer, such as an ion-exchange resin which acts as a reservoir system.

In some embodiments, the carrier includes any of poly-lactic Acid (PLA), poly(lactic-co-glycolic acid) (PLGA), polybutylene Succinate (PBS), polybutylene succinate adipate (PBSA), polybutylene adipate terephthalate (PBAT), polyethylene glycol (PEG), chitosan, alginate, poly(ethylene-co-vinyl acetate) (EVA), poly(methyl methacrylate) (PMMA), polyvinyl alcohol (PVA), and polyacrylic acid, including combinations thereof.

In some examples, the carrier can include a temperature-sensitive hydrogels, such as a polymer system that physically responds to temperature variations. Such carriers are suitable for controlled release of an active agent, such as an antimethanogenic substance, based on environmental conditions. Additionally, the carrier can include a pH-sensitive polymer, such as a polymer system that is designed to swell or degrade at specific pH levels. Such delivery systems can enable delivery of an active agent that is targeted to different parts of a subject's gastrointestinal tract, such as an animal rumen.

In some embodiments, the carrier includes any of zinc, zinc oxide, steel, colloidal silicon dioxide, activated carbon, charcoal, bentonite, zeolite, kaolin, polyethylene glycol (PEG), polylactic acid (PLA), polybutylene succinate (PBS), polybutylene succinate adipate (PBSA), polybutylene adipate terephthalate (PBAT), polypropylene, a beeswax, paraffin, castor wax, carnauba wax, candelilla wax, jojoba wax, and lanolin, including combinations thereof.

Additives

The long-acting compositions of the present disclosure may comprise any number of additives for flavoring, additional benefits for the animal subject to administration, shelf life, and the like.

In some embodiments, the additive comprises a vitamin and/or a mineral. In some embodiments, the additive comprises a vitamin. In some embodiments, the vitamin comprises at least one fat-soluble vitamin and/or at least one water-soluble vitamin. In some embodiments, the fat-soluble vitamin is selected from vitamin A, vitamin D3, vitamin E, vitamin K (e.g. vitamin K3), and a combination thereof. In some embodiments, the water-soluble vitamin is selected from vitamin B12, biotin, choline, vitamin B1, vitamin B2, vitamin B6, niacin, folic acid, panthothenate (e.g. Ca-D-panthothenate), and a combination thereof. In some embodiments, the compositions of the present disclosure comprise vitamin B12.

In some embodiments, the additive comprises a mineral. In some embodiments, the mineral comprises at least one trace mineral and/or at least one macro mineral. In some embodiments, the trace mineral is selected from manganese, zinc, iron, copper, iodine, selenium, cobalt, and a combination thereof. In some embodiments, the macro mineral is selected from calcium, phosphorus, sodium, and a combination thereof.

In some embodiments, the additive comprises one or more of flavoring agents, sweetening agents, coloring agents, stabilizers, and/or enzymes.

In some embodiments, the one or more flavoring agents are selected from oil of wintergreen, oil of peppermint, oil of spearmint, clove bud oil, menthol, anethole, methyl salicylate, eucalyptol, cassia, 1-menthyl acetate, sage, eugenol, parsley oil, oxanone, alpha-irisone, marjoram, lemon, orange, propenyl guaethol, cinnamon, vanillin, thymol, linalool, and cinnamaldehyde glycerol acetal known as CGA.

In some embodiments, the one or more sweetening agents are selected from sucrose, glucose, saccharin, dextrose, levulose, lactose as described herein above, mannitol, sorbitol, fructose, maltose, xylitol, saccharin salts, thaumatin, aspartame, D-tryptophane, dihydrochalcones, and acesulfame and cyclamate salts, especially sodium cyclamate and sodium saccharin.

In some embodiments, the one or more colorants are selected from iron oxide, sodium chloride, potassium citrate, potassium chloride, and other edible salts.

In some embodiments, the one or more stabilizers are selected from preservatives, antioxidants, synergists and sequestrants, packaging gases, emulsifiers, thickeners, gelling agents, and humectants. Examples of emulsifiers and/or thickening agents include, for example, gelatin, cellulose ethers, starch, starch esters, starch ethers, and modified starches. In some embodiments, the one or more stabilizers increase the shelf life of the composition.

In some embodiments, the one or more enzymes are selected from amongst phytases EC 3.1.3.8 or 3.1.3.26; xylanases EC 3.2.1.8; galactanases EC 3.2.1.89; and/or beta-glucanases EC 3.2.1.4 (EC refers to Enzyme Classes according to Enzyme Nomenclature 1992 from NC-IUBMB, 1992).

Additional descriptions of additives can be found, for example, in US 2017/0273895, US 2009/0258030 and US 2005/0142169, the contents of each are incorporated by reference in their entirety for all purposes.

Dose

In some embodiments, disclosed long-acting compositions include a relatively low unit dose of an antimethanogenic agent. Such low-unit dose, long-acting compositions are advantageous for several reasons including avoidance of animal toxicity and decreased animal productivity, as well as low economic cost. Surprisingly, as illustrated in the Examples section herein, such compositions potently reduce enteric methane emissions of ruminant animals for a sustained period of time, such as for at least 24 hours.

In some embodiments, a unit dose, such as a single, discrete dose of a disclosed long-acting composition contains a total amount of antimethanogenic agent that is less than about 5 mg, 10 mg, 15 mg, 20 mg, 25 mg, 30 mg, 35 mg, 40 mg, 45 mg, 50 mg, 55 mg, 60 mg, 65 mg, 70 mg, 75 mg, 80 mg, 85 mg, 90 mg, 95 mg, or 100 mg, including all ranges and subranges therebetween.

In some embodiments, a unit dose, such as a single, discrete dose of a disclosed long-acting composition contains 1 mg, 50 mg, 100 mg, 150 mg, 200 mg, 250 mg, 300 mg, 350 mg, 400 mg, 450 mg, 500 mg, 550 mg, 600 mg, 650 mg, 700 mg, 750 mg, 800 mg, 850 mg, 900 mg, 950 mg, or 1000 mg in total of an antimethanogenic agent, including all ranges and subranges therebetween.

In some embodiments, a unit dose, such as a single, discrete dose of a disclosed long-acting composition contains a total amount of antimethanogenic agent that ranges from 0.1 mg to 100 mg, 0.5 mg to 50 mg, 1 to 25 mg, 5 mg to 15 mg, 0.1 mg to 5 mg, 6 mg to 15 mg, 16 mg to 30 mg, 31 mg to 50 mg, 40 mg to 50 mg, 51 mg to 75 mg, or 76 mg to 100 mg, including all ranges and subranges therebetween.

In some embodiments, disclosed long-acting compositions include an antimethanogenic agent in a total amount of less than about 1 wt %, 5 wt %, 10 wt %, 15 wt %, 20 wt %, 25 wt %, 30 wt %, 35 wt %, or 40 wt %, including all ranges and subranges therebetween, relative to the total weight of the composition.

In some embodiments, disclosed long-acting compositions include an antimethanogenic agent in a total amount of about 0.1 wt %, 0.05 wt %, 1 wt %, 5 wt %, 10 wt %, 15 wt %, 20 wt %, 25 wt %, 30 wt %, 35 wt %, 40 wt %, 45 wt %, 50 wt %, 55 wt %, or 60 wt %, including all ranges and subranges therebetween, relative to the total weight of the composition, including all ranges and subranges therebetween.

In some embodiments, disclosed long-acting compositions include an antimethanogenic agent in a total amount of about 0.01 wt % to 20 wt %, 0.05 wt % to 15 wt %, 0.01 wt % to 0.05 wt %, 0.05 wt % to 1 wt %, 1 wt % to 5 wt %, 5 wt % to 10 wt %, 10 wt % to 15 wt %, 15 wt % to 20 wt %, 0.01 wt % to 3 wt %, 4 wt % to 7 wt %, 8 wt % to 12 wt %, 13 wt % to 16 wt %, 17 wt % to 19 wt %, 5 wt % to 10 wt %, 1 wt % to 15 wt %, 2 wt % to 8 wt %, 6 wt % to 14 wt %, or 9 wt % to 20 wt %, including all ranges and subranges therebetween, relative to the total weight of the composition.

In some embodiments, disclosed long-acting compositions include an antimethanogenic agent in a total amount of about 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.11 wt %, 0.12 wt %, 0.13 wt %, 0.14 wt %, 0.15 wt %, 0.16 wt %, 0.17 wt %, 0.18 wt %, 0.19 wt %, 0.2 wt %, 0.21 wt %, 0.22 wt %, 0.23 wt %, 0.24 wt %, 0.25 wt %, 0.26 wt %, 0.27 wt %, 0.28 wt %, 0.29 wt %, 0.3 wt %, 0.31 wt %, 0.32 wt %, 0.33 wt %, 0.34 wt %, 0.35 wt %, 0.36 wt %, 0.37 wt %, 0.38 wt %, 0.39 wt %, 0.4 wt %, 0.41 wt %, 0.42 wt %, 0.43 wt %, 0.44 wt %, 0.45 wt %, 0.46 wt %, 0.47 wt %, 0.48 wt %, 0.49 wt %, 0.5 wt %, 0.51 wt %, 0.52 wt %, 0.53 wt %, 0.54 wt %, 0.55 wt %, 0.56 wt %, 0.57 wt %, 0.58 wt %, 0.59 wt %, 0.6 wt %, 0.61 wt %, 0.62 wt %, 0.63 wt %, 0.64 wt %, 0.65 wt %, 0.66 wt %, 0.67 wt %, 0.68 wt %, 0.69 wt %, 0.7 wt %, 0.71 wt %, 0.72 wt %, 0.73 wt %, 0.74 wt %, 0.75 wt %, 0.76 wt %, 0.77 wt %, 0.78 wt %, 0.79 wt %, 0.8 wt %, 0.81 wt %, 0.82 wt %, 0.83 wt %, 0.84 wt %, 0.85 wt %, 0.86 wt %, 0.87 wt %, 0.88 wt %, 0.89 wt %, 0.9 wt %, 0.91 wt %, 0.92 wt %, 0.93 wt %, 0.94 wt %, 0.95 wt %, 0.96 wt %, 0.97 wt %, 0.98 wt %, 0.99 wt %, or 1 wt %, including all ranges and subranges therebetween including all ranges and subranges therebetween, relative to the total weight of the composition.

In some embodiments, disclosed long-acting compositions include an antimethanogenic agent in a total amount of about 1 wt %, 1.2 wt %, 1.4 wt %, 1.6 wt %, 1.8 wt %, 2 wt %, 2.2 wt %, 2.4 wt %, 2.6 wt %, 2.8 wt %, 3 wt %, 3.2 wt %, 3.4 wt %, 3.6 wt %, 3.8 wt %, 4 wt %, 4.2 wt %, 4.4 wt %, 4.6 wt %, 4.8 wt %, 5 wt %, 5.2 wt %, 5.4 wt %, 5.6 wt %, 5.8 wt %, 6 wt %, 6.2 wt %, 6.4 wt %, 6.6 wt %, 6.8 wt %, 7 wt %, 7.2 wt %, 7.4 wt %, 7.6 wt %, 7.8 wt %, 8 wt %, 8.2 wt %, 8.4 wt %, 8.6 wt %, 8.8 wt %, 9 wt %, 9.2 wt %, 9.4 wt %, 9.6 wt %, 9.8 wt %, 10 wt %, 10.2 wt %, 10.4 wt %, 10.6 wt %, 10.8 wt %, 11 wt %, 11.2 wt %, 11.4 wt %, 11.6 wt %, 11.8 wt %, 12 wt %, 12.2 wt %, 12.4 wt %, 12.6 wt %, 12.8 wt %, 13 wt %, 13.2 wt %, 13.4 wt %, 13.6 wt %, 13.8 wt %, 14 wt %, 14.2 wt %, 14.4 wt %, 14.6 wt %, 14.8 wt %, 15 wt %, 15.2 wt %, 15.4 wt %, 15.6 wt %, 15.8 wt %, 16 wt %, 16.2 wt %, 16.4 wt %, 16.6 wt %, 16.8 wt %, 17 wt %, 17.2 wt %, 17.4 wt %, 17.6 wt %, 17.8 wt %, 18 wt %, 18.2 wt %, 18.4 wt %, 18.6 wt %, 18.8 wt %, 19 wt %, 19.2 wt %, 19.4 wt %, 19.6 wt %, 19.8 wt %, or 20 wt %, including all ranges and subranges therebetween, relative to the total weight of the composition.

In some embodiments, the antimethanogenic agent includes a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.

In some embodiments, the antimethanogenic agent includes a microflora modifying inhibitor (MMI), a hydrogen receptor (HR), an enzymatic inhibitor (EI), or a combination thereof.

In some embodiments, the antimethanogenic agent includes any of 3-nitrooxypropanol (3-NOP), bromochloromethane, 2-bromoethanesulfonate, chloromethane ($CH_3Cl$), iodomethane ($CH_3I$), fluoromethane e ($CH_3F$), bromodichlormethane ($CHBrCl_2$), trichlorethylene ($C_2HCl_3$), bromoform ($CHBr_3$), chloroform ($CHCl_3$), iodoform ($CHI_3$), fluoroform ($CHF_3$), dibromomethane ($CH_2Br_2$), including combinations thereof.

Stability

In some aspects, provided herein are long-acting compositions, such as long-acting antimethanogenic compositions, that have a relatively high retention of the antimethanogenic agent contained therein and improved stability. In some embodiments, the stability of disclosed long-acting compositions, such as upon exposure to ambient air or heat, is maintained over time, facilitating shelf stability. In certain embodiments, the stability of disclosed long-acting compositions results in minimal loss of an antimethanogenic agent from the composition, such as upon open air exposure, allowing for reliable dosing and efficacy.

Certain antimethanogenic substances are highly volatile, a property which undermines shelf stability and promotes significant losses of the antimethanogenic compound, such as upon exposure to open air. Consequently, the volatility of antimethanogenic agents negatively impacts predictable dosing payload and efficacy of available compositions. For example, bromoform has a relatively high vapor pressure, meaning that a significant amount of bromoform molecules have enough energy to escape from the liquid phase into the gas phase at room temperature. Examples of antimethanogenic compounds and their respective vapor pressures in pure form, in kPa at 20° C. (unless otherwise indicated) are shown below in Table 2. The higher the vapor pressure, the more readily a substance evaporates.

TABLE 2

| Vapor pressures of exemplary antimethanogenic compounds | |
|---|---|
| Antimethanogenic compound | Vapor pressure (kPa) |
| Bromoform | 0.67 |
| Chloroform | 212 mmHg |
| Iodoform | 0.04 mmHg |
| Methyl bromide | 1893 mmHg |
| Methyl chloride | 573 at 25° C. |
| Methyl iodide | 50 |
| Methyl fluoride | 3300 at 21° C. |

TABLE 2-continued

| Vapor pressures of exemplary antimethanogenic compounds | |
|---|---|
| Antimethanogenic compound | Vapor pressure (kPa) |
| Bromodichloromethane | 6.6 |
| Trichlorethylene | 7.8 |
| Fluoroform | 4000 |
| Dibromomethane | 4.7 |

In some embodiments, disclosed long-acting compositions retain at least 90%, 91%, 92%, 93%, 94%, 95%, 96%, 97%, 98%, or 99% of an antimethanogenic agent over time. In some examples, percent retainment is determined relative to the original amount of antimethanogenic agent included in the composition.

In some embodiments, disclosed long-acting compositions retain at least 90% of an antimethanogenic agent over a period of at least 1 week, 2 weeks, 3 weeks, 4 weeks, 5 weeks, 6 weeks, 7 weeks, 8 weeks, 9 weeks, 10 weeks, 11 weeks, or 12 weeks. In some embodiments, disclosed long-acting compositions retain at least 95% of an antimethanogenic agent over a period of at least 1 month, 2 months, 3 months, 4 months, 5 months, 6 months, 7 months, 8 months, 9 months, 10 months, 11 months, or 12 months. In some embodiments, disclosed long-acting compositions retain at least 98% of an antimethanogenic agent over a period of up to about 1 month, 2 months, 3 months, 4 months, 5 months, 6 months, 7 months, 8 months, 9 months, 10 months, 11 months, or 12 months.

In some embodiments, disclosed long-acting compositions lose less than 1%, 2%, 3%, 4%, 5%, 6%, 7%, 8%, 9%, 10%, 11%, 12%, 13%, 14%, or 15%, of an antimethanogenic agent over time. In some examples, percent loss is determined relative to the original amount of antimethanogenic agent included in the composition.

In some embodiments, disclosed long-acting compositions lose less than 10% of an antimethanogenic agent over a period of at least 1 week, 2 weeks, 3 weeks, 4 weeks, 5 weeks, 6 weeks, 7 weeks, 8 weeks, 9 weeks, 10 weeks, 11 weeks, or 12 weeks. In some embodiments, disclosed long-acting compositions lose less than 5% of an antimethanogenic agent over a period of at least 1 month, 2 months, 3 months, 4 months, 5 months, 6 months, 7 months, 8 months, 9 months, 10 months, 11 months, or 12 months. In some embodiments, disclosed long-acting compositions lose less than 2% of an antimethanogenic agent over a period of up to about 1 month, 2 months, 3 months, 4 months, 5 months, 6 months, 7 months, 8 months, 9 months, 10 months, 11 months, or 12 months.

In some embodiments, the antimethanogenic agent includes a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.

In some embodiments, the antimethanogenic agent includes a microflora modifying inhibitor (MMI), a hydrogen receptor (HR), an enzymatic inhibitor (EI), or a combination thereof.

In some embodiments, the antimethanogenic agent includes any of 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichlormethane ($CHBrCl_2$), trichlorethylene ($C_2HCl_3$), bromoform ($CHBr_3$), chloroform ($CHCl_3$), iodoform (CHI$_3$), fluoroform (CHF$_3$), dibromomethane (CH$_2$Br$_2$), including combinations thereof.

II. Methods of Administration

In some aspects, provided herein are methods of administering a disclosed long-acting composition, such as an infused edible substrate, e.g., a drug delivery device, or an encapsulated composition. In embodiments, disclosed compositions are administered in accordance with an intermittent dosing schedule. In embodiments, the effects of the provided methods, such as reductions in ruminant animal methane emissions, are immediately evident and persist over time, such as for at least 24 hours after a single administration.

In contrast to the provided methods, current methods of administering antimethanogenic agents involve frequent administrations, such as once per day or more, dosing relatively high amounts of the antimethanogenic agent, or both. Rapid release administrations of antimethanogenic compounds often result in fleeting effects, that when averaged out over the entire period between doses amount to only minor reductions in methane emissions. These forms of administration may fail to progress to the rumen when administered orally, and may be used up too quickly, given the lack of protection against fast dissolution. For example, twice daily dosing of the antimethanogenic compound 3-NOP to cows at a dose of 80 mg per kg dry matter intake was required to achieve a 29% reduction in CH$_4$ production at 3 hours post-administration (Costigan et al., *J Dairy Sci.* 2024 Jun. 6: S0022-0302(24)00900-7).

Additionally, certain embodiments of the provided compositions, devices, and methods avoid the challenges and drawbacks associated with administering a bolus to a ruminant animal. There have been several attempts to develop bolus-like devices for long term administration of antimethanogenic compounds. These approaches, however, face major challenges, and are not yet effective means for achieving durable inhibition of methanogenesis or slow release administration of antimethanogenic compounds. As an initial matter, administration of a bolus can involve pharyngeal trauma, which at times may lead to severe complications for the animal. Specifically, it is not uncommon for animals to resist bolus administration, resulting in inadvertently lodging the bolus in the animal's pharynx. Even if no physical damage occurs, such administration often results in increased stress to the animal, which may negatively impact the animal's feed intake or milk production.

Even once a bolus is successfully administered, the subject animal may experience discomfort or adverse reactions, such as bloating or changes in rumen motility, which can further contribute to decreased feed intake and loss of animal productivity. Because the bolus is so difficult to administer, they are configured with large amounts of antimethanogenic compound to provide active does as long as possible. These large boluses however, take valuable space within the rumen, that can no longer be occupied by feed, thus reducing the daily food volume intake an animal can have.

Even large boluses are only capable of delivering antimethanogenic compounds for a few weeks, and because boluses include non-degradable housings, they persist in the animal's digestive track without any benefits. Removing boluses can be highly invasive, and administering additional boluses is not feasible, given the space already occupied by the first. Additionally, to make up for compound degradation and/or a degradation in release dynamics over time, boluses are often filled with very high concentrations of antimethanogenic compounds, which are uneconomical, and which present risks of toxicity, should the housing ever be damaged while in the animal. In some embodiments, the presently disclosed inventions address the challenges of boluses by providing for long-acting compositions intended for intermittent dosing.

In some embodiments, the provided methods involve administering a disclosed long-acting composition or a disclosed drug delivery device in accordance with an intermittent dosing regimen, such as an intermittent dosing schedule. In some embodiments, the intermittent dosing schedule involves less than once daily dosing In some embodiments, the intermittent dosing schedule includes a dosing interval of about 1 day, 2 days, 3 days, 4 days, 5 days, 6 days, 7 days, 8 days, 9 days, 10 days, including all ranges and subranges therebetween. In some embodiments, the intermittent dosing schedule includes a weekly dosing interval.

In some embodiments, the intermittent dosing schedule includes a dosing interval of about 12 hours, 24 hours, 36 hours, 48 hours, 60 hours, 72 hours, 84 hours, or 96 hours. In some embodiments, the intermittent dosing schedule includes a dosing interval of 12 to 120 hours, 24 to 120 hours, 36 to 120 hours, 48 to 120 hours, 60 to 120 hours, 12 to 96 hours, 24 to 96 hours, 36 to 96 hours, 48 to 96 hours, 60 to 96 hours, 72 to 96 hours, 12 to 72 hours, 12 to 60 hours, 12 to 48 hours, 12 to 36 hours, or 12 to 24 hours. In some embodiments, the intermittent dosing schedule includes a dosing interval of about 24 hours, 48 hours, 72 hours, or 96 hours, including all ranges and subranges therebetween.

In some embodiments, disclosed methods involve administering a disclosed long-acting composition such that the active agent, such as the antimethanogenic agent, is administered in a total amount of less than about 5 mg/day, 10 mg/day, 15 mg/day, 20 mg/day, 25 mg/day, 30 mg/day, 35 mg/day, 40 mg/day, 45 mg/day, 50 mg/day, 55 mg/day, 60 mg/day, 65 mg/day, 70 mg/day, 75 mg/day, 80 mg/day, 85 mg/day, 90 mg/day, 95 mg/day, or 100 mg/day, including all ranges and subranges therebetween.

In some embodiments, disclosed methods involve administering a disclosed long-acting composition or drug delivery device such that the active agent, such as the antimethanogenic agent, is administered in a total amount of about 5 mg/day, 10 mg/day, 15 mg/day, 20 mg/day, 25 mg/day, 30 mg/day, 35 mg/day, 40 mg/day, 45 mg/day, 50 mg/day, 55 mg/day, 60 mg/day, 65 mg/day, 70 mg/day, 75 mg/day, 80 mg/day, 85 mg/day, 90 mg/day, 95 mg/day, or 100 mg/day, including all ranges and subranges therebetween.

In some embodiments, disclosed long-acting compositions and drug delivery devices are administered to a subject animal, such as a ruminant animal, such that the total amount of active agent, such as an antimethanogenic substance, delivered to the animal is within the range of 0.01 mg to 1 mg per kg of body weight, 0.01 mg to 0.03 mg per kg of body weight, 0.04 mg to 0.09 mg per kg of body weight, 0.10 mg to 0.25 mg per kg of body weight, 0.26 mg to 0.50 mg per kg of body weight, 0.51 mg to 0.75 mg per kg of body weight, 0.76 mg to 1.00 mg per kg of body weight, 0.15 mg to 0.33 mg per kg of body weight, or 0.67 mg to 0.95 mg per kg of body weight, including all ranges and subranges therebetween.

In some embodiments, disclosed long-acting compositions and drug delivery devices are administered to a subject animal, such as a ruminant animal, such that the total amount of active agent, such as an antimethanogenic agent, delivered to the animal is about 0.01 mg per kg of body weight, 0.02 mg per kg of body weight, 0.03 mg per kg of body weight, 0.04 mg per kg of body weight, 0.05 mg per kg of body weight, 0.06 mg per kg of body weight, 0.07 mg per kg of body weight, 0.08 mg per kg of body weight, 0.09 mg per kg of body weight, 0.1 mg per kg of body weight, 0.2 mg per kg of body weight, 0.3 mg per kg of body weight, 0.4 mg per kg of body weight, 0.5 mg per kg of body weight, 0.6 mg per kg of body weight, 0.7 mg per kg of body weight, 0.8 mg per kg of body weight, 0.9 mg per kg of body weight, or 1 mg per kg of body weight.

In some examples, the total amount of an agent, such as an antimethanogenic agent administered to a subject animal, such as a ruminant, is expressed in dry matter intake (DMI). DMI is necessary for calculating the correct dosage of drugs administered through feed. Use of this unit ensures that animals receive the intended amount of medication, regardless of the feed's moisture content.

In some embodiments, disclosed methods involve administering a disclosed long-acting composition to a ruminant animal, such that the composition contains a total amount of an active agent, such as an antimethanogenic agent, of less than about 5 mg/kg DMI, 10 mg/kg DMI, 15 mg/kg DMI, 20 mg/kg DMI, 25 mg/kg DMI, 30 mg/kg DMI, 35 mg/kg DMI, 40 mg/kg DMI, or 45 mg/kg DMI, including all ranges and subranges therebetween.

In some embodiments, disclosed methods involve administering a disclosed long-acting composition to a ruminant animal, such that the composition or device contains a total amount of an active agent, such as an antimethanogenic agent, in a range of 1 to 45 mg/kg DMI, 5 to 35 mg/kg DMI, 10 to 30 mg/kg DMI, 15 to 25 mg/kg DMI, 1-5 mg/kg DMI, 6-15 mg/kg DMI, 16-30 mg/kg DMI, or 31-45 mg/kg DMI, including all ranges and subranges therebetween.

In some embodiments, disclosed methods involve administering a disclosed long-acting composition to a ruminant animal, such that the composition or device contains a total amount of an active agent, such as an antimethanogenic agent, of about 1 mg/kg DMI, 2 mg/kg DMI, 3 mg/kg DMI, 4 mg/kg DMI, 5 mg/kg DMI, 6 mg/kg DMI, 7 mg/kg DMI, 8 mg/kg DMI, 9 mg/kg DMI, 10 mg/kg DMI, 11 mg/kg DMI, 12 mg/kg DMI, 13 mg/kg DMI, 14 mg/kg DMI, 15 mg/kg DMI, 16 mg/kg DMI, 17 mg/kg DMI, 18 mg/kg DMI, 19 mg/kg DMI, 20 mg/kg DMI, 21 mg/kg DMI, 22 mg/kg DMI, 23 mg/kg DMI, 24 mg/kg DMI, 25 mg/kg DMI, 26 mg/kg DMI, 27 mg/kg DMI, 28 mg/kg DMI, 29 mg/kg DMI, 30 mg/kg DMI, 31 mg/kg DMI, 32 mg/kg DMI, 33 mg/kg DMI, 34 mg/kg DMI, 35 mg/kg DMI, 36 mg/kg DMI, 37 mg/kg DMI, 38 mg/kg DMI, 39 mg/kg DMI, or 40 mg/kg DMI, including all ranges and subranges therebetween.

In some embodiments, any long-acting of the present disclosure can be added to a feedlot or feed yard, such as a feed yard for ruminant animals. In such case, any long-acting of the present disclosure may be administered, such as consumed, by a ruminant animal multiple times per day, such as up to 2, 3, 4, 5, 6, 7, or 8 times per day. In some embodiments, the ruminant animal consumes any of the long-acting composition of the present disclosure once per day, twice per day, three times per day, four times per day, or five time per day.

In some embodiments, any long-acting composition of the present disclosure may be administered to a ruminant animal, such as consumed by a ruminant animal, at a dosing interval of less than or about 4 hours, 8 hours, 12 hours, 16 hours, 20 hours, or 24 hours, including all ranges and subranges therebetween.

In some embodiments, any long-acting composition of the present disclosure can be added or otherwise combined with an agricultural feed composition that is suitable for administration to a ruminant animal. The agricultural feed composition can include any of forage, fodder, a grain, a protein, fiber, fat, a non-protein nitrogen source, a rumen buffer, a liquid feed, a total mixed ration, derivatives thereof, or a combination thereof.

For example, can be included as part of a ration or a lick block. The ration or the lick block may include any of a probiotic, a vitamin supplement, a mineral supplements, a vegetable or fruit, e.g., corn or potatoes, a pellets, such as a Grain Screening Pellet, molasses, a seaweed, e.g., kelp or *Ascophyllum* spp., such as *Ascophyllum nodosum*, and combinations thereof.

Slow-Release of Therapeutic Agents

In some embodiments, the provided long-acting compositions may have the properties of a slow-release composition, releasing infused or otherwise contained therapeutic agents, such as antimethanogenic agents, at a controlled or reduced rate, relative to an immediate release formulation, over a period of time. In particular aspects, the provided long-acting compositions can slow the release of an active agent contained therein, thereby providing sustained release of the agent. Herein, "administration" refers to oral administration of any of the disclosed long-acting compositions to a subject animal, such as a ruminant animal. Release of the active agent, such as a therapeutic agent, from disclosed long-acting compositions, occurs post-administration, such as in the animal rumen, facilitating contact between the released active agent and the methanogenic archaea residing therein.

In some embodiments, disclosed long-acting compositions release, such as deliver, an therapeutic agent in a total amount of about 0.1 mg/day, 1 mg/day, 5 mg/day, 10 mg/day, 15 mg/day, 20 mg/day, 25 mg/day, 30 mg/day, 35 mg/day, 40 mg/day, 45 mg/day, 50 mg/day, 55 mg/day, 60 mg/day, 65 mg/day, 70 mg/day, 75 mg/day, 80 mg/day, 85 mg/day, 90 mg/day, 95 mg/day, 100 mg/day, including all ranges and subranges therebetween.

In some embodiments, disclosed long-acting compositions release, such as deliver, an therapeutic agent in a total amount of about 0.01 mg/hr, 0.1 mg/hr, 0.2 mg/hr, 0.4 mg/hr, 0.6 mg/hr, 0.8 mg/hr, 1 mg/hr, 1.2 mg/hr, 1.4 mg/hr, 1.6 mg/hr, 1.8 mg/hr, 2 mg/hr, 2.2 mg/hr, 2.4 mg/hr, 2.6 mg/hr, 2.8 mg/hr, 3 mg/hr, 3.2 mg/hr, 3.4 mg/hr, 3.6 mg/hr, 3.8 mg/hr, 4 mg/hr, 4.2 mg/hr, 4.4 mg/hr, 4.6 mg/hr, 4.8 mg/hr, or 5 mg/hr, including all ranges and subranges therebetween.

In some embodiments, disclosed long-acting compositions are capable of delivering a therapeutic agent for at least about 4, 8, 12, 16, 20, 24, 28, 32, 36, 40, 44, or 48 hours, including all ranges and subranges therebetween, when administered to a ruminant animal. In some embodiments, disclosed substrates are capable of delivering a therapeutic agent for about 1 to 48 hours, 4 to 48 hours, 8 to 48 hours, 12 to 48 hours, 16 to 48 hours, 20 to 48 hours, 24 to 48 hours, 28 to 48 hours, 32 to 48 hours, 36 to 48 hours, 40 to 48 hours, or 44 to 48 hours, including all ranges and subranges therebetween, when administered to a ruminant animal.

Methods of characterizing the release profiles of the disclosed long-acting compositions are available to one of skill in the art. See, e.g., the Examples of US20220175670A1, which describes release testing of carriers in replicated ruminal fluid. However, in other examples, release kinetics can be inferred based on observed efficacy, such as detecting reductions in methane emissions post-administration.

Ruminant Animals

Ruminant animals are those mammals in the suborder Ruminantia. Most have four-chambered stomachs and two-toed feet. The gastrointestinal (GI) tract of ruminant animals is uniquely adapted to digest plant-based diets rich in fibrous materials. The ruminant GI tract consists of four specialized stomach compartments: the rumen, reticulum, omasum, and abomasum. See, e.g., Horstmann, Chapter 12—Anatomy and physiology of the gastrointestinal system, The Bowhead Whale, Academic Press, 2021, pages 165-183.

Of the distinct stomach compartments, the rumen is the largest, holding up to 50 gallons of material in mature cattle. The rumen's environment, such as pH and temperature, is regulated to provide optimal conditions for microbial activity. The compartment serves as the site for fermentation and microbial activity, containing a diverse microbial ecosystem that includes bacteria, protozoa, fungi, and methanogenic archaea. See, e.g., Hobson & Wallace, *Crit Rev Microbiol.* 1982 April; 9(3):165-225.

Methanogenic archaea produce methane as a byproduct of fermentation, contributing to the animal's energy metabolism but also to greenhouse gas emissions. In contrast, the reticulum aids in particle size selection and regurgitation for rumination, the omasum absorbs water and minerals, and the abomasum functions similarly to a monogastric stomach by secreting digestive enzymes. Due to the fermentation process, fiber particles can remain in the rumen from 20 to 48 hours. However, particles that digest faster may be subject to a shorter residence time. See, e.g., Wattiaux & Howard, "1) Digestion In The Dairy Cow," Dairy Essentials, Babcock Institute for International Dairy Research and Development, UW-Madison. In certain embodiments, the provided long-acting compositions, drug delivery devices, and methods of the present disclosure are configured to target methanogenic archaea in the animal rumen, residing in the compartment for up to about 48 hours.

Including wild and domesticated species, there are roughly 200 species of ruminants. Example ruminants include, but are not limited to, bovine (cattle), goats, sheep, bison, giraffes, deer, elk, gazelles, antelopes, alpacas, llamas, and camels. Illustrative examples of ruminant animals include cattle, sheep, goats, deer, (including reindeer), moose, giraffes, bison, antelopes (including gazelles), camels (including dromedaries and bactrian camels), yaks, muskoxen, water buffalo, pronghorns, ibexes, chamois, saiga antelope, gemsbok, wildebeest, markhor, and sable antelope, among others.

Exemplary cattle breeds to which disclosed compositions may be administered include, but are not limited to, Angus, or Aberdeen-Angus, Ayrshire, Beefmaster, Belgium Blue, Belted Galloway, Brahman, or Zebu, Brangus, British White, Brown Swiss, Charolais, Chianina, Devon, Dexter, English Longhorn, Galloway, Gloucester, Guernsey, Hereford, or Whiteface, Highland, Holstein-Friesian, Irish Moiled, Jersey, Kerry, Limousin, Luing, Milking Devon, Milking Shorthorn, Normande, Polled Hereford, Red Angus, Red Poll, Santa Gertrudis, Shorthorn, or Durham, South Devon, Simmental, Sussex, Welsh Black, and White Park.

Advantageous Effects of Disclosed Compositions and Methods

The disclosed long-acting compositions, including infused edible substrates, such as drug delivery devices, and encapsulated compositions, and methods provide several beneficial effects. Upon administration to ruminant animals the provided long-acting compositions significantly inhibit rumen methanogenesis, as evidenced by reduced enteric methane emissions. In particular aspects, such reductions in methane emissions are achieved at a relatively low dose of antimethanogenic agent and at a relatively extended dosing period. Additional benefits include improved animal productivity, which can be determined by evaluating feed efficiency, and reduced animal toxicity. Without being limited to any particular theory, the long-acting profile of active agent from disclosed compositions and devices contributes to the realization of such benefits.

Enteric Methane Emissions

In some aspects, provided are long-acting compositions and related methods for reducing enteric methane production in a ruminant animal over an extended period of time. In certain aspects, releasing a relatively low dose of an antimethanogenic agent over an extended period of time to the animal rumen, such as by administering any of the disclosed long-acting compositions reduces the animal's methane emissions. The reduction in methane emissions can be determined by comparison to methane emissions from the same animal prior to administration of the disclosed long-acting composition. In other examples, decreased methane emissions can be determined relative to a control animal that is not administered the disclosed long-acting composition.

In some embodiments, the methane emissions of a ruminant animal administered any of the disclosed long-acting compositions in accordance with disclosed methods are reduced by up to 100%, such as by about 5%, 10%, 15%, 20%, 25%, 30%, 35%, 40%, 45%, 50%, 55%, 60%, 65%, 70%, 75%, 80%, 85%, 90%, 95%, or 100%, including all ranges and subranges therebetween. Percent reduction can be determined relative to the ruminant animal's methane emissions prior to administration of a disclosed long-acting composition, such as 1 hour, 4 hours, 8 hours, 12 hours, 16 hours, 20 hours, or 24 hours prior to administration. Alternatively, percent reduction of methane emissions can be determined relative to a control animal. One of skill in the art will understand the necessary characteristics of a control animal, e.g., an animal of the same or comparable breed, an animal having comparable weight, an animal having comparable age, an animal fed comparable feed, and an animal residing in a comparable environment.

Reductions in methane emissions may also be expressed as values which fall below a specific threshold. Such thresholds may be dependent on the type of ruminant animal, the size of the ruminant animal, and the feed fed to the ruminant animal, among other factors. In some embodiments, the methane emissions of a ruminant animal administered any of the disclosed long-acting compositions in accordance with disclosed methods are reduced below a level of 0.5 g/day/head, 5 g/day/head, 10 g/day/head, 15 g/day/head 25 g/day/head, 50 g/day/head, 75 g/day/head, 100 g/day/head, 125 g/day/head, 150 g/day/head, 175 g/day/head, 200 g/day/head, 225 g/day/head, 250 g/day/head, 275 g/day/head, or 300 g/day/head, including all ranges and subranges therebetween.

Methods of detecting and measuring methane emissions are available to one of skill in the art. See, e.g., a review of methods for quantifying methane emissions by Tedeschi et al., *J Anim Sci.* 2022 Jul. 1; 100(7):skac197. In one example, effects on methane emissions can be determined in vitro, such as by replicating the conditions of rumen fermentation. See, e.g., the Examples of WO2023150832A1. In an illustrative example on in vivo methods, methane emissions can be measured with the non-invasive GreenFeed system, which estimates daily methane ($CH_4$) and carbon dioxide ($CO_2$) production from the gas concentrations and airflow detected from an animal's breath during voluntary visits to the GreenFeed unit. The system also measures airflow rates to calculate the total gas emissions. See, e.g., Ryan et al., *Journal of Animal Science*, Volume 100, Issue 12, December 2022, skac349.

Feed Efficiency

The provided long-acting compositions, drug delivery devices, and methods can increase feed efficiency. Feed efficiency is represented as the feed to gain ratio (F:G), also known as the feed conversion ratio (FCR). It is a measure of an animal's efficiency in converting feed nutrients into increased body mass. Thus, a lower feed to gain ratio represents a better feed efficiency. Examples of more and less efficient feed to gain ratios are shown in Table 3 below (adapted from extension.usu.edu/4h-livestock-calculator/research/market-animal-feed-efficiency-a-tool-for-evaluating-feed-conversion). See also Cameron, M. R., et al. (2001) Growth and slaughter traits of Boer x Spanish, Boer x Angora, and Spanish goats consuming a concentrate-based diet, *J. of Animal Science*, 79(6), 1423; Claffey, et al. (2018) Effect of forage to concentrate ratio and duration of feeding on growth and feed conversion efficiency of male lambs, *Translational Animal Science*, 2(4), 419-427; Lewis, S. J., et al. (1997) Feedlot performance and carcass traits of Boer goat crosses and Spanish male kids, *Journal of Animal Science*, 75 (Suppl. 1), 40; Shike, D. (2013) Beef cattle feed efficiency [Conference session], Driftless Range Beef Conference, Dubuque, IA, United States; and Stender, D. (2012) Swine feed efficiency: Influence of market weight [Fact sheet], Iowa State University.

To measure an animal's feed conversion efficiency, one must first calculate the animal's average daily gain, and the weight of the animal's daily ration. To obtain the feed conversion efficiency, the daily ration weight is divided by the average daily gain: Daily Ration (dry matter intake-DMI)/Average Daily Gain (ADG)=Conversion Efficiency.

TABLE 3

Example feed to gain ratios for different animals

| Species | Feed conversion efficiency (lb. DMI/lb. ADG) | | % | |
|---|---|---|---|---|
| | More efficient | Less efficient | Difference | Reference |
| Cattle | 4.5 | 7.5 | 40% | Shike 2013 |
| Sheep | 4.1 | 11.7 | 65% | Claffey et al. 2018 |
| Goats | 3.9 | 10.5 | 63% | Cameron et al. 2001; Lewis et al. 1997 |

In some embodiments, administering a disclosed long-acting composition in accordance with disclosed methods to a ruminant animal results in an F:G ratio of less than 7. For example, the ruminant animal may exhibit an F:G ratio of less than about 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, or 3.0, including all ranges and subranges therebetween.

In some embodiments, a ruminant animal administered a disclosed long-acting composition in accordance with disclosed methods exhibits at least a 0.1%, 0.2%, a 0.3%, a 0.4%, a 0.5%, a 0.6%, a 0.7%, a 0.8%, at 0.9%, a 1%, 2%, a 3%, a 4%, a 5%, a 6%, a 7%, an 8%, a 9%, 10%, 11%, a 12%, a 13%, a 14%, a 15%, a 16%, a 17%, an 18%, at 19%, 20%, 21%, a 22%, a 23%, a 24%, a 25%, a 26%, a 27%, a 28%, at 29%, 30%, 31%, a 32%, a 33%, a 34%, a 35%, a 36%, a 37%, a 38%, at 39%, 40%, 41%, a 42%, a 43%, a 44%, a 45%, a 46%, a 47%, a 48%, at 49%, or a 50% increase, including all ranges and subranges therebetween, in feed efficiency compared to a ruminant animal that did not receive the composition, including all ranges and subranges therebetween.

In some embodiments, the disclosure teaches a method for reducing cost per pound of weight gain of a market animal, the method comprising administering a long-acting composition of the disclosure to a ruminant animal. The cost per pound gained can be determined as follows:

Cost per Pound of feed×Feed Efficiency=Cost per Pound of Gain. For example, if the price per pound is $0.50, and the Feed Efficiency is 3.7, then the Cost per Pound of Gain would be $1.85.

In some embodiments, the cost per pound of a ruminant animal is reduced by about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 35%, 40%, 45%, 50%, 55%, 60%, 65%, 70%, or 75%, including all ranges and subranges therebetween, compared to an animal that did not receive the long-acting composition, including all ranges and subranges therebetween.

Animal Safety

The provided long-acting compositions and related methods can promote animal health and safety relative to available compositions, devices, and methods. In certain examples, administration of antimethanogenic compounds can alter rumen pH, shift microbial populations, and reduce methanogenesis. Each of these factors can contribute to the development of acidosis. Whereas some animals may be more susceptible to acidosis than others, the consequences of acidosis can be severe, spanning significant decreases animal productivity and increased healthcare costs.

In some embodiments, administration of disclosed long-acting compositions, such as containing an antimethanogenic compound, to a ruminant animal in accordance with disclosed methods does not result in acidosis.

Methods of diagnosing or detecting acidosis are available to one of skill in the art. For example, indicators of acidosis can be evaluated by blood analysis, liver function tests, and other clinical observations, such as reduced feed intake, lethargy, or diarrhea. See, e.g., Owens et al., *J Anim Sci.* 1998 January; 76(1):275-86 for a detailed review of acidosis and its effects.

III. Methods of Manufacture

In some aspects, provided are methods of manufacturing the long-acting compositions of the present disclosure, including infused edible substrates, such as drug delivery devices, and encapsulated compositions.

Manufacture of Infused Edible Substrates/Infused Drug Delivery Devices

In some aspects, provided are methods of manufacturing the infused edible substrates of the present disclosure, such as disclosed drug delivery devices. In some embodiments, disclosed methods involve introducing, such as infusing, a solution into the disclosed substrates.

Liquid Phase Infusion

In embodiments, infusion of an edible substrate can be completed by soaking. In some embodiments, infusing can be accomplished by soaking with application of vacuum pressure.

In some embodiments, disclosed methods involve contacting a substrate, e.g., a seed or grain, with a liquid solution. In certain embodiments, exposure of the substrate to the liquid solution involves submerging the substrate into the solution, such as soaking the substrate in the solution. In some embodiments, disclosed methods involve soaking the substrate in the solution for up to about 1 day, 7 days, 14 days, 21 days, or 28 days. In some embodiments, disclosed methods involve soaking the substrate in the solution for 1 to 30 days, 5 to 25 days, 7 to 14 days, or 21 to 28 days. In some embodiments, disclosed methods involve soaking the substrate in the solution for about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, or 24 days.

In some embodiments, soaking is performed at room temperature or ambient temperature. In yet other embodiments, soaking is performed above or below room temperature. In some embodiments, soaking is performed in the presence of applied heat, such as a heat source. In certain embodiments, soaking is conducted at a temperature that is above the melting point of the solution components.

In some embodiments, disclosed methods involve soaking a substrate in a solution containing a therapeutic agent at a temperature of at least or about 10° C., 15° C., 20° C., 25° C., 30° C., 35° C., 40° C., 45° C., 50° C., 55° C., 60° C., 65° C., 70° C., 75° C., including all ranges and subranges therebetween. In some embodiments, the delivery substrates soaking in solution may be subject to agitation.

Soaking in accordance with disclosed methods can involve a container, such as a vat. In some embodiments, the container had a lid is capable of forming a seal with the body of the container, e.g., an air-tight seal.

In some embodiments, prior to addition of a solution for soaking, disclosed substrates are exposed to vacuum pressure. In some embodiments, soaking of a disclosed substrate in an infused composition is performed in the presence of applied vacuum pressure.

In some embodiments, disclosed methods involve applying vacuum pressure to a disclosed substrate, for example, a seed, at a level of less than about 35 mbar, 40 mbar, 45 mbar, 50 mbar, 55 mbar, 60 mbar, or 65 mbar, including all ranges and subranges therebetween. In some embodiments, disclosed methods involve applying vacuum pressure to a disclosed substrate at a level of 5 to 65 mbar, 10 to 60 mbar, 15 to 55 mbar, 20 to 50 mbar, 25 to 45 mbar, 30 to 40 mbar, 30 to 50 mbar, 35 to 50 mbar, or 45 to 50 mbar, including all ranges and subranges therebetween. In some embodiments, disclosed methods involve applying vacuum pressure to a disclosed substrate at a level of about 5 mbar, 10 mbar, 15 mbar, 20 mbar, 25 mbar, 30 mbar, 35 mbar, 40 mbar, 45 mbar, 50 mbar, 55 mbar, 60 mbar, or 65 mbar, including all ranges and subranges therebetween.

In some embodiments, disclosed methods involve applying vacuum pressure to a disclosed substrate, such as a drug delivery device, for up to or about 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, or 120 minutes, including all ranges and subranges therebetween.

In some embodiments, disclosed methods involve applying vacuum pressure to a disclosed substrate for up to or about 0.5 hours, 1 hours, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, or 8 hours, including all ranges and subranges therebetween.

In one illustrative example, vacuum pressure is applied to seeds, a representative biologic drug delivery device, in a container, and while the vacuum is maintained, an infusable composition containing the antimethanogenic agent bromoform is added until all plant seeds are submerged in the infusable composition. The vacuum is then released, allowing atmospheric pressure to push the infusable composition into the seed. If the vacuum is applied to seeds, but no infusable composition is added to the seeds, air will return back into the seeds instead of the infusable composition as soon as the vacuum is released.

Vapor Infusion

In embodiments, infusion of an edible substrate can be achieved by contacting the substrate with a vapor containing a therapeutic agent, such as an antimethanogenic agent. In some embodiments, such infusion by vapor can be performed with the aid of vacuum pressure.

In embodiments, disclosed vapor infusion methods involve a system for generating vapor, such as a vapor containing an antimethanogenic agent. The system can include any of a vaporization chamber, a heating element for controlled vaporization, a reservoir containing the therapeutic agent in liquid or solid form, and a vapor delivery system, e.g., including adjustable flow controls for introducing a vaporized agent to a substrate.

In some embodiments, the agent subject to vaporization can be heated to a temperature of at least or about 75° C., 100° C., 125° C., 150° C., 175° C., 200° C., 225° C., 250° C., 275° C., 300° C., including all ranges and subranges therebetween.

The disclosed vapor infusion methods can include an infusion chamber, such as a container that maintain a sealed environment during the infusion process, facilitates uniform vapor distribution. In some examples, the infusion chamber can include temperature and humidity controls.

In preparation for vapor infusion, a substrate can be loaded into an infusion chamber. In some examples, prior to introduction to the infusion chamber or during residence in the infusion chamber, the substrate can be exposed to negative vacuum pressure. The infusion chamber may then be sealed, e.g., the infusion chamber may include a container having an airtight seal.

The method may include maintaining the chamber at a high temperature, as higher temperatures can increase fumigant volatility and diffusion. In embodiments, disclosed methods involve maintaining the temperature of the chamber containing the substrate and vapor at a temperature of at least or about 75° C., 100° C., 125° C., 150° C., 175° C., 200° C., 225° C., 250° C., 275° C., 300° C., including all ranges and subranges therebetween.

Infusion of the vapor can be controlled or enhanced by altering a variety of parameters, including but not limited to the concentration of the active agent contained by the vapor. The gas infusion method may involve maintaining the vapor concentration for a predetermined duration of time. In embodiments, disclosed methods involve contacting a substrate with a vapor containing about 100 ppm, 200 ppm, 300 ppm, 400 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3100 ppm, 3200 ppm, 3300 ppm, 3400 ppm, 3500 ppm, 3600 ppm, 3700 ppm, 3800 ppm, 3900 ppm, 4000 ppm, 4100 ppm, 4200 ppm, 4300 ppm, 4400 ppm, 4500 ppm, 4600 ppm, 4700 ppm, 4800 ppm, 4900 ppm, 5000 ppm, 5100 ppm, 5200 ppm, 5300 ppm, 5400 ppm, 5500 ppm, 5600 ppm, 5700 ppm, 5800 ppm, 5900 ppm, 6000 ppm, 6100 ppm, 6200 ppm, 6300 ppm, 6400 ppm, 6500 ppm, 6600 ppm, 6700 ppm, 6800 ppm, 6900 ppm, 7000 ppm, 7100 ppm, 7200 ppm, 7300 ppm, 7400 ppm, 7500 ppm, 7600 ppm, 7700 ppm, 7800 ppm, 7900 ppm, 8000 ppm, 8100 ppm, 8200 ppm, 8300 ppm, 8400 ppm, 8500 ppm, 8600 ppm, 8700 ppm, 8800 ppm, 8900 ppm, 9000 ppm, 9100 ppm, 9200 ppm, 9300 ppm, 9400 ppm, 9500 ppm, 9600 ppm, 9700 ppm, 9800 ppm, 9900 ppm, or 10000 ppm of a therapeutic agent, including all ranges and subranges therebetween.

In some embodiments, vaporization of the therapeutic agent occurs within the infusion chamber. In other embodiments, vaporization of the therapeutic agent is performed separately from the infusion chamber, and the vaporized substance is introduced into the infusion chamber. The vapor can be infused into the chamber at a controlled rate. The rate may be proportional to the chamber volume, e.g., larger chambers may require higher flow rates. The selected rate of vapor infusion may also depend on circulation rate, e.g., the time necessary for one complete change of air and the characteristics of the therapeutic agent selected for vaporization.

In some embodiments, disclosed methods involve contacting the substrate with the antimethanogenic compound vapor for at least or about 0 hours, 6 hours, 12 hours, 18 hours, 24 hours, 30 hours, 36 hours, 42 hours, 48 hours, 54 hours, 60 hours, 66 hours, 72 hours, 78 hours, 84 hours, 90 hours, 96 hours, 102 hours, 108 hours, 114 hours, 120 hours, 126 hours, 132 hours, 138 hours, 144 hours, 150 hours, 156 hours, 162 hours, 168 hours, 174 hours, 180 hours, 186 hours, 192 hours, 198 hours, 204 hours, 210 hours, 216 hours, 222 hours, 228 hours, 234 hours, 240 hours, 246 hours, 252 hours, 258 hours, 264 hours, 270 hours, 276 hours, 282 hours, 288 hours, 294 hours, 300 hours, 306 hours, 312 hours, 318 hours, 324 hours, 330 hours, or 336 hours, including all ranges and subranges therebetween.

In some embodiments, disclosed methods involve contacting the substrate with the antimethanogenic compound vapor for at least or about 0.25 hours, 0.5 hours, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, including all ranges and subranges therebetween.

In some embodiments, infusion of the vapor can be controlled or enhanced by increasing the rate of contact of the vapor with the substrate or drug delivery device. Thus in some embodiments, the vapor is made to flow through/around the substrate or drug delivery device, so as to continually exchange the vapor that is in contact with the final product. Persons will be familiar with ways of increasing flow of a vapor around a substrate, including enhancing circulation, such as by aiding uniform distribution of the vapor, arranging the substrate for adequate exposure to the vapor, and atmospheric modification, e.g., altering atmospheric gas concentrations of nitrogen and oxygen.

In some embodiments, infusion of the vapor can be controlled or enhanced by modulating the atmospheric pressure. For example, in some embodiments, the present disclosure teaches methods of contacting the vapor with the substrate or drug delivery device under a vacuum. In some embodiments, vacuum pressure is applied at a level of less than about 35 mbar, 40 mbar, 45 mbar, 50 mbar, 55 mbar, 60 mbar, or 65 mbar, including all ranges and subranges therebetween. In some embodiments, disclosed methods involve applying vacuum pressure to a disclosed substrate at a level of 5 to 65 mbar, 10 to 60 mbar, 15 to 55 mbar, 20 to 50 mbar, 25 to 45 mbar, 30 to 40 mbar, 30 to 50 mbar, 35 to 50 mbar, or 45 to 50 mbar, including all ranges and subranges therebetween. In some embodiments, disclosed methods involve applying vacuum pressure to a disclosed substrate at a level of about 5 mbar, 10 mbar, 15 mbar, 20 mbar, 25 mbar, 30 mbar, 35 mbar, 40 mbar, 45 mbar, 50 mbar, 55 mbar, 60 mbar, or 65 mbar, including all ranges and subranges therebetween.

In some embodiments, disclosed methods involve applying vacuum pressure to a disclosed substrate, such as a drug delivery device, for up to or about 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, or 120 minutes, including all ranges and subranges therebetween.

In some embodiments, disclosed methods involve applying vacuum pressure to a disclosed substrate for up to or about 0.5 hours, 1 hours, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, or 8 hours, including all ranges and subranges therebetween.

In some embodiments the edible substrate/drug delivery device is exposed to a vacuum before the vapor contacting step. Without being bound by any one theory, the inventors believe that vacuum exposure prior to, or concurrently with, vapor contacting, evacuates the air within micropores in the substrate, thereby allowing for greater uptake of the therapeutic agent.

In some embodiments, the present disclosure teaches contacting the vapor to the substrate or drug delivery device at atmospheric pressures below 1 atm. For example, in some embodiments, the contacting occurs at a pressure of 0 atm, 0.25 atm, 0.5 atm, 0.75 atm, or 0.95 atm, including all ranges and subranges therebetween. In some embodiments, the present disclosure teaches contacting the vapor to the substrate or drug delivery device at atmospheric pressures above 1 atm. For example, in some embodiments, the contacting occurs at a pressure of 1.5 atm, 5 atm, 10 atm, 15 atm, 20 atm, 25 atm, 30 atm, 35 atm, 40 atm, 45 atm, 50 atm, including all ranges and subranges therebetween.

Venting the infusion chamber and/or removing the substrate concludes the vapor infusion method. The infused edible substrate may then be packaged, processed, or stored for later use.

Manufacture of Long-Acting Encapsulated Compositions

In some embodiments, methods for manufacturing disclosed encapsulated compositions include blending an antimethanogenic agent into a carrier, thereby producing an antimethanogenic dispersion. In some embodiments, methods for manufacturing disclosed long-acting compositions further involve encapsulating the antimethanogenic dispersion into a container, thereby manufacturing the antimethanogenic composition.

In some embodiments, the temperature of the carrier during the blending step is performed above the carrier's melting point. In certain examples, the blending step involves uniformly distributing the antimethanogeknic agent into the carrier while the carrier is in liquid form. In some embodiments, the carrier's melting point is at least about 42° C., 43° C., 44° C., 45° C., 46° C., 47° C., 48° C., 49° C., or 50° C.

In some examples, the melted carrier undergoes a phase change and solidifies upon return to ambient temperature. Accordingly, disclosed encapsulated compositions include an antimethanogenic agent dispersed in a solid carrier. In some embodiments, the antimethanogenic dispersion is encapsulated, such as transferred to a container such that the container completely contains, envelops, or surrounds the antimethanogenic dispersion. In some embodiments, the container is a capsule. In other embodiments, the container is a coating. However, containers including coated capsules are also contemplated.

The disclosure will be further described by way of the following examples, which are meant to serve to assist one of ordinary skill in the art in carrying out the disclosure and are not intended in any way to limit the scope of the disclosure.

EXAMPLES

Example 1: Methods of Infusing a Drug Delivery Device With a Liquid-Phase Antimethanogenic Agent In a proof-of-concept study, dried corn kernels were evaluated for their ability to serve as an infused drug delivery device for the antimethanogenic agent bromoform. Infusion is distinct from feed additive approaches for reducing methane emissions in that the antimethanogenic agent penetrates and is contained within the device, such as a seed or grain, not simply added to the surface of the feed and forming a mixture.

Soaking: Corn kernels (17.7 kg) were placed in a 50 L stainless steel container. A proprietary seaweed extract (12 kg) containing 31.5 mg bromoform/g was then added to the container containing the corn kernels in sufficient volume to fully submerge the kernels. The container was then fully sealed, and the kernels were allowed to soak in the extract at room temperature.

Table 1 shows the absorption of the proprietary seaweed extract solution into the corn kernels. Briefly, at the specified time periods, corn kernels were sampled, removed from soaking. The kernels were processed to remove residual solution from the kernel exterior, and the kernels were ground prior to detection of bromoform by GC/MS. As a control, unsoaked corn was tested and the absence of bromoform was confirmed (data not shown).

TABLE 1

Absorption of liquid-phase bromoform into whole corn kernels

| Test # | Soaking Time | Bromoform Concentration in Whole Corn* (mg/g) |
| --- | --- | --- |
| 1 | 24 hours | 0.03 |
| 2 | 72 hours | 0.3 |
| 3 | 432 hours (18 days) | 7.3 |

*Indicates the average of 5 samples.

After 18 days of soaking, the concentration of bromoform in the corn kernels approached anticipated levels based on bromoform content of the seaweed extract. With this evidence showing the capacity of corn kernels to act as carriers for an antimethanogenic agent, the distribution of the agent within the structure of the corn kernel was interrogated.

After 18 days of soaking, four corn kernels were randomly selected for further study (Sample A, B, C, and D). Each kernel was wiped with a tissue to remove residual solution from the surface, then sliced into three sections. As shown in FIG. 1, Section 1 included the tip cap, Section 2 encompassed seed coat, germ, vitreous endosperm, and floury endosperm, and Section 3 contained the seed coat and floury endosperm farthest from the tip cap. The Sections were then subjected to GC/MS analysis to determine bromoform content. Table 2 shows the average distribution of bromoform inside corn kernels (n=4) after simple soaking at room temperature without agitation or vacuum pressure for 18 days.

TABLE 2

Distribution of bromoform in corn kernel partitions after soaking for 18 days

|  | Corn Kernel Section 1 | Corn Kernel Section 2 | Corn Kernel Section 3 |
| --- | --- | --- | --- |
| Bromoform content (mg/g) | 14 | 3.1 | 6.7 |

The results show that the tip cap region held the highest amount of bromoform. The tip cap is the point where a corn kernel attaches to the corn cob. The openings of the tip cap serve as a gateway through which water and nutrients flow into the kernel from the cob. Section 3, the section containing floury endosperm farthest from the tip cap, contained levels of bromoform that were roughly half that of the tip cap. Section 2, the middle section of the kernel, held the lowest amount of bromoform.

Vacuum Pressure-Soaking Method:

Given the unexpected success of infusing corn kernels with an antimethanogenic composition by simple soaking, a second soaking technique to accelerate the soaking time required for targeted bioactive concentration was assessed using a vacuum. Briefly, whole corn was placed into a stainless-steel container prior to application of a vacuum (<100 mbar). This level of pressure was maintained for about 5-120 min with the aim of removing air from inside the corn kernel. After this period of time, with the vacuum still applied, the same bromoform-containing seaweed extract solution was added to the container until all the corn kernels were submerged. The vacuum was then released to normal atmosphere pressure.

The bromoform content of corn kernels subjected to a vacuum-soaking method was assessed according to the methods described herein. 176.6 g corn kernels were placed in a 250 ml glass bottle. Applying medium-level vacuum (~100 mbar) to the container for 30 min, then the same seaweed extract solution was filled in while vacuum was maintained. Once all the corn kernels were submerged in the seaweed extract solution, the vacuum was released to atmospheric pressure. The bottle was left in a dark at room temperature. Table 3 shows the bromoform levels infused into corn kernels by vacuum-accelerated soaking.

TABLE 3

Bromoform concentration of corn kernels infused for 6 days with vacuum pressure

|  | Corn Kernel Section 1 | Corn Kernel Section 2 | Corn Kernel Section 3 |
| --- | --- | --- | --- |
| Bromoform content (mg/g) 2 h after vacuum-soaking | 6.4 | 1.1 | 0.19 |
| Bromoform content (mg/g) 4 days after vacuum-soaking | 6.4 | 1.95 | 6.5 |

By comparing the levels of infused bromoform presented in Tables 1, 2, and 3, the accelerated infusion of bromoform achieved with the vacuum-soaking method is evident. For example, comparing the 2 h vacuum-soaked kernels of Table 3 and the 72 hour direct soaking method of Table 1, applying the vacuum increased bromoform content over 20-fold in a fraction of the time, even when considering tip cap section of the 2 hour vacuum-soaked kernels alone.

Without limitation to any particular theory, removal of the air from inside the kernel may facilitate expedited infusion of the bromoform-containing seaweed extract solution into the corn kernel. Taken together, the results show the capacity of whole dried corn kernels to contain industrially relevant levels of antimethanogenic compositions.

In another larger batch vacuum test, dry whole corn kernels (10 kg) were subjected to vacuum pressure (<10 mbar) in a stainless-steel container for 2 h prior to submergence in seaweed extract containing bromoform. After the vacuum was removed, the kernels continued soaking for 24 days. Randomly sampled kernels (n=3) were measured for bromoform content, as described herein. The experimental results are presented in Table 4.

TABLE 4

Bromoform in corn kernels after vacuum-long time soaking for 24 days

|  | Corn Kernel Section 1 | Corn Kernel Section 2 | Corn Kernel Section 3 |
| --- | --- | --- | --- |
| Bromoform content (mg/g) | 7.0 | 4.1 | 3.8 |

Consistent with the comparison of data presented in Tables 1, 2, and 3, this method confirms accelerated infusion of the antimethanogenic agent with vacuum pressure.

Example 2: Comparative Open-Air Stability of Antimethanogenic Compositions Containing Bromoform Antimethanogenic compounds, such as bromoform, are highly volatile. If not properly contained, such as in a composition or product, chemical volatility can lead to significant losses of the antimethanogenic compound over time. Accordingly, this property presents a barrier to maintaining stable products with predictable dosing payload, and consequently, consistent efficacy.

Three compositions were prepared to evaluate their stability and retainment of bromoform. Exemplary Composition 1 was composed of seaweed extract-infused whole dried corn that had been soaked for 18 days at room temperature without agitation, as illustrated in Example 1.

Exemplary Composition 2 was composed of size 0 gelatin capsules filled with seaweed extract and a hydrogenated vegetable oil carrier. The carrier was selected on the basis of at least two requirements: 1. A melting point in excess of rumen temperature, which ranges from 38° C. to 42° C.; and 2. Resistance to degradation and dissolution. The concentration of bromoform included in each capsule was approximately 20 mg/g.

Serving as a comparator, the third composition (Reference Composition), was composed of freeze-dried seaweed powder.

The shelf stability of Exemplary and Reference Compositions was assessed upon exposure to open air at room temperature. An amount of each sample was placed in a plastic weighing tray that was fully open to the atmosphere, and samples, at least in triplicate, were taken over time. The bromoform levels of each sample were measured using GC/MS.

Figure 2:
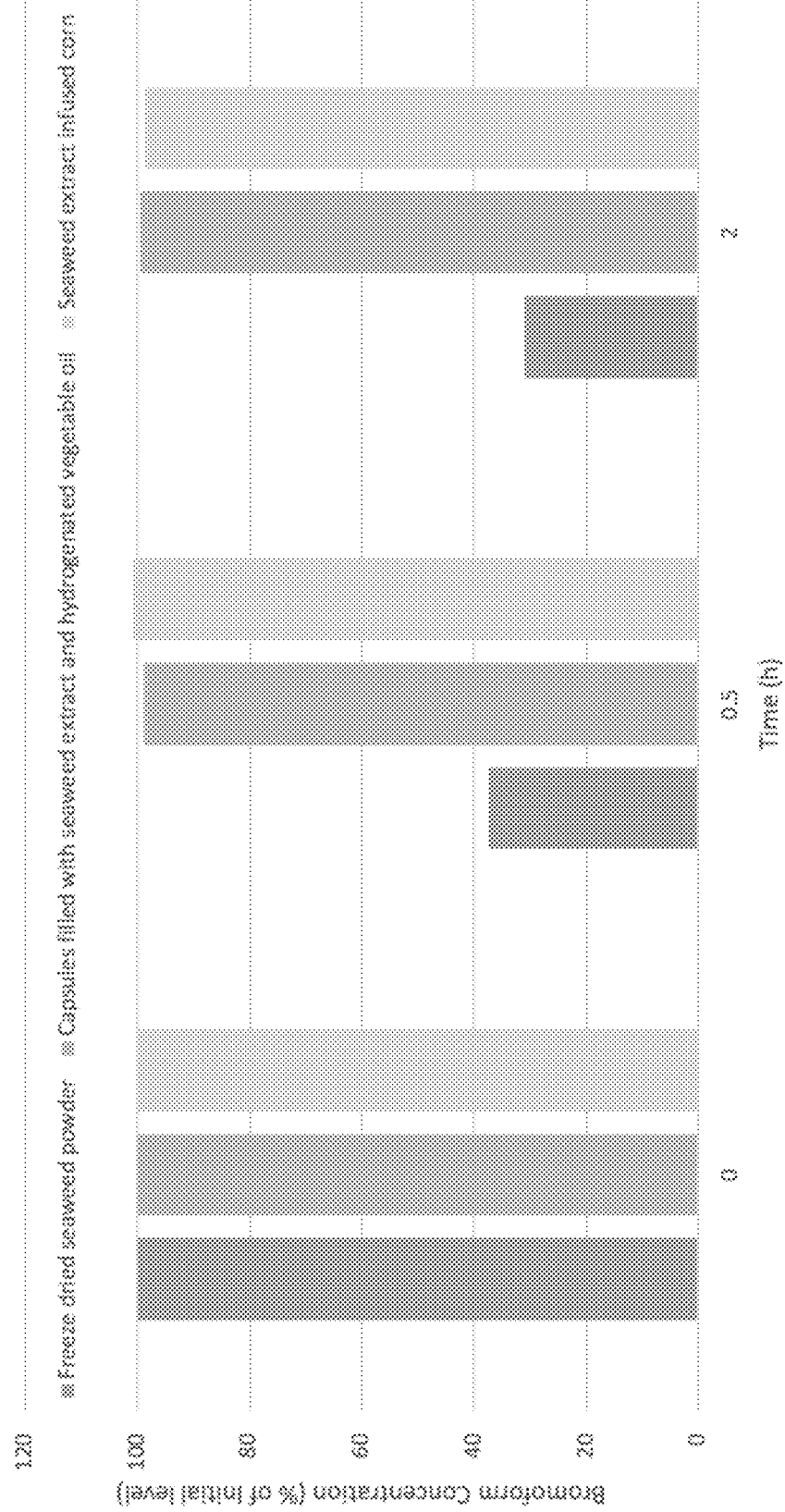
FIG. 2 is a bar chart showing the comparative stability of an exemplary capsule composition containing seaweed extract and hydrogenated oil, an exemplary composition of corn kernels infused with seaweed extract, and freeze-dried seaweed powder, as determined by retainment of bromoform upon open-air exposure.

FIG. 2 shows the percent amount of retained bromoform in each Composition over time, as determined relative to original bromoform levels (t=0). The antimethanogenic corn kernels (Exemplary Composition 1) and capsules (Exemplary Composition 2) retained nearly 100% of original bromoform levels over the 2-hour period. In contrast, the amount of bromoform in the freeze-dried seaweed powder (Reference Composition) sharply declined by about 63% after only 30 minutes. After 2 hours, the Reference Composition only retained about 30% of the original bromoform levels.

Relative to freeze-dried seaweed powder, both Exemplary Composition 1 and 2 exhibited superior retainment of bromoform, indicative of open-air stability. The reduced volatility of bromoform in each of the Exemplary Compositions offers the advantage of preserving the active agent, which provides consistency for dosing and efficacy.

Example 3: Comparative Effects of Exemplary and Reference Compositions in a Single Dose Regimen on Enteric Methane Emissions in Cattle The Exemplary Compositions of Examples 1 and 2 were administered to ruminant animals to assess their antimethanogenic effects, as determined by efficacy in reducing methane emissions.

Briefly, a single dose of each test composition was administered to individual ruminant animals, with each composition containing a total of 280 mg bromoform/dose. Green-Feed machines were used to monitor ruminant methane emissions over time, including methane levels prior to the supplementation.

Figure 3:
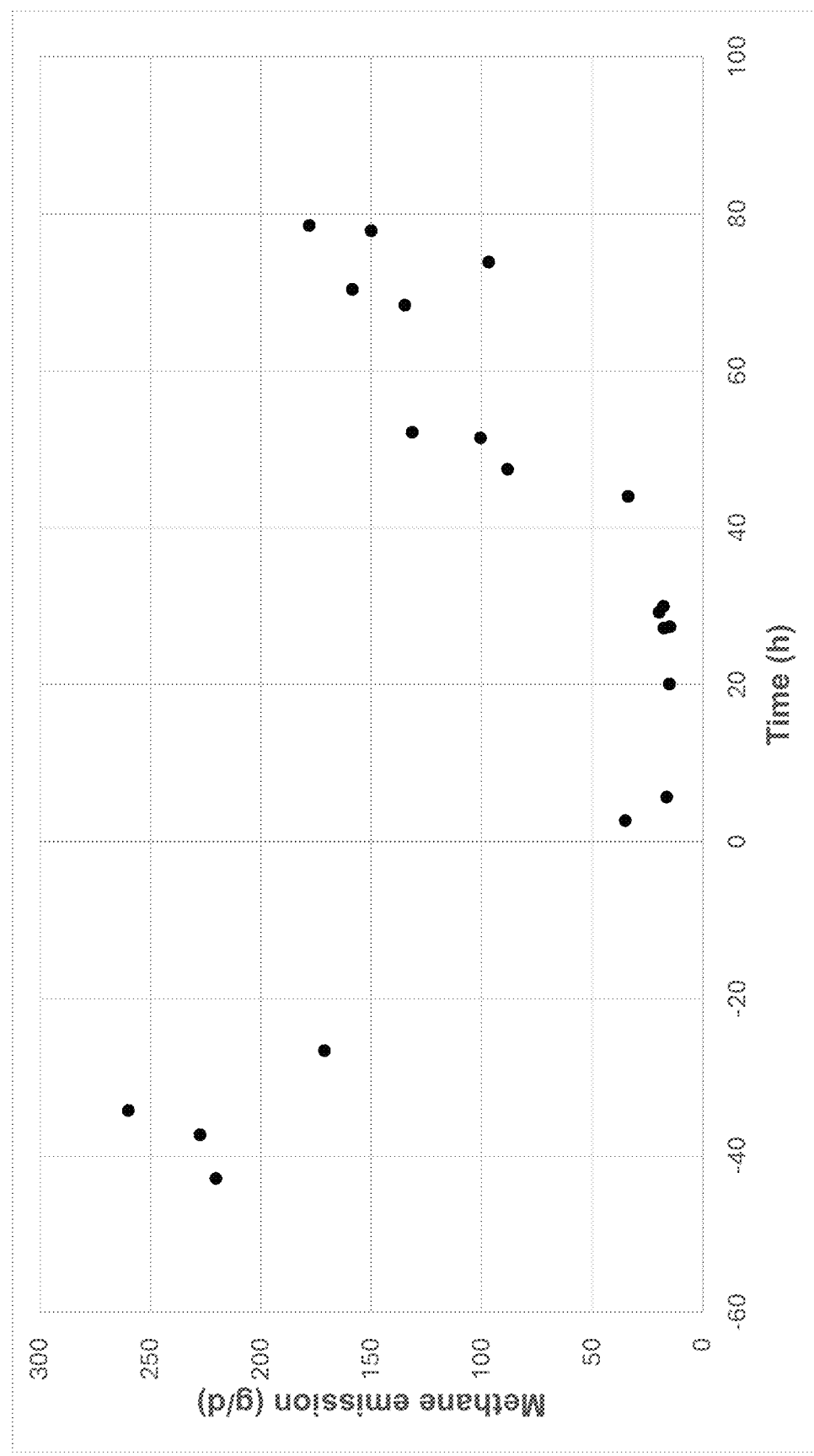
FIG. 3 is a graph showing cattle methane emissions (g/d) prior to and after supplementation with an exemplary composition of corn kernels infused with seaweed extract.

FIG. 3 shows the amount of methane emissions (g/d) detected from cattle administered Exemplary Composition 1, which contained corn kernels infused with seaweed extract. Time 0 represents the beginning of supplementation. The methane emissions of cattle fed Exemplary Composition 1 were reduced by approximately 93.3%, from about 220 g/d to 14.8 g/d at the lowest. This low methane status was maintained for 44 hours before increased emissions were observed. An additional 24 hours passed before methane emissions reached pretreatment levels.

Figure 4:
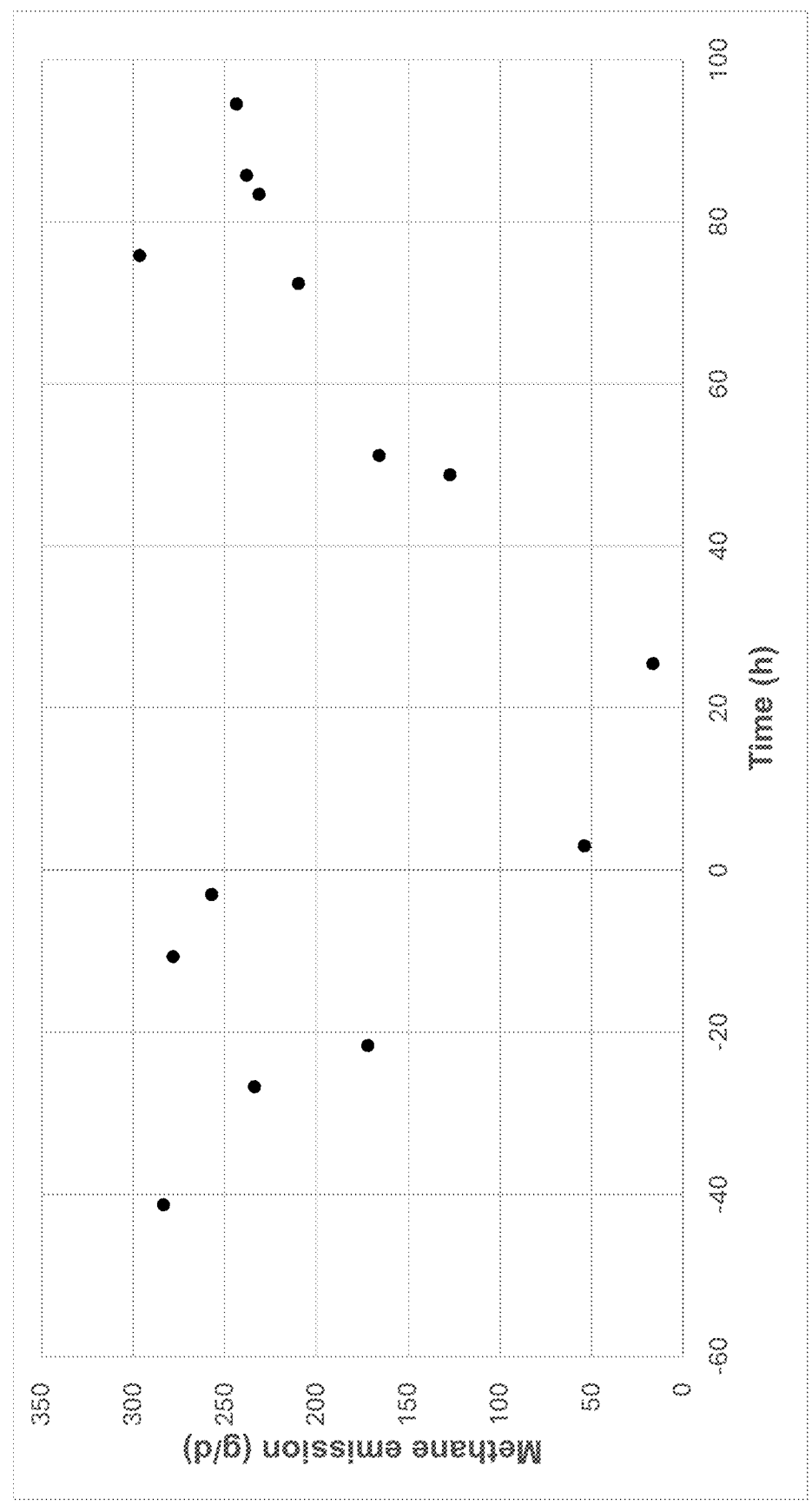
FIG. 4 is a graph showing cattle methane emissions (g/d) prior to and after supplementation with an exemplary encapsulated composition containing seaweed extract and hydrogenated vegetable oil.

FIG. 4 shows the amount of methane emissions (g/d) detected from cattle administered Exemplary Composition 2, capsules containing seaweed extract and hydrogenated vegetable oil. The antimethanogenic effects of Exemplary Composition 2 were comparable to that of the infused corn kernels. Cattle administered the seaweed extract capsules exhibited reductions in methane emissions of approximately 94%, from ~283 g/d to 16.5 g/d at the lowest. This reduced methane status was maintained for approximately 48 hours. Another 24 hours passed before methane emissions returned to pre-treatment levels.

A single administration of Exemplary Compositions containing bromoform reduced methane emissions in cattle by at least 90% for two days. Additionally, for each group, a full day passed before methane emissions returned to pre-treatment levels, providing approximately 72 hours of reduced methane emissions. Together, the collected data demonstrate the potent and sustained antimethanogenic effects of two exemplary compositions of bromoform.

Example 4: A Two-Dose Regimen of an Exemplary Encapsulated Antimethanogenic Composition Potently Reduces Ruminant Animal Methane Emissions for an Extended Period The exemplary capsule composition of Examples 1 and 2 was assessed for its antimethanogenic effects in a multiple dose study. Two doses of the encapsulated composition were administered to cattle with a dosing interval of 48 hours. GreenFeed measurements tracked methane emissions over two weeks, prior to and following supplementation.

Figure 5:
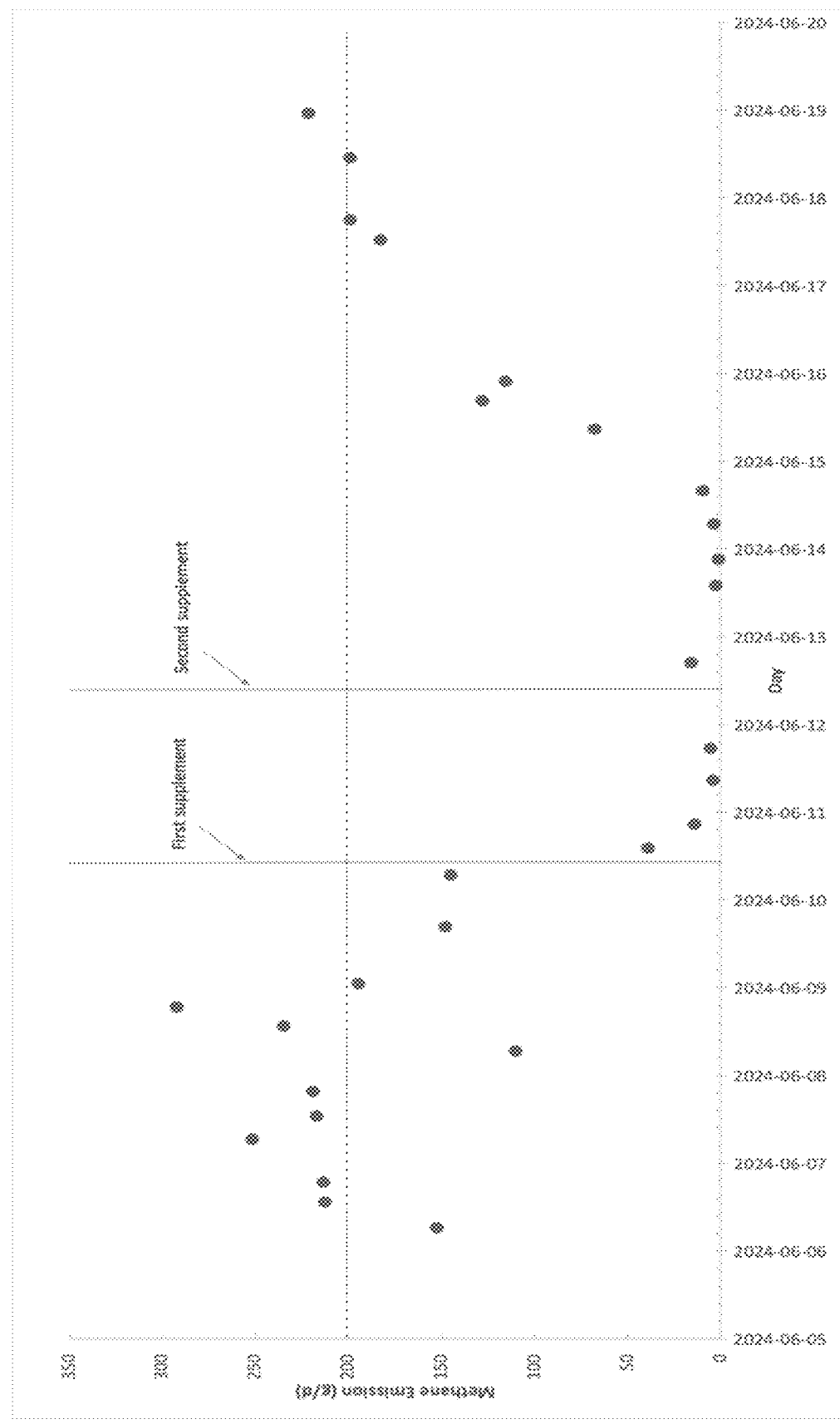
FIG. 5 is a graph showing ruminant animal methane emissions (g/d) before and after a first administration and a second administration of an exemplary encapsulated composition containing bromoform.

FIG. 5 shows the fluctuation of methane emissions (g/d) over the course of two weeks, prior to and following administration of the exemplary capsule composition. The emissions reached their highest recorded levels prior to the first dose, closely approaching 300 g/d. Methane emissions dropped to the lowest detectable levels immediately following the first dose and for about 48 hours after.

This trend was also observed after administration of the second dose. About 72 hours after the second administration, methane levels reached approximately 50 g/d. Notably, methane emissions did not exceed 200 g/d until 7 days after the second, final dose, indicating a sustained reduction in emissions after only 2 doses of the exemplary capsule composition.

Without being limited to any particular theory, the combination of the carrier and the capsule may serve to control release of the antimethanogenic compound within the rumen. The coating fully envelops the inner content, preventing release of the anti-methanogenic inhibitor until the capsule is degraded in rumen, while the solidifying carrier acts as a depot, facilitating slow diffusion of the compound from the composition.

Even in multi-dose per day regimens, the in vivo effects of antimethanogenic agents are limited. For example, a single dose of 3-NOP can maintain only a modest reduction in methane emissions (<30%) for about 3-4 hours. See, e.g., Costigan et al, *J Dairy Sci* 2024 Jun. 6: S0022-0302 (24) 00900-7. In view of previous attempts to inhibit methanogenesis in ruminant animals and reduce the resultant methane emissions, these data show significant and sustained efficacy of an exemplary antimethanogenic composition including both a carrier and capsule, as described herein.

Example 5: A Single Administration of Bromoform-Infused Corn Kernels to Ruminant Animals Reduces Methane Emissions for at Least 48 Hours Bromoform-infused corn, prepared in accordance with the methods described in Example 1, was administered to a ruminant animal to assess its efficacy in inhibiting methanogenesis and reducing methane emissions.
Single Animal Trial:

25 g of corn kernels were soaked in a liquid seaweed extract containing bromoform for 18 days. Prior to soaking, the kernels were subjected to 2 hours of negative vacuum pressure. The kernels were fed to a single animal, and the animal's methane emissions were tracked using a GreenFeed machine. No issues with palatability were observed. The animal displayed normal feeding activity.

Figure 6:
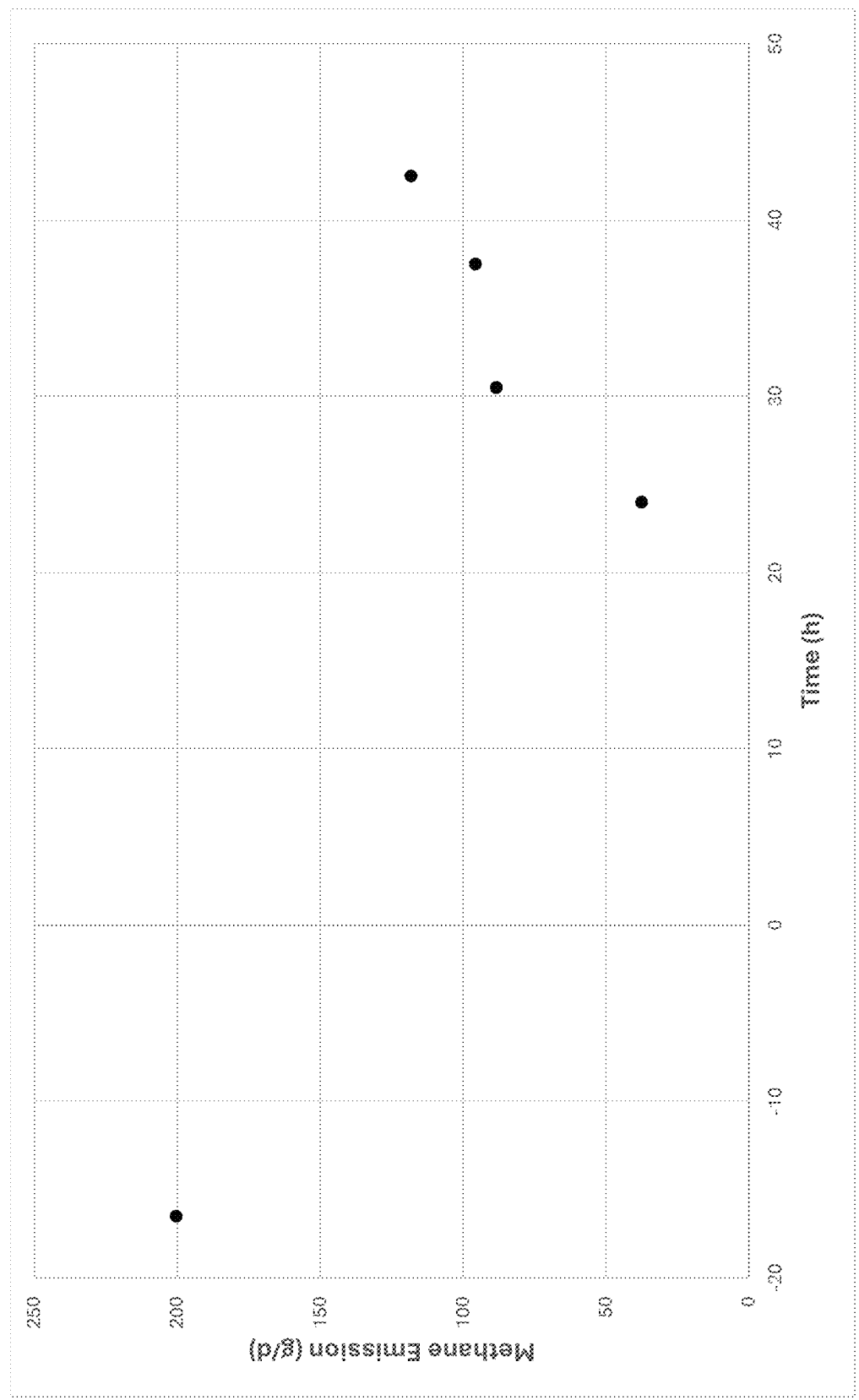
FIG. 6 is a graph showing methane emissions of a single ruminant animal before and after administration (t=0) of an exemplary encapsulated composition containing bromoform.

FIG. 6 shows methane emissions detected from the animal via GreenFeed measurement. Prior to administration of the bromoform-infused corn (t=0), methane emissions as high as 200 g/d were detected. However, after ingestion of the infused kernels, detected methane emissions did not exceed 120 g/d for 48 hours post-administration. At the lowest recorded level (24 h), methane emissions were reduced by about 80% relative to the pre-administration data point (38 mg/d vs 200 mg/d).
Whole Pen Trial:

To assess whether the reduced methane emissions observed in the single animal trial were reproducible at scale, an experiment with a pen of cattle was conducted. A total of 856 g of bromoform-infused corn kernels was fed together with cattle ration to a pen of 20 animals. The animals consumed most of the corn within 1 hour. A GreenFeed machine was used to monitor the methane emissions over the course of 3 days prior to administration (d=−3) and 5 days post-administration (d=5). Emission measurements were averaged for each day.

Figure 7:
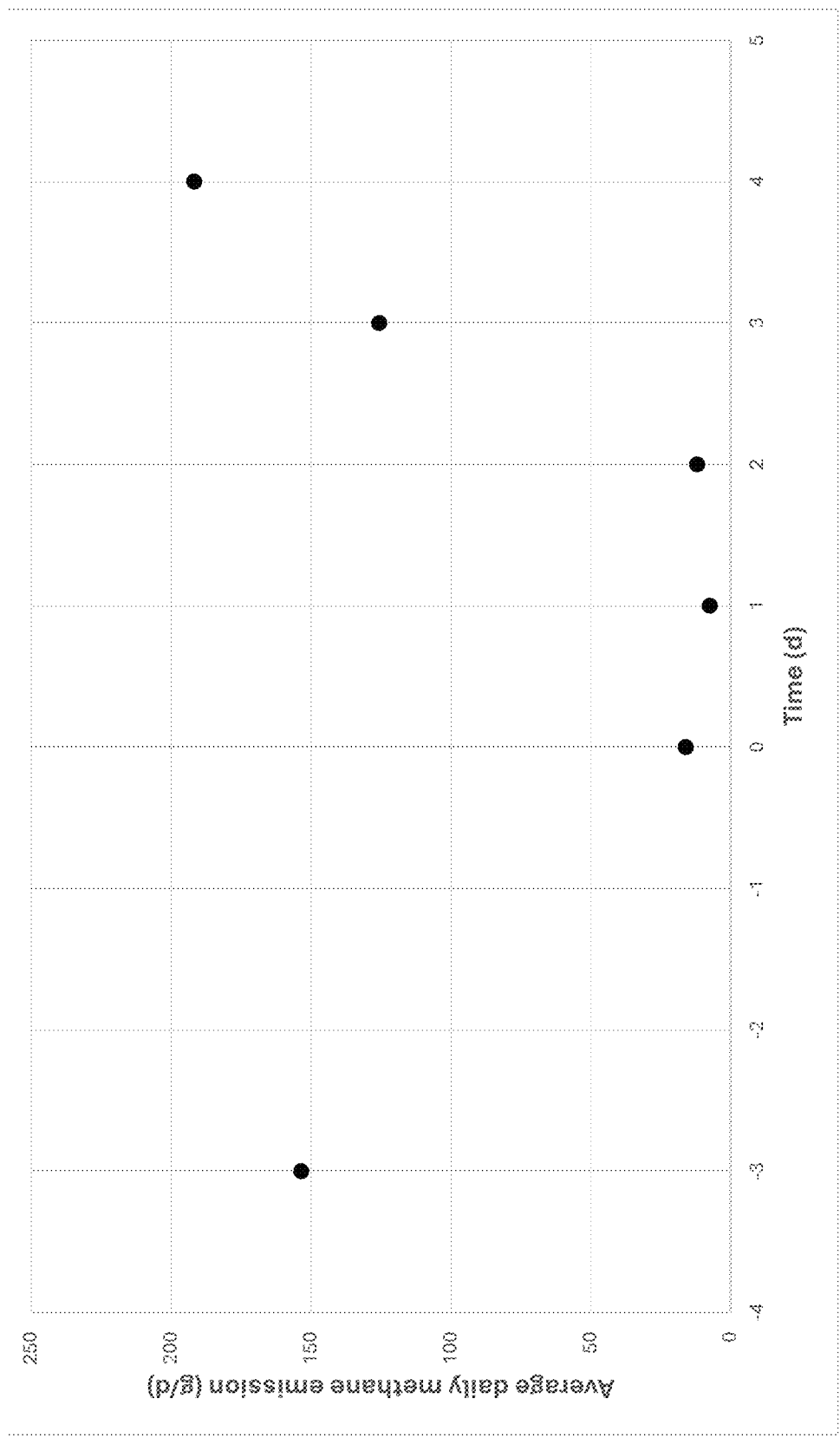
FIG. 7 is a graph showing methane emissions of a whole pen ruminant animal trial before and after administration (t=0) of an exemplary drug delivery device containing bromoform.

FIG. 7 shows the average daily methane emissions over the course of the study. Prior to administration of the bromoform-infused corn on d=0, average methane emissions were recorded at approximately 153 g/d/head. Relative to this data point, supplementation of bromoform-infused corn to cattle ration resulted in an immediate drop of methane emissions by about 90% on d=0. For 48 hours post-administration, methane emissions ranged from 7-16 g/d/head. Methane emissions increased on days 3 and 4, ranging from 125-192 g/d/head.

Together, these data indicate the utility of an exemplary bromoform-infused corn kernel composition to effect significant and sustained reductions in methane emissions at scale. Reductions in methane emissions at a magnitude of 90% or more were achieved for a period of 48 hours with only a single administration. Extrapolating the results, a dosing interval of 48 hours would be expected to provide continuous reductions in methane emissions over time.

Example 6: Methods of Infusing a Drug Delivery Device with a Gas-Phase Antimethanogenic Agent Applicant unexpectedly discovered that gaseous seaweed extract can be used directly to infuse a device, for example, a seed or a grain, without use of a liquid carrier. An exemplary vapor infusion method involves housing the device in a sealed container with the antimethanogenic agent, both of which are open to the headspace inside the container. The container is then heated, and the elevated internal temperature is maintained for a predetermined period of time, allowing the antimethanogenic agent to evaporate and penetrate the device.

A device mixture of hulled oats (groats) and whole corn kernels were subjected to an exemplary vapor infusion method. A total of 46 grams groats and 121 grams corn were placed in a glass bottle with 1.6 ml of seaweed extract containing bromoform. The bottle was sealed with a rubber stopper and incubated in a water bath at 80° C. for 4 days. The bottle was then cooled to 4° C. Once completely cooled, the device mixture was analyzed by GC/MS to determine bromoform content.

Table 5 presents the average bromoform levels detected from a sample of vapor-infused corn kernels (n=4). Each kernel was separated into three sections prior to analysis by GC/MS.

TABLE 5

Absorption of vapor containing bromoform into whole corn kernels (4-day infusion)

|  | Corn Kernel Section 1 | Corn Kernel Section 2 | Corn Kernel Section 3 |
| --- | --- | --- | --- |
| Average bromoform content (mg/g) | 17 | 20 | 2.6 |

Table 6 presents the average bromoform levels detected from a sample of vapor-infused hulled oats (n=4). Each groat was separated into three sections prior to analysis by GC/MS.

TABLE 6

| Absorption of gas-phase bromoform into hulled oats (4-day infusion) | | | |
|---|---|---|---|
| | Oat Tip Section 1 | Oat Middle Section | Oat Tip Section 2 |
| Average bromoform content (mg/g) | 9.2 | 8.4 | 10 |

The above samples of sectioned corn and oats were then placed in a weigh boat and exposed to air at room temperature for 23 hours. After this time period, the samples were tested again for bromoform content. The bromoform content measured after nearly 1 day of open-air exposure was comparable to originally detected levels in both kernels and oats (data not shown). Together, these results show that the exemplary devices are not only infusable, but they also stably retain the infused antimethanogenic agent. Given the volatility of certain antimethanogens and substantial loss to open-air exposure, the exemplary methods and compositions provide a significant advantage over known antimethanogenic substrates.

Without limitation to any particular theory, while the heating step causes the antimethanogenic agent to evaporate, allowing for deep penetration of the device, the cooling step may trap the infused agent inside the device. Such properties have advantageous implications for storage and transportation of easily evaporable substances, such as haloform antimethanogenic agents.

Example 7: A Drug Delivery Device Infused with a Gas-Phase Antimethanogenic Agent Effectively Reduces Methane Emissions from Cattle Hulled oats infused with antimethanogenic vapor were assessed for their efficacy in decreasing methanogenesis in cattle.

To prepare the device, hulled oats (708 grams) were infused with an antimethanogenic agent in accordance with the methods of Example 6. Briefly, the groats were added to an airtight container with 3.4 ml of seaweed extract, which contains bromoform. The container was sealed, and the device and seaweed extract were heated to 70° C. for 16.5 hours. After this time, the container was cooled to room temperature.

The antimethanogen-infused groats were supplemented to a whole pen containing 17 cattle by evenly top dressing the infused groats onto the animal feed. The ruminant animal's methane emissions were then monitored using the Green-Feed system for 35 hours after addition of the infused groat top dress. A pen containing 16 animals with the same age and genetics served as a control.

Figure 8:
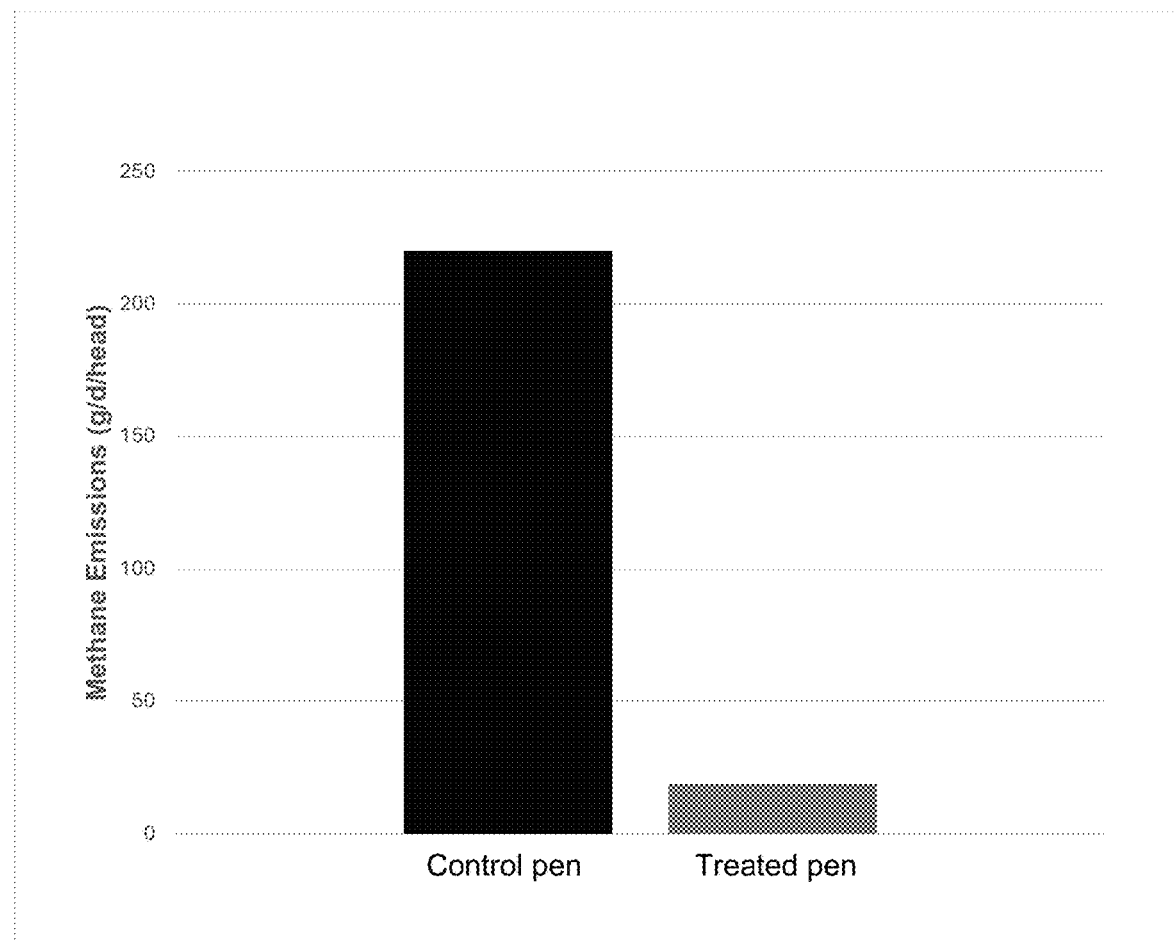
FIG. 8 is a bar chart depicting methane emissions (g/d// head) of a control pen of cattle and a treated pen of cattle supplemented with groats containing bromoform by vapor infusion.

FIG. 8 shows average methane emissions for control and treated groups within 35 hours of the single administration. Average methane emissions for the control group were about 220 g/d/head. In comparison, treatment with the gas phase infused groats reduced average methane emissions by approximately 91%, with detected levels of only about 19 g/d/head.

The results demonstrate that supplementation of an exemplary vapor-infused edible device significantly mitigates methanogenesis in ruminant animals, as determined by substantial and sustained reductions in detected methane emissions.

Example 8: Exemplary Methods of Infusing a Delivery Device with an Antimethanogenic Agent Soaking: A delivery device is infused with an antimethanogenic agent by directly soaking the device in a solution containing the antimethanogenic agent. The device can be a mixed device, such as a mixture of devices. The antimethanogenic agent can include a haloform, an organic halide, a propanol derivative, or a combination thereof. The solution of antimethanogenic agent can include a hydrophilic solvent, a hydrophobic solvent, or a mixture of both.

The container for soaking is composed of glass, stainless steel, or another material that is compatible with the solution and anti-methanogenic compounds. The container has a closeable lid that seals the device and solution containing antimethanogenic agent. The sealed container may have a volume of headspace once the lid is closed.

Soaking of the device in the solution of antimethanogenic agent can be conducted at room temperature or at least above the melting temperature of the solution components. Under such conditions, it may take at least 1 week for the device to fully absorb the solution. The absorption process may be accelerated by heating the mixture, boiling the mixture, or agitating the mixture. After soaking, the infused device is separated from the solution prior to packaging.

Vacuum-Soaking:

Devices can be infused with an antimethanogenic agent by soaking as described herein with the assistance of a vacuum. For vacuum-soaking, a volume of device is placed into the soaking container prior to addition of the solution containing antimethanogenic agent. Vacuum pressure is then applied, e.g., at a pressure of less than about 50 mbar. This level of pressure is maintained for a period of time to remove air from the device. After the desired amount of time has elapsed, a solution containing antimethanogenic agent solubilized in a hydrophilic or hydrophobic solution is added to the device, with the vacuum still applied. The liquid fills the container such that the device is submerged. Upon addition of the solution, the vacuum is then released to normal atmosphere pressure.

Vapor Infusion:

A device is infused with an antimethanogenic agent in the gaseous phase by exposing the device to the vapor in a chamber, such as an airtight container. In some examples, both the device and the antimethanogenic agent are heated in the chamber, such as to the boiling point of the antimethanogenic agent. In other examples, the antimethanogenic agent is heated to its boiling point separately from the device then introduced to the device. In the gaseous state, the antimethanogenic agent is capable of deeply penetrating the device.

After a predetermined period of exposure, the device is cooled, which can involve removing the container from heat and allowing the container to reach room temperature without intervention. In other examples, the container is removed from heat and subjected to rapid cooling, such as by submergence to an ice bath or by placement in a freezer or refrigerator. The cooled device is removed from the chamber and can be prepared for storage, such as packing, vacuum-sealing, and the like.

Infused Drug Delivery Device:

The device is an edible substance that is a substance that has the capacity, such as the physical and chemical properties, for infusion by a liquid or a vapor containing an antimethanogenic agent. Although edible, the device may also be regurgitated by an animal administered the device, such as a ruminant animal. Herein, reference to a device is understood to include reference to a mixed device, such as a mixture of distinct devices.

In some examples, the device has an interior portion that is substantially enclosed by an outer coating. The outer layer and interior portion can have distinct sections. For example, seeds, an exemplary device, have the following structural properties: a hard fibrous outer layer, such as a pericarp or seed coat, a starchy interior, such as a floury endosperm, and a structure that facilitates attachment and nutrient transfer, for example, the tip cap of a corn kernel or the hilum on a legume.

Non-limiting examples of devices, which can be used in any of the described soaking, vacuum-soaking, or gas infusion methods, include raw or processed agricultural products, grains, cereals, coffee beans, herbs, leaves, legumes, nuts, seeds, spices, fruits, vegetables, meats, dairy products, eggs, processed foods, animal feed, and any combinations thereof. The device has a porosity or permeability that allows for penetration of an antimethanogenic agent, either solubilized in a carrier or in the gas phase.

Example 9: Methods of Administration and Dosing Intervals

Disclosed compositions, such as compositions and devices of the preceding Examples, are administered to a ruminant animal at a dosing interval of 24 hours or more. The composition can be administered at a dosing interval ranging from 24-96 hours, such as every day (a dosing interval of approximately 24 hours), every two days (a dosing interval of approximately 48 hours), every three days (a dosing interval of approximately 72 hours), or every four days (a dosing interval of approximately 96 hours). In some examples, the composition is administered to the animals once a week or once every two weeks.

The composition may be administered to the animal in feed or in pasture without risking significant loss of the antimethanogenic agent to open air exposure. The antimethanogenic agent may include a haloform, an alkyl halide, a propanol derivative, or combinations thereof, as described herein. Emission measurements are determined by methods available to one of skill in the art.

Administering a disclosed composition to a ruminant animal results in a significant reduction in methane emissions for an extended period of time, as determined by comparing pre-administration levels to post-administration levels. For example, administration at such intervals reduces methane emissions by at least 3%, 5%, 10%, or 20%, including all ranges and subranges therebetween, for at least or about 24 hours after the initial administration, at least 15% for at least 48 hours after the initial administration, or at least 10% for at least 72 hours after the initial administration.

Example 10: Infusion of Bromoform Vapor from Seaweed Powder into Oats and Corn

Example 7 described a method for infusing a device of the current disclosure with antimethanogenic vapor, where the source of the antimethanogenic compound was seaweed extract. Given the time and cost associated with procuring seaweed extract, it was assessed whether antimethanogenic vapor could be infused into a device of the disclosure from a raw antimethanogen source, such as seaweed.

Figure 9:
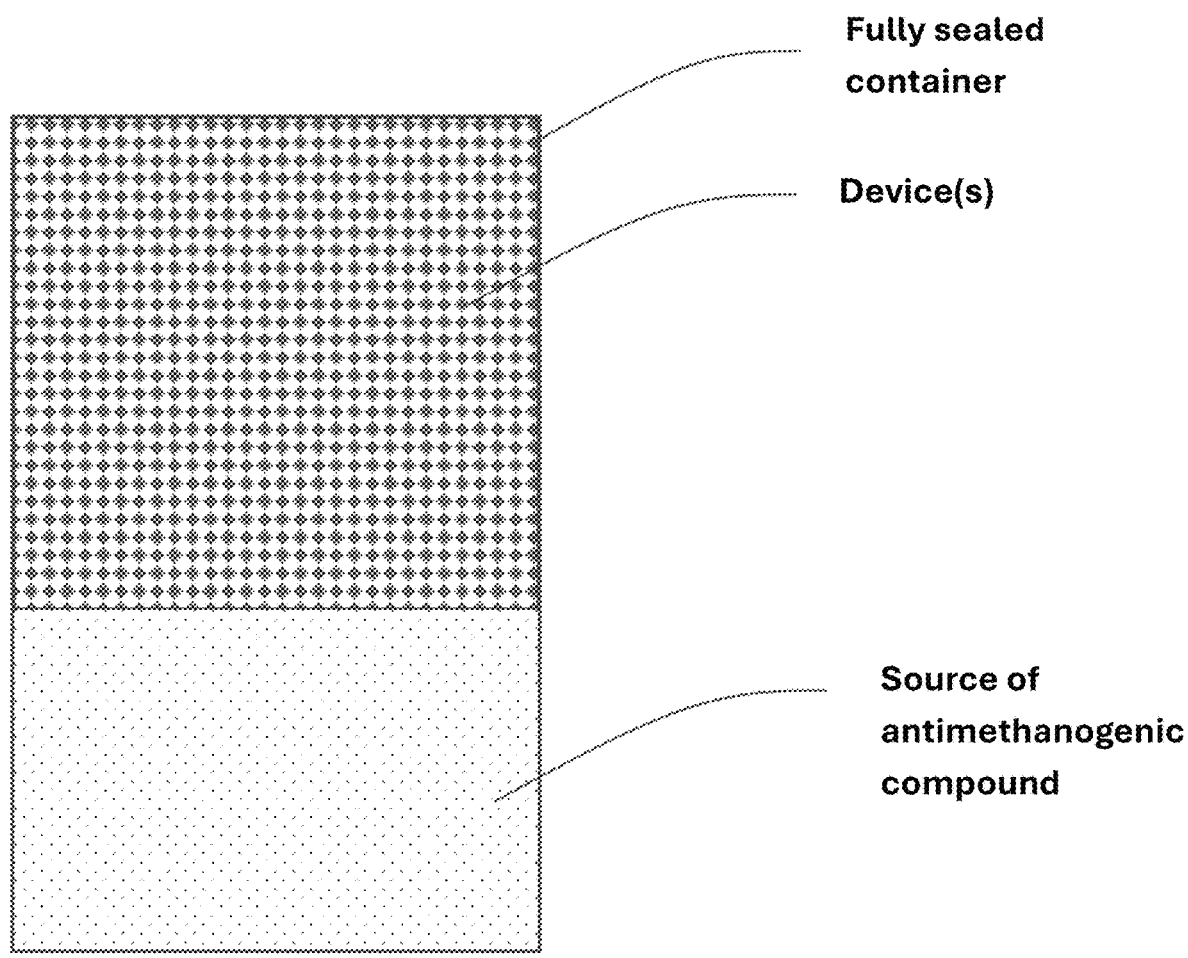
FIG. 9 is a schematic showing a sealed container containing a device for infusion and a source of antimethanogenic compound for an exemplary infusion method of the disclosure.

6 kg of freeze-dried seaweed powder, containing bromoform at a concentration ranging from about 8-10 mg/g, was placed at the bottom of a 10-gallon metal drum. A stainless-steel metal screen was fitted to the interior of the drum to separate the seaweed powder from the device for infusion. 6.9 kg dried whole corn was then placed on top of the screen. Another stainless-steel metal screen was added to the drum and arranged to separate the corn from a second device for infusion. 7.3 kg whole oats were added on top of this second screen, creating three separate layers of seaweed powder, corn, and oat from bottom to top. FIG. 9 shows a schematic of the sealed chamber containing both the source of the antimethanogenic compound for infusion (seaweed powder) and the substrate(s) for infusion (corn and oat).

The top opening of the drum was then fully sealed with a metal lid and further secured with a bolt ring. The sealed drum was placed in an empty 55-gallon metal drum, which was heated and maintained at a temperature of 88° C. After 6 days of heating, the 10 Gallon drum was cooled down to ambient temperature. Samples of seaweed powder, corn, and oat were taken in triplicate to measure bromoform concentration by GCMS. Experimental results are shown in Table 7.

TABLE 7

Detected concentration of bromoform following gas-phase infusion from seaweed powder

| Materials | Bromoform concentration (mg/g) |
| --- | --- |
| Seaweed powder | 0.99 |
| Corns | 2.90 |
| Oats | 2.53 |

The result show low bromoform content of the antimethanogenic substrate (dried seaweed powder) and relatively high levels of bromoform in corn and oat, exemplary drug delivery devices of the current disclosure. Without dedication to any particular theory, the application of heat facilitates evaporation of bromoform from seaweed and maintains the compound as vapor. Also, high temperature facilitates expansion of the device for infusion, such as grain or seed tissue, resulting in greater openings for the penetration of bromoform vapor. Once cooled, the expanded tissues retracts to its previous dimensions, effectively trapping the penetrated bromoform vapor. Mechanical and chemical disruption to structural components of the infused drug delivery device, such as ingestion and digestion by a ruminant animal, may then provide release of the infused antimethanogenic agent.

This method circumvents the multi-step process used to extract bromoform from seaweed. The result is a simpler, faster, and less costly production process for infused drug delivery devices of the current disclosure.

The foregoing examples of the related art and limitations related therewith are intended to be illustrative and not exclusive. Other limitations of the related art will become apparent to those of skill in the art upon a reading of the specification.

Incorporation by Reference

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

NUMBERED EMBODIMENTS OF THE DISCLOSURE

Notwithstanding the appended claims, the disclosure sets forth the following numbered embodiments:

1. An encapsulated antimethanogenic composition comprising:
   a) an antimethanogenic dispersion comprising an antimethanogenic compound and a solid carrier; and
   b) a container,
   wherein the antimethanogenic compound is completely enveloped within the carrier.
2. The composition of embodiment 1, wherein the composition is configured for administration to a ruminant animal on an intermittent dosing schedule.
3. The composition of embodiment 2, wherein the intermittent dosing schedule comprises administration of the composition to the ruminant animal at a dosing interval of 12 to 96 hours, 24 to 96 hours, 36 to 96 hours, 48 to 96 hours, 60 to 96 hours, 72 to 96 hours, 12 to 72 hours, 12 to 60 hours, 12 to 48 hours, 12 to 36 hours, or 12 to 24 hours.
4. The composition of embodiment 2 or 3, wherein the intermittent dosing schedule comprises administration of the composition to the ruminant animal at a dosing interval of a) 24 hours, b) 48 hours, c) 72 hours, or d) 96 hours.
5. The composition of any preceding embodiment, wherein an initial dose of the composition reduces the ruminant animal's methane emissions by at least 50%, at least 60%, at least 70%, at least 80%, or at least 90% relative to the ruminant animal's methane emissions up to 24 hours before the initial dose.
6. The composition of any preceding embodiment, wherein an initial dose of the composition maintains the ruminant animal's methane emissions below 150 g/d for up to 72 hours after the initial dose.
7. The composition of any preceding embodiment, wherein an initial dose of the composition maintains the ruminant animal's methane emissions below about 125 g/d, below about 50 g/d, below about 25 g/d, or below about 15 g/d for up to 48 hours after the initial dose.
8. The composition of any preceding embodiment, wherein an initial dose of the composition maintains the ruminant animal's methane emissions below about 100 g/d for up to 40 hours after the initial dose.
9. The composition of any preceding embodiment, wherein two sequential doses of the composition, separated by a 48-hour dosing interval, maintain the ruminant animal's methane emissions below about 50 g/d, below about 25 g/d, or below about 15 g/d for up to 120 hours.
10. The composition of any preceding embodiment, containing the antimethanogenic agent in a total amount of less than 5 wt %, 10 wt %, or 15 wt %.
11. The composition of any preceding embodiment, wherein the antimethanogenic agent comprises a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.
12. The composition of any preceding embodiment, wherein the antimethanogenic agent comprises a haloform selected from the group consisting of bromoform, chloroform, iodoform, and fluoroform.
13. The composition of any preceding embodiment, wherein the antimethanogenic agent is selected from 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichloromethane ($CHBrCl_2$), trichlorethylene ($C_2HCl_3$), bromoform ($CHBr_3$), chloroform ($CHCl_3$), iodoform ($CHI_3$), fluoroform ($CHF_3$), dibromomethane ($CH_2Br_2$), and combinations thereof.
14. The composition of any preceding embodiment, wherein the antimethanogenic agent comprises bromoform.
15. The composition of any preceding embodiment, wherein the amount of antimethanogenic agent in the antimethanogenic dispersion is 1-10 wt %, 0.5-15 wt %, 10-20 wt %, 15-25 wt %, 1-29 wt %, or 25-50 wt % relative to the total weight of the antimethanogenic dispersion.
16. The composition of any preceding embodiment, wherein the carrier has a melting point of at least 44° C.
17. The composition of any preceding embodiment, wherein the carrier has a melting point of 45° C. to 80° C.
18. The composition of any preceding embodiment, wherein the carrier is selected from the group consisting of: mineral oil, soy oil, palm oil, cocoa butter, vegetable oil, hydrogenated vegetable oil, wax, clay, beeswax, canola oil, paraffin wax, and combinations thereof.
19. The composition of any preceding embodiment, wherein the carrier comprises at least 10% vegetable oil and/or at least 10% hydrogenated vegetable oil by volume.
20. The composition of any preceding embodiment, wherein the carrier comprises 10-90% (v/v), 50-95% (v/v), 25-75% (v/v), or 5-55% (v/v) hydrogenated vegetable oil.
21. The composition of any preceding embodiment, wherein the carrier comprises at least 70% (v/v) wax.
22. The composition of any preceding embodiment, wherein the carrier comprises 70-95% (v/v) wax.
23. The composition of any preceding embodiment, wherein the carrier does not comprise wax.
24. The composition of any preceding embodiment, wherein the container completely envelops the antimethanogenic dispersion and comprises no openings.
25. The composition of any preceding embodiment, wherein the container comprises an opening and a cap configured to close the opening.

26. The composition of any preceding embodiment, wherein the container comprises a capsule and/or a coating.
27. The composition of any preceding embodiment, wherein the container comprises a capsule.
28. The composition of any preceding embodiment, wherein the container comprises a dissolvable coating.
29. The composition of embodiment 28, wherein the dissolvable coating comprises a biodegradable polymer.
30. The composition of embodiment 28 or 29, wherein the dissolvable coating comprises gelatin, alginate, polyvinylpyrrolidone (PVP), or combinations thereof.
31. The composition of any of embodiments 28-30, wherein the dissolvable coating comprises a flavoring agent.
32. The composition of any preceding embodiment, wherein the container contains 100 mg to 2000 mg, 500 mg to 1500 mg, or 750 mg to 1250 mg of the antimethanogenic dispersion.
33. The composition of any of embodiments 2-32, wherein the ruminant animal is a cow, sheep, goat, buffalo, bison deer, elk, or moose.
34. The composition of any of embodiments 2-33, wherein the ruminant animal is a breed of cattle selected from Angus, Ayrshire, Beefmaster, Belgium Blue, Belted Galloway, Brahman, or Zebu, Brangus, British White, Brown Swiss, Charolais, Chianina, Devon, Dexter, English Longhorn, Galloway, Gloucester, Guernsey, Hereford, or Whiteface, Highland, Holstein-Friesian, Irish Moiled, Jersey, Kerry, Limousin, Luing, Milking Devon, Milking Shorthorn, Normande, Polled Hereford, Red Angus, Red Poll, Santa Gertrudis, Shorthorn, or Durham, South Devon, Simmental, Sussex, Welsh Black, and White Park.
35. A long-acting drug delivery device comprising: a) a seed comprising an outer fibrous component, an inner starchy component, and a nutrient transfer component; and b) a drug; wherein the drug is contained within the interior of the seed.
35.1 An infused drug delivery device comprising: a) a grain or seed, said grain or seed comprising an outer fibrous component, and an inner component; and b) a drug; wherein the infused drug is contained within the inner component.
36. The device of embodiment 35, wherein the seed comprises a seed coat, an embryo, an endosperm, a vascular opening, or a combination thereof.
36.1 The device of embodiment 35.1, wherein the outer fibrous component comprises a seed coat or hull.
37. The device of embodiment 35 or 36, wherein the drug is solubilized in a carrier.
38. The device of any of embodiments 35-37, wherein the drug comprises an antimethanogenic agent, an antimicrobial agent, an antibiotic, an anthelmintic, an antiprotozoal, an anti-inflammatory agent, a hormone, a rumen modifier, a vitamin or mineral, a diuretic, an analgesic, an anticholinergic, an anesthetic, a sedative, or a combination thereof.
39. The device of any of embodiments 35-38, wherein the drug comprises an antimethanogenic agent.
40. The device of any of embodiments 35-39, wherein the device is capable of delivering the drug for at least about 4, 8, 12, 16, 20, 24, 28, 32, 36, 40, 44, or 48 hours, when administered to a ruminant animal.
41. The device of any of embodiments 35-40, wherein the seed or grain is a cereal grain, a pseudocereal, a legume, a nut or an oilseed.
42. The device of any of embodiments 35-41, wherein the seed or grain is selected from the group consisting of: pea, oat, quinoa, chia seed, bulgur, millet, couscous, rice, spelt, teff, buckwheat, rye, sorghum, amaranth, corn kernel, einkorn, farro, fonio, soybean wheat (soybean), barley, lentil, flaxseed, rapeseed, sesame seed, kamut, freekeh, wild rice, triticale, emmer, kaniwa (canihua), Job's tears (adlay), pearl millet, finger millet, proso millet, foxtail millet, hemp seed, pumpkin seed, sunflower seed, poppy seed, safflower seed, niger seed, perilla seed, lupin, bambara groundnut, winged bean, pigeon pea (cowpea or black-eyed pea), grass pea, moth bean, adzuki bean, mung bean, urad bean, horse gram, rice bean, tepary bean, tarwi, yam bean, velvet bean, jack bean, sword bean, hyacinth bean, lima bean (broad bean), chickpea (garbanzo bean), green pea, yellow pea, field pea, navy bean, pinto bean, kidney bean, black bean, white bean, cranberry bean, fava bean (broad bean), cannellini bean, great northern bean, red bean (azuki), borlotti bean, flageolet bean, anasazi bean, appaloosa bean, European soldier bean, Jacob's cattle bean, marrow bean, scarlet runner bean, yellow eye bean, black turtle bean, mayocoba bean, pink bean, small red bean, tongues of fire bean, trout bean, wax bean, orca bean, and tiger's eye bean.
42.1 The device of any of embodiments 35-42, wherein the seed or grain is oat.
42.2 The device of any of embodiments 35-42, wherein the seed or grain is corn.
42.3 The device of any of embodiments 35-41, wherein the seed or grain is nut.
42.4 The device of embodiment 42.3, wherein the nut is selected from the group consisting of Almonds, Brazil Nuts, Cashews, Chestnuts, Hazelnuts, Macadamia Nuts, Peanuts (technically a legume, but commonly considered a nut), Pecans, Pine Nuts, Pistachios, Walnuts, Acorns, Andean Walnuts, Argan Nuts, Baru Nuts, Beech Nuts, Betel Nuts, Black Walnuts, Breadnuts, Bunya Nuts, Butternuts, Canarium Nuts, Candle Nuts, Caramel Almonds, Chilean Hazelnuts, Chinese Chestnuts, Dika Nuts, English Walnuts, Filberts (another name for hazelnuts), Ginkgo Nuts, Hickory Nuts, Jack Nuts, Kola Nuts, Kurrajong Nuts, Lotus Nuts, Malabar Chestnuts, Marcona Almonds, Mongongo Nuts, Monkey Puzzle Nuts, Oysternuts, Palm Nuts, Paradise Nuts, Pili Nuts, Red Bopple Nuts, Saba Nuts, Tiger Nuts, Valencia Peanuts, Virginia Peanuts, and Water Caltrops.
43. The device of any of embodiments 35-42.1, wherein the antimethanogenic agent comprises a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.
44. The device of any of embodiments 35-43, wherein the antimethanogenic agent is selected from 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichlormethane ($CHBrCl_2$), trichlorethylene ($C_2HCl_3$), bromoform (CHBr$_3$), chloroform (CHCl$_3$), iodoform (CHI$_3$), fluoroform (CHF$_3$), dibromomethane (CH$_2$Br$_2$), and combinations thereof.
45. The device of any of embodiments 35-44, wherein the antimethanogenic compound comprises a haloform selected from the group consisting of bromoform, chloroform, iodoform, and fluoroform.
46. The device of any of embodiments 35-45, wherein the drug is solubilized in a carrier.
46.1 The device of any of embodiments 35-46, wherein the carrier comprises a hydrophilic solvent, a hydrophobic solvent, or a combination thereof.
47. The device of any of embodiments 35-46.1, wherein the carrier comprises a glycol.
48. The device of embodiment 47, wherein the glycol is selected from propylene glycol, diethylene glycol, dipropylene glycol, triethylene glycol, and combinations thereof.
49. The device of any of embodiments 35-48, wherein the carrier comprises a lipid, an oil, a vegetable oil, a hydrogenated vegetable oil, a fatty acid, or a combination thereof.
50. The device of any of embodiments 35-49, wherein the carrier comprises DMSO, propylene glycol, PEG, cyclodextrin, triacetin, N-methyl-2-pyrrolidone (NMP), glycerin, benzyl alcohol, or a combination thereof.
51. An agricultural feed composition, comprising the antimethanogenic composition, the encapsulated antimethanogenic composition, or the device of any of the preceding embodiments, wherein the agricultural feed composition is suitable for administration to a ruminant animal.
52. The agricultural feed composition of embodiment 51, comprising forage, fodder, a grain, a protein, fiber, fat, a non-protein nitrogen source, a rumen buffer, a liquid feed, a total mixed ration, derivatives thereof, or a combination thereof.
53. The agricultural feed composition of embodiment 51 or 52, wherein the ruminant animal is a cow, sheep, goat, buffalo, bison, deer, elk, or moose.
54. The agricultural feed composition of embodiment 51-53, the ruminant animal is a breed of cattle selected from Angus, Ayrshire, Beefmaster, Belgium Blue, Belted Galloway, Brahman, or Zebu, Brangus, British White, Brown Swiss, Charolais, Chianina, Devon, Dexter, English Longhorn, Galloway, Gloucester, Guernsey, Hereford, or Whiteface, Highland, Holstein-Friesian, Irish Moiled, Jersey, Kerry, Limousin, Luing, Milking Devon, Milking Shorthorn, Normande, Polled Hereford, Red Angus, Red Poll, Santa Gertrudis, Shorthorn, or Durham, South Devon, Simmental, Sussex, Welsh Black, and White Park.
55. A method of manufacturing the antimethanogenic composition of any of embodiments 1-34, comprising blending the antimethanogenic agent into the carrier, thereby producing an antimethanogenic dispersion and encapsulating the antimethanogenic dispersion into a container, thereby manufacturing the antimethanogenic composition.
56. The method of embodiment 55, wherein the temperature of the carrier during the blending step is above the carrier's melting point.
57. The method of embodiment 55 or 56, wherein the carrier's melting point is at least 42° C. 58. A method for producing the long-acting drug delivery device of any of embodiments 35-50, said method comprising the steps of: a) providing: i) a plant seed comprising a seed coat, an embryo, and endosperm and a vascular opening; and ii) an antimethanogenic compound; b) infusing the antimethanogenic compound into the plant seed, thereby transferring the antimethanogenic compound into the seed's embryo and/or endosperm, and creating a long-acting drug delivery device.
59. The method of embodiment 58, wherein step (b) comprises absorbing antimethanogenic compound via the vascular opening.
60. The method of embodiment 58 or 59, wherein step (b) comprises soaking the plant seed in the anti-methanogenic compound for a period of time sufficient for the antimethanogenic compound to be absorbed into the endosperm and/or embryo.
61. The method of any of embodiments 58-60, wherein the soaking is conducted above the melting point of a carrier in which the antimethanogenic compound is solubilized.
62. The method of any of embodiments 58-61, wherein the soaking is conducted in a vacuum.
62.1 The method of any of embodiments 58-62, wherein step (b) comprises contacting the plant seed with antimethanogenic compound vapor for a period of time sufficient for the antimethanogenic compound to be absorbed into the endosperm and/or embryo.
62.2 A method for producing an infused animal feed, said method comprising the steps of:
a) providing: i) a seed or grain comprising a seed coat or hull, an embryo and/or endosperm, and a vascular opening; and ii) an antimethanogenic compound; and
b) soaking the seed or grain in the antimethanogenic compound, thereby infusing the antimethanogenic compound into the seed's embryo and/or endosperm and producing the infused animal feed.
62.3 The method of embodiment 62.2, wherein the soaking is conducted above the melting point of a carrier in which the antimethanogenic compound is solubilized.
62.4 The method of embodiment 62.2 or 62.3, wherein the soaking is conducted in a vacuum.
62.5 A method for producing an infused animal feed, said method comprising the steps of:
a) providing: i) a seed or grain comprising a seed coat or hull, an embryo and/or endosperm, and a vascular opening; and ii) an antimethanogenic compound;
b) vaporizing the antimethanogenic compound, thereby producing an antimethanogenic compound vapor;
c) contacting the seed or grain with the antimethanogenic compound vapor, thereby infusing the antimethanogenic compound into the seed or grain and producing the infused animal feed.
62.6 The method of embodiment 62.5, wherein step b) comprises heating the antimethanogenic compound at a temperature of at least about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., or about 170° C., including all ranges and subranges therebetween.
62.7 The method of embodiment 62.5 or 62.6, wherein step b) comprises heating the seed or grain to a temperature of about 60° C., about 65° C., about 70° C., about 75° C., about 80° C., about 85° C., about 90° C., about 95° C., about 100° C., about 105° C., about 110°

C., about 115° C., about 120° C., about 125° C., about 130° C., about 135° C., about 140° C., about 145° C., about 150° C., about 155° C., about 160° C., about 165° C., or about 170° C., including all ranges and subranges therebetween.

62.8 The method of any one of embodiments 62.5-62.7, wherein step b) comprises maintaining the temperature for at least about 12 hours, at least about 24 hours, at least about 36 hours, at least about 48 hours, at least about 60 hours, at least about 72 hours, at least about 84 hours, at least about 96 hours, at least about 108 hours, at least about 120 hours.

62.9 The method of any one of embodiments 62.2-62.8, wherein the antimethanogenic compound is synthetic.

62.10 The method of any one of embodiments 62.2-62.8, wherein the antimethanogenic compound is comprised within algae.

62.11 The method of embodiment 62.10, wherein the algae comprises red algae selected from Rhodophyta or Bonnemaisoniales.

62.12 The method of embodiment 62.10 or 62.11, wherein the algae comprises red algae of the genus Asparagopsis.

62.13. The method of any one of embodiments 62.10-62.12, wherein the algae comprises *A. armata, A. taxiformis, A. svedelli, A. delilei, A. hamifera,* or *A. sanfordiana.*

62.14. The method of any one of embodiments 62.10-62.13, wherein the algae comprises a species of *Bonnemaisonia, Delisea, Ptilonia, Leptophyllis,* or *Pleuroblepharidella*

62.15. The method of any one of embodiments 62.10-62.14, wherein the algae comprises *Laminaria saccharina, Laminaria digitata, Fucus vesiculosis, Fuscus distichus, Alaria esculenta, Chorda filum, Ceramium rubrum, Corallina pilulifera, Pelvetia canaliculate, Ascophyllum nodusum, Chondrus crispus, Plocamium hamatum, Gigartina stellata, Enteromorpha linza, Ulva lacta, Bonnemaisonia hamifera, Asparagopsis taxiformis, Asparagopsis armata, Gracilaria spp., Antithamnionella sarniensis, Antithamnion plumula,* or *Macrocystis pyrifera.*

62.16 The method of any one of embodiments 62.2-62.15, wherein the antimethanogenic compound is comprised within an algae extract.

62.17 The method of any one of embodiments 62.2-62.16, wherein the antimethanogenic compound is comprised within seaweed.

62.18 The method of any one of embodiments 62.2-62.17, wherein the antimethanogenic compound is comprised within a seaweed extract.

62.19 The method of any one of embodiments 62.5-62.18, wherein the seed or grain and the antimethanogenic compound vapor are contained within a chamber.

62.20 The method of embodiment 62.19, wherein the chamber is sealed.

62.21 The method of embodiment 62.20, wherein the chamber has an air-tight seal.

62.22 The method of any of embodiments 62.19-62.21, wherein the chamber is maintained at a temperature of about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., or about 170° C. for at least about 12 hours, at least about 24 hours, at least about 36 hours, at least about 48 hours, at least about 60 hours, at least about 72 hours, at least about 84 hours, at least about 96 hours, at least about 108 hours, at least about 120 hours, 62.23 The method of any of embodiments 62.19-62.21, wherein the chamber is maintained at a temperature of about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., or about 170° C. for about 12 hours, about 24 hours, about 36 hours, about 48 hours, about 60 hours, about 72 hours, about 84 hours, about 96 hours, about 108 hours, or about 120 hours.

62.24 The method of any one of embodiments 62.5, comprising cooling the seed or grain to ambient temperature.

63. The method of any of embodiments 58-62.24, wherein the resulting long-acting drug delivery device is capable of delivering antimethanogenic compound for at least 4, 8, 12, 16, 20, 24, 28, 32, 36, 40, 44, or 48 hours, when administered to a ruminant animal.

64. An antimethanogenic composition, the antimethanogenic composition configured to deliver 50 to 150 mg/kg DMI of an antimethanogenic agent to a ruminant animal, wherein a single administration of the antimethanogenic composition to the ruminant animal reduces the ruminant animal's methane emissions by at least 90% for up to 72 hours after the single administration.

65. The antimethanogenic composition of embodiment 64, is configured to deliver about 50 mg/kg DMI of the antimethanogenic agent to the ruminant animal.

66. The antimethanogenic composition of embodiment 64 or 65, wherein the ruminant animal's methane emissions are maintained below about 125 g/d, below about 50 g/d, below about 25 g/d, or below about 15 g/d for up to 48 hours after the single administration.

67. The antimethanogenic composition of any of embodiments 64-66, wherein the ruminant animal's methane emissions are maintained below 100 g/d for up to 40 hours after the single administration.

68. The antimethanogenic composition of any of embodiments 64-67, wherein two doses of the antimethanogenic composition to the ruminant animal within a 48-hour period maintain the ruminant animal's methane emissions below about 50 g/d, below about 25 g/d, or below about 15 g/d for up to 120 hours.

69. The antimethanogenic composition of any of embodiments 64-68, wherein the antimethanogenic composition comprises the antimethanogenic agent in a total amount of less than about 5 wt %, 10 wt %, 15 wt %, or 20 wt %.

70. The antimethanogenic composition of any of embodiments 64-69, wherein the antimethanogenic agent comprises a volatile halogenated organic compound (VHOC), a halocarbon, a haloform, an organic halide, a nitroxy propanol derivative, a nitroalkane derivative, an inorganic ion, sulfur, an organic acid, an inhibitor of enzyme, seaweed, a seaweed extract, an ionophore, or a combination thereof.

71. The antimethanogenic composition of embodiment 70, wherein the enzyme is methyl-coenzyme M reductase.

72. The antimethanogenic composition of any of embodiments 64-71, wherein the antimethanogenic agent is selected from 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichloromethane ($CHBrCl_2$), trichlorethylene ($C_3HCl_3$), bromoform ($CHBr_3$), chloroform ($CHCl_3$), iodoform ($CHI_3$), fluoroform ($CHF_3$), dibromomethane ($CH_3Br_3$), and combinations thereof.

73. The antimethanogenic composition of any of embodiments 64-72, wherein the antimethanogenic agent comprises a haloform selected from the group consisting of bromoform, chloroform, iodoform, and fluoroform.

74. The antimethanogenic composition of any of embodiments 64-73, wherein the antimethanogenic agent comprises bromoform.

75. The antimethanogenic composition of any of embodiments 64-74, wherein the antimethanogenic composition comprises a cyclodextrin, a polymer, a copolymer, a block copolymer, a stereolithography (SLA) resin, an oil, a vegetable oil, a hydrogenated vegetable oil, a lipid, a wax, a fatty acid, or a fatty alcohol.

76. The antimethanogenic composition of any of embodiments 64-75, wherein the antimethanogenic composition comprises zinc, zinc oxide, steel, colloidal silicon dioxide, activated carbon, charcoal, bentonite, zeolite, kaolin, polyethylene glycol (PEG), polylactic acid (PLA), polybutylene succinate (PBS), polybutylene succinate adipate (PBSA), polybutylene adipate terephthalate (PBAT), polypropylene, a beeswax, paraffin, castor wax, carnauba wax, candelilla wax, jojoba wax, and lanolin.

77. The antimethanogenic composition of any of embodiments 64-76, wherein the antimethanogenic composition further comprises an antimicrobial agent, an antibiotic, an anthelmintic, an antiprotozoal, an anti-inflammatory agent, a hormone, a rumen modifier, a vitamin or mineral, a diuretic, an analgesic, an anticholinergic, an anesthetic, a sedative, or a combination thereof.

78. An infused drug delivery device comprising a grain or seed, said grain or seed comprising an outer fibrous component, and an inner component; and an infused drug; wherein the infused drug is contained within the inner component wherein the infused drug comprises an antimethanogenic agent.

79. The device of embodiment 78, wherein the outer fibrous component comprises a seed coat or hull.

80. The device of embodiment 78 or 79, wherein the drug is exogenous to (or not produced within) the grain or seed.

81. The device of any one of embodiments 78-80, wherein the grain or seed comprises a seed coat or hull, an embryo, an endosperm, a vascular opening, or a combination thereof.

82. The device of any one of embodiments 78-81, wherein the seed or grain is a cereal grain, a pseudocereal, a legume, a nut, or an oilseed.

83. The device of embodiment embodiment 82, wherein the pseudocereal, the legume, the nut, or the oilseed is selected from the group consisting of: pea, oat, quinoa, chia seed, bulgur, millet, couscous, rice, spelt, teff, buckwheat, rye, sorghum, amaranth, corn kernel, einkorn, farro, fonio, soybean wheat (soybean), barley, lentil, flaxseed, rapeseed, sesame seed, kamut, freekeh, wild rice, triticale, emmer, kaniwa (canihua), Job's tears (adlay), pearl millet, finger millet, proso millet, foxtail millet, hemp seed, pumpkin seed, sunflower seed, poppy seed, safflower seed, niger seed, perilla seed, lupin, bambara groundnut, winged bean, pigeon pea (cowpea or black-eyed pea), grass pea, moth bean, adzukis bean, mung bean, urad bean, horse gram, rice bean, tepary bean, tarwi, yam bean, velvet bean, jack bean, sword bean, hyacinth bean, lima bean (broad bean), chickpea (garbanzo bean), green pea, yellow pea, field pea, navy bean, pinto bean, kidney bean, black bean, white bean, cranberry bean, fava bean (broad bean), cannellini bean, great northern bean, red bean (azuki), borlotti bean, flageolet bean, anasazi bean, appaloosa bean, European soldier bean, Jacob's cattle bean, marrow bean, scarlet runner bean, yellow eye bean, black turtle bean, mayocoba bean, pink bean, small red bean, tongues of fire bean, trout bean, wax bean, orca bean, and tiger's eye bean.

84. The device of any one of embodiments 78-83, wherein the seed or grain is oat.

85. The device of any one of embodiments 78-83, wherein the seed or grain is corn.

86. The device of any one of embodiments 78-82, wherein the seed or grain is a nut.

87. The device of embodiment 86, wherein the nut is selected from the group consisting of almonds, Brazil nuts, cashews, chestnuts, hazelnuts, macadamia nuts, peanuts, pecans, pine nuts, pistachios, walnuts, acorns, Andean walnuts, argan nuts, baru nuts, beech nuts, betel nuts, black walnuts, breadnuts, bunya nuts, butternuts, canarium nuts, candle nuts, caramel almonds, Chilean hazelnuts, Chinese chestnuts, dika nuts, English walnuts, hazelnuts/filberts, ginkgo nuts, hickory nuts, jack nuts, kola nuts, kurrajong nuts, lotus nuts, malabar chestnuts, marcona almonds, mongongo nuts, monkey puzzle nuts, oysternuts, palm nuts, paradise nuts, pili nuts, red bopple nuts, saba nuts, tiger nuts, Valencia peanuts, Virginia peanuts, and water caltrops.

88. The device of any one of embodiments 78-87, wherein the grain or seed is not genetically modified.

89. The device of any one of embodiments 78-88, wherein the grain or seed does not comprise a recombinant haloperoxidase.

90. The device of any one of embodiments 78-87, wherein the grain or seed is genetically modified.

91. The device of embodiment any one of embodiments 78-90, wherein the antimethanogenic agent is selected from the group consisting of an enzymatic inhibitor, a microflora modifying inhibitor, or a hydrogen receptor.

92. The device of embodiment 91, wherein the enzymatic inhibitor is selected from the group consisting of a halogenated methane analog, 3-nitrooxypropanol (3-NOP), a volatile halogenated organic compound (VHOC), an algae or extract thereof, and combinations thereof.

93. The device of embodiment 92, wherein the volatile halogenated organic compound (VHOC) is selected from the group consisting of bromochloromethane, chloromethane ($CH_3Cl$), iodomethane ($CH_3I$), fluoromethane ($CH_3F$), bromodichlormethane ($CHBrCl_2$), trichlorethylene ($C_2HCl_3$), bromoform ($CHBr_3$), chloroform ($CHCl_3$), iodoform ($CHI_3$), fluoroform ($CHF_3$), dibromomethane ($CH_2Br_2$), and mixtures thereof.

94. The device of embodiment 91, wherein the microflora modifying inhibitor is selected from the group consisting of monensin, nitroimidazoles, saponins, tannins, and mixtures thereof.

95. The device of embodiment 91, wherein the hydrogen receptor is selected from the group consisting of phenol, catechol, resorcinol, hydroquinone, pyrogallol, phloroglucinol, gallic acid, formic acid, sulfur, sulfate, sodium sulfate, nitrate, potassium nitrate, calcium ammonium nitrate, sodium nitrate, calcium nitrate, fumarate, fumaric acid, sodium fumarate, sodium acrylate, and mixtures thereof.

96. The device of any one of embodiments 78-95, wherein the antimethanogenic agent is selected from the group consisting of 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichlormethane ($CHBrCl_2$), trichlorethylene ($C_2HCl_3$), bromoform ($CHBr_3$), chloroform ($CHCl_3$), iodoform ($CHI_3$), fluoroform ($CHF_3$), dibromomethane ($CH_2Br_2$), and combinations thereof.

97. The device of any one of embodiments 78-96, wherein the antimethanogenic agent is selected from the group consisting of bromoform, chloroform, iodoform, and fluoroform.

98. The device of any one of embodiments 78-97, wherein the antimethanogenic agent is solubilized in a carrier.

99. The device of embodiment 98, wherein the carrier comprises a hydrophilic solvent, a hydrophobic solvent, or a combination thereof.

100. The device of embodiment 98 or 99, wherein the carrier comprises a lipid, an oil, a vegetable oil, a fatty acid, or a combination thereof.

101. The device of any one of embodiments 98-100, wherein the carrier comprises a glycol.

102. The device of embodiment 101, wherein the glycol is selected from the group consisting of propylene glycol, diethylene glycol, dipropylene glycol, triethylene glycol, and combinations thereof.

103. The device of any one of embodiments 78-102, wherein the device comprises at least about 5 mg, at least about 6, at least about 7 mg, at least about 8 mg, at least about 9 mg, at least about 10 mg, at least about 15 mg, at least about 20 mg, at least about 25 mg, at least about 30 mg, at least about 35 mg, at least about 40 mg, at least about 45 mg, at least about 50 mg, at least about 55 mg, at least about 60 mg, or at least about 65 mg of the antimethanogenic agent per gram of the grain or seed.

104. The device of any one of embodiments 78-103, wherein the device comprises about 1 mg to about 25 mg, about 1 mg to about 50 mg, about 1 mg to about 100 mg, about 1 mg to about 200 mg, about 15 mg to about 50 mg, or about 25 mg to about 50 mg of the antimethanogenic agent per gram of the grain or seed.

105. A method for producing an infused animal feed, said method comprising the steps of:
a) providing: i) a seed or grain of any of the preceding embodiments; and ii) an antimethanogenic compound; and
b) soaking the seed or grain in the antimethanogenic compound, thereby infusing the antimethanogenic compound into the seed's embryo and/or endosperm and producing the infused animal feed.

106. A method for producing an infused animal feed, said method comprising the steps of:
a) providing: i) a seed or grain of any of the preceding embodiments; and ii) an antimethanogenic compound;
b) vaporizing the antimethanogenic compound, thereby producing an antimethanogenic compound vapor;
c) contacting the seed or grain with the antimethanogenic compound vapor, thereby infusing the antimethanogenic compound into the seed or grain and producing the infused animal feed.

What is claimed is:

1. An infused seed or grain, said seed or grain comprising an outer fibrous component, and an inner component;
   wherein the inner component is infused with an exogenous antimethanogenic agent, not produced within the seed or grain;
   wherein the exogenous antimethanogenic agent is selected from the group consisting of 3-nitrooxypropanol (3-NOP), bromochloromethane, 2-bromoethanesulfonate, chloromethane ($CH_3Cl$), iodomethane ($CH_3I$), fluoromethane ($CH_3F$), bromodichlormethane ($CHBrCl_2$), trichlorethylene ($C_2HCl_3$), bromoform ($CHBr_3$), chloroform ($CHCl_3$), iodoform ($CHI_3$), fluoroform ($CHF_3$), dibromomethane ($CH_2Br_2$), and combinations thereof; and
   wherein the seed or grain comprises at least 5 mg of the exogenous antimethanogenic agent in the inner component of the seed or grain, per gram of the seed or grain.

2. The seed or grain of claim 1, wherein the outer fibrous component comprises a seed coat or hull.

3. The seed or grain of claim 1, wherein the seed or grain is a cereal grain, a pseudocereal, a legume, a nut, or an oilseed.

4. The seed or grain of claim 3, wherein the pseudocereal, the legume, the nut, or the oilseed is selected from the group consisting of: pea, oat, *quinoa*, chia seed, bulgur, millet, couscous, rice, spelt, teff, buckwheat, rye, sorghum, amaranth, corn kernel, einkorn, farro, fonio, soybean, barley, lentil, flaxseed, rapeseed, sesame seed, kamut, freekeh, wild rice, triticale, emmer, kaniwa (canihua), Job's tears (adlay), pearl millet, finger millet, proso millet, foxtail millet, hemp seed, pumpkin seed, sunflower seed, poppy seed, safflower seed, niger seed, perilla seed, lupin, bambara groundnut, winged bean, pigeon pea (cowpea or black-eyed pea), grass pea, moth bean, adzuki bean, mung bean, urad bean, horse gram, rice bean, tepary bean, tarwi, yam bean, velvet bean, jack bean, sword bean, hyacinth bean, lima bean (broad bean), chickpea (garbanzo bean), green pea, yellow pea, field pea, navy bean, pinto bean, kidney bean, black bean, white bean, cranberry bean, fava bean (broad bean), cannellini bean, great northern bean, red bean (azuki), borlotti bean, flageolet bean, anasazi bean, appaloosa bean, European soldier bean, Jacob's cattle bean, marrow bean, scarlet runner bean, yellow eye bean, black turtle bean, mayocoba bean, pink bean, small red bean, tongues of fire bean, trout bean, wax bean, orca bean, and tiger's eye bean.

5. The seed or grain of claim 3, wherein the seed or grain is oat.

6. The seed or grain of claim 3, wherein the seed or grain is corn.

7. The seed or grain of claim 3, wherein the seed or grain is a nut.

8. The seed or grain of claim 7, wherein the nut is selected from the group consisting of almonds, Brazil nuts, cashews, chestnuts, hazelnuts, macadamia nuts, peanuts, pecans, pine nuts, pistachios, walnuts, acorns, Andean walnuts, argan nuts, baru nuts, beech nuts, betel nuts, black walnuts, breadnuts, bunya nuts, butternuts, canarium nuts, candle nuts, caramel almonds, Chilean hazelnuts, Chinese chestnuts, dika nuts, English walnuts, hazelnuts/filberts, ginkgo nuts, hickory nuts, jack nuts, kola nuts, kurrajong nuts, lotus nuts, malabar chestnuts, marcona almonds, mongongo nuts, monkey puzzle nuts, oysternuts, palm nuts, paradise nuts, pili nuts, red bopple nuts, saba nuts, tiger nuts, Valencia peanuts, Virginia peanuts, and water caltrops.

9. The seed or grain of claim 1, wherein the seed or grain is not genetically modified.

10. The seed or grain of claim 1, wherein the seed or grain does not comprise a recombinant haloperoxidase.

11. The seed or grain of claim 1, wherein the seed or grain is genetically modified.

12. The seed or grain of claim 1 wherein the exogenous antimethanogenic agent is selected from the group consisting of bromoform, chloroform, iodoform, and fluoroform.

13. The seed or grain of claim 1, wherein the exogenous antimethanogenic agent is solubilized in a carrier.

14. The seed or grain of claim 13, wherein the carrier comprises a hydrophilic solvent, a hydrophobic solvent, or a combination thereof.

15. The seed or grain of claim 13, wherein the carrier comprises a lipid, an oil, a vegetable oil, a fatty acid, or a combination thereof.

16. The seed or grain of claim 13, wherein the carrier comprises a glycol.

17. The seed or grain of claim 16, wherein the glycol is selected from the group consisting of propylene glycol, diethylene glycol, dipropylene glycol, triethylene glycol, and combinations thereof.

18. The seed or grain of claim 1, wherein the seed or grain comprises about 15 mg to about 50 mg of the antimethanogenic agent per gram of the seed or grain.

* * * * *